United States Patent
Nishimura et al.

(10) Patent No.: US 12,422,608 B2
(45) Date of Patent: Sep. 23, 2025

(54) OPTICAL FILM, MANUFACTURING METHOD OF LIGHT ABSORPTION ANISOTROPIC LAYER, AND IMAGE DISPLAY DEVICE

(71) Applicant: FUJIFILM Corporation, Tokyo (JP)

(72) Inventors: Naoya Nishimura, Kanagawa (JP); Shinya Watanabe, Kanagawa (JP); Fumitake Mitobe, Kanagawa (JP); Shinichi Yoshinari, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/528,212

(22) Filed: Dec. 4, 2023

(65) Prior Publication Data

US 2024/0142685 A1    May 2, 2024

Related U.S. Application Data

(63) Continuation of application No. PCT/JP2022/024545, filed on Jun. 20, 2022.

(30) Foreign Application Priority Data

Jun. 25, 2021 (JP) .............................. JP2021-105549

(51) Int. Cl.
*G02B 5/30* (2006.01)
*G02B 1/11* (2015.01)
(Continued)

(52) U.S. Cl.
CPC .............. *G02B 5/3016* (2013.01); *G02B 1/11* (2013.01); *G02B 1/12* (2013.01); *G02F 1/133502* (2013.01)

(58) Field of Classification Search
CPC .... G02F 1/133502; G02B 1/11; G02B 5/3016
See application file for complete search history.

(56) References Cited

U.S. PATENT DOCUMENTS

| | | | |
|---|---|---|---|
| 2006/0007371 A1* | 1/2006 | Miyatake | G02B 5/30 349/96 |
| 2009/0153783 A1 | 6/2009 | Umemoto | |

(Continued)

FOREIGN PATENT DOCUMENTS

| | | |
|---|---|---|
| JP | 4902516 B2 | 3/2012 |
| JP | 2016-027387 A | 2/2016 |

(Continued)

OTHER PUBLICATIONS

International Search Report issued in PCT/JP2022/024545 on Aug. 9, 2022.

(Continued)

*Primary Examiner* — Paisley L Wilson
(74) *Attorney, Agent, or Firm* — Edwards Neils LLC; Jean C. Edwards, Esq.

(57) ABSTRACT

An optical film that, when being used in an image display device, it is possible to suppress a change in redness with respect to an original image in images reflected in surroundings, a manufacturing method of a light absorption anisotropic layer, and an image display device. The optical film includes a light absorption anisotropic layer which contains a liquid crystalline compound and a dichroic substance, in which an angle θ between a transmittance central axis of the light absorption anisotropic layer and a normal direction of a surface of the light absorption anisotropic layer is 0° or more and 45° or less, and a haze value of the optical film is more than 1% and 20% or less.

19 Claims, 1 Drawing Sheet

(51) Int. Cl.
G02B 1/12 (2006.01)
G02F 1/1335 (2006.01)

(56) References Cited

U.S. PATENT DOCUMENTS

| | | |
|---|---|---|
| 2009/0201583 A1 | 8/2009 | Kamada et al. |
| 2015/0378068 A1 | 12/2015 | Hatanaka |
| 2019/0353958 A1 | 11/2019 | Mitobe et al. |

FOREIGN PATENT DOCUMENTS

| | | |
|---|---|---|
| JP | 2019-120949 A | 7/2019 |
| WO | 2007/145022 A1 | 12/2007 |
| WO | 2018/151295 A1 | 8/2018 |

OTHER PUBLICATIONS

Written Opinion issued in PCT/JP2022/024545 on Aug. 9, 2022.
International Preliminary Report on Patentability completed by WIPO on Dec. 14, 2023 in connection with International Patent Application No. PCT/JP2022/024545.

* cited by examiner

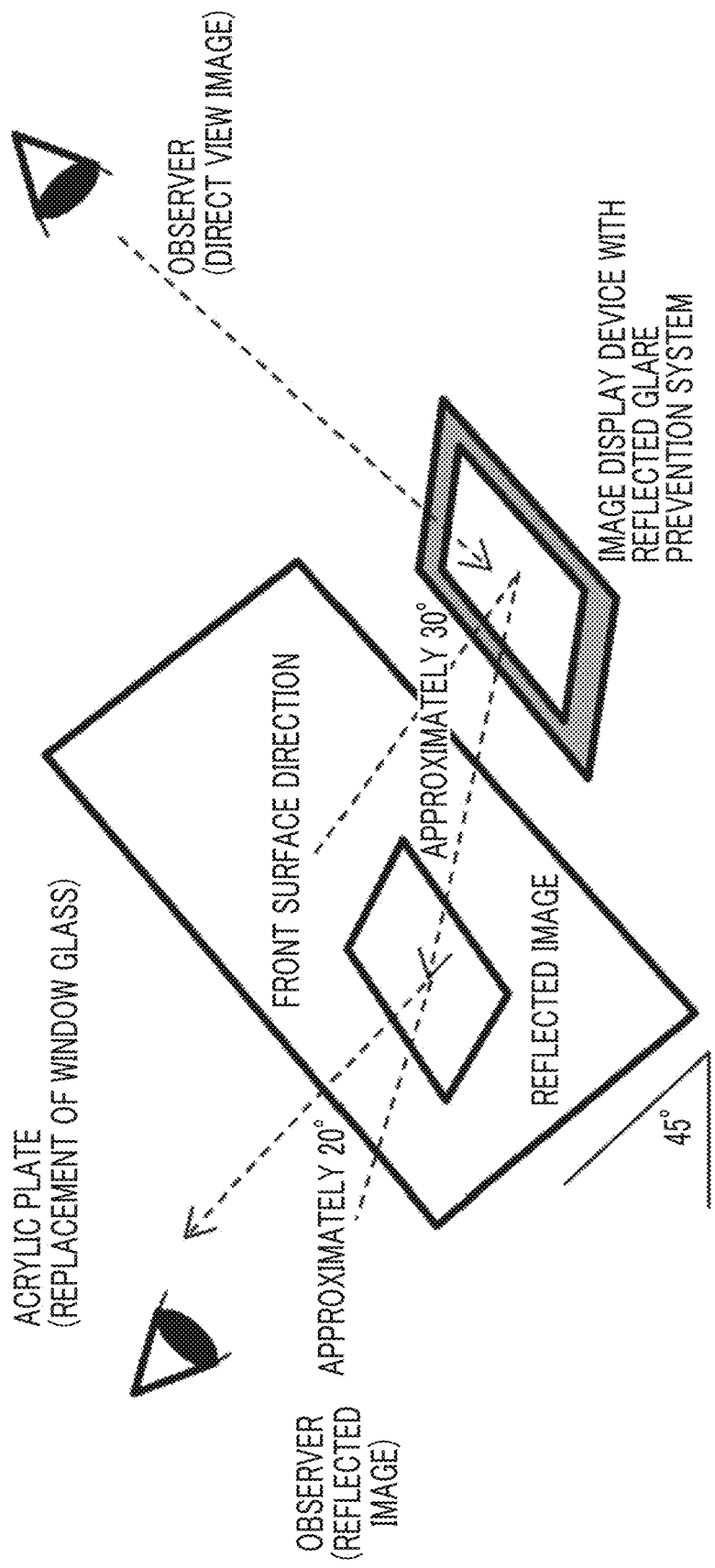

OPTICAL FILM, MANUFACTURING METHOD OF LIGHT ABSORPTION ANISOTROPIC LAYER, AND IMAGE DISPLAY DEVICE

CROSS-REFERENCE TO RELATED APPLICATIONS

This application is a Continuation of PCT International Application No. PCT/JP2022/024545 filed on Jun. 20, 2022, which was published under PCT Article 21(2) in Japanese, and which claims priority under 35 U.S.C. § 119 (a) to Japanese Patent Application No. 2021-105549 filed on Jun. 25, 2021. The above applications are hereby expressly incorporated by reference, in their entirety, into the present application.

BACKGROUND OF THE INVENTION

1. Field of the Invention

The present invention relates to an optical film, a manufacturing method of a light absorption anisotropic layer, and an image display device.

2. Description of the Related Art

In a case where an in-vehicle display such as a car navigation system is used, there is a problem in that light emitted upward from a display screen is reflected on a windshield or the like and interferes with driving.

For the purpose of solving the above-described problem, for example, JP4902516B discloses a viewing angle control system including a polarizer (light absorption anisotropic layer) which contains an absorption dichroic substance, in which an angle between an absorption axis and a normal line of a film surface is 0° to 45°.

SUMMARY OF THE INVENTION

As a result of studying on the viewing angle control system disclosed in JP4902516B, the present inventors have found that reflection of an image on window glass (windshield) positioned above the in-vehicle display is reduced, but have found that the hue of the reflected image which partially remains is greatly changed from the original tint to redness depending on the viewing angle, greenness, blueness, or the like, and as a result, the reflected image with reduced brightness may be conspicuous again. In particular, it has been found that, in a case where a change occurs to redness, a degree of conspicuousness in a human sense is high, which may hinder driving.

An object of the present invention is to provide an optical film that, in a case of being used in an image display device, it is possible to suppress a change in redness (hue shift to redness) with respect to an original image in images reflected in surroundings (for example, window glass), a manufacturing method of a light absorption anisotropic layer, and an image display device.

As a result of conducting an intensive study to achieve the above-described object, the present inventors have found that, in a case where a haze value of an optical film having a predetermined light absorption anisotropic layer which contains a liquid crystalline compound and a dichroic substance is more than 1% and 20% or less, it is possible to suppress the change in redness with respect to the original image in images reflected in the surroundings in a case of being used in an image display device, thereby completing the present invention.

That is, the present inventors have found that the above-described object can be achieved by employing the following configurations.

[1] An optical film comprising:
a light absorption anisotropic layer which contains a liquid crystalline compound and a dichroic substance,
in which an angle θ between a transmittance central axis of the light absorption anisotropic layer and a normal direction of a surface of the light absorption anisotropic layer is 0° or more and 45° or less, and
a haze value of the optical film is more than 1% and 20% or less.

[2] The optical film according to [1],
in which the dichroic substance contained in the light absorption anisotropic layer forms an arrangement structure.

[3] The optical film according to [2],
in which, in a cross section of the light absorption anisotropic layer observed with a scanning transmission electron microscope, in a case where a length of a major axis of the arrangement structure is denoted as L and a length of a minor axis of the arrangement structure is denoted as D, three or more arrangement structures satisfying L≥240 nm are observed per 40 $\mu m^2$.

[4] The optical film according to any one of [1] to [3],
in which the light absorption anisotropic layer is a layer fixed in a liquid crystal state of a smectic phase.

[5] The optical film according to any one of [1] to [4],
in which the light absorption anisotropic layer contains fine particles having a refractive index different from a refractive index of the liquid crystalline compound.

[6] The optical film according to any one of [1] to [5],
in which a haze value of the light absorption anisotropic layer is more than 0.7% and 15% or less.

[7] A manufacturing method of a light absorption anisotropic layer, which is for manufacturing a light absorption anisotropic layer containing a liquid crystalline compound and a dichroic substance, the manufacturing method comprising:
a coating film forming step of applying a liquid crystal composition containing a liquid crystalline compound and a dichroic substance to form a coating film; and
an alignment step of aligning the liquid crystalline compound and the dichroic substance contained in the coating film,
in which the alignment step is a treatment step of subjecting the coating film to at least a heat treatment of heating to 100° C. or higher, a cooling treatment of cooling to lower than 100° C., and a heat treatment of heating to 100° C. or higher in this order.

[8] An image display device comprising:
the optical film according to any one of [1] to [6].

[9] The image display device according to [8],
in which the image display device is used for in-vehicle applications.

According to the present invention, it is possible to provide an optical film that, in a case of being used in an image display device, it is possible to suppress a change in redness with respect to an original image in images reflected in surroundings, a manufacturing method of a light absorption anisotropic layer, and an image display device.

BRIEF DESCRIPTION OF THE DRAWINGS

FIG. 1 is a schematic view showing an evaluation system of a reflected image on window glass.

DESCRIPTION OF THE PREFERRED EMBODIMENTS

Hereinafter, the present invention will be described in detail.

Although configuration requirements to be described below are described based on representative embodiments of the present invention, the present invention is not limited to the embodiments.

Any numerical range expressed using "to" in the present specification refers to a range including the numerical values before and after the "to" as a lower limit value and an upper limit value, respectively.

In addition, in the present specification, parallel and orthogonal do not respectively indicate parallel and orthogonal in a strict sense, but respectively indicate a range of parallel±5° and a range of orthogonal ±5°.

In addition, in the present specification, concepts of a liquid crystalline composition and a liquid crystalline compound also include those that no longer exhibit liquid crystallinity due to curing or the like.

In addition, in the present specification, substances corresponding to respective components may be used alone or in combination of two or more kinds thereof. Here, in a case where two or more kinds of substances corresponding to respective components are used in combination, the content of the components indicates the total content of the substances used in combination unless otherwise specified.

In addition, in the present specification, "(meth)acrylate" denotes "acrylate" or "methacrylate", "(meth)acryl" denotes "acryl" or "methacryl", and "(meth)acryloyl" denotes "acryloyl" or "methacryloyl".

Substituent W

A substituent W used in the present specification represents any of the following groups.

Examples of the substituent W include a halogen atom, an alkyl group having 1 to 20 carbon atoms, a halogenated alkyl group having 1 to 20 carbon atoms, a cycloalkyl group having 1 to 20 carbon atoms, an alkylcarbonyl group having 1 to 10 carbon atoms, an alkyloxycarbonyl group having 1 to 10 carbon atoms, an alkylcarbonyloxy group having 1 to 10 carbon atoms, an alkylamino group having 1 to 10 carbon atoms, an alkylaminocarbonyl group, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group (also referred to as a hetero ring group), a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), a sulfate group (—OSO$_3$H), and other known substituents.

Details of the substituent are described in paragraph of JP2007-234651A.

In addition, the substituent W may be a group represented by Formula (W1).

In Formula (W1), LW represents a single bond or a divalent linking group, SPW represents a divalent spacer group, Q represents Q1 or Q2 in Formula (LC) described later, and * represents a bonding position.

Examples of the divalent linking group represented by LW include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (Z, Z', and Z" independently represent hydrogen, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. LW may be a group in which two or more of these groups are combined (hereinafter, also abbreviated as "L-C").

Examples of the divalent spacer group represented by SPW include a linear, branched, or cyclic alkylene group having 1 to 50 carbon atoms, and a heterocyclic group having 1 to 20 carbon atoms.

The carbon atoms of the alkylene group and the heterocyclic group may be substituted with —O—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N (Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (here, Z, Z', and Z" each independently represent a hydrogen atom, an alkyl group having 1 to 4 carbon atoms, a cycloalkyl group, an aryl group, a cyano group, or a halogen atom), —C≡C—, —N=N—, —S—, —C(S)—, —S(O)—, —SO$_2$—, —(O)S(O)O—, —O(O)S(O)O—, —SC(O)—, —C(O)S—, or a group obtained by combining two or more of these groups (hereinafter, also abbreviated to as "SP-C").

The hydrogen atom of the above-described alkylene group or the hydrogen atom of the heterocyclic group may be substituted with a halogen atom, a cyano group, —Z$^H$, —OH, —OZ$^H$, —COOH, —C(O)Z$^H$, —C(O)OZ$^H$, —OC(O)Z$^H$, —OC(O)OZ$^H$, —NZ$^H$Z$^{H'}$, —NZ$^H$C(O)Z$^{H'}$, —NZ$^H$C(O)OZ$^{H'}$, —C(O)NZ$^H$Z$^{H'}$, —OC(O)NZ$^H$Z$^{H'}$, —NZ$^H$C(O)NZ$^{H'}$OZ$^{H''}$, —SH, —SZ$^H$, —C(S)Z$^H$, —C(O)SZ$^H$, or —SC(O)Z$^H$ (hereinafter, also abbreviated as "SP—H"). Here, Z$^H$ and Z$^{H'}$ represent an alkyl group having 1 to 10 carbon atoms, a halogenated alkyl group, or -L-CL (L represents a single bond or a divalent linking group, and specific examples of the divalent linking group are the same as those for LW and SPW described above; CL represents a crosslinkable group, examples thereof include a group represented by Q1 or Q2 in Formula (LC) described later, and a crosslinkable group represented by Formulae (P1) to (P30) described later is preferable).

Optical Film

The optical film according to the embodiment of the present invention is an optical film including a light absorption anisotropic layer which contains a liquid crystalline compound and a dichroic substance.

In addition, in the optical film according to the embodiment of the present invention, an angle θ between a transmittance central axis of the light absorption anisotropic layer and a normal direction of a surface of the light absorption anisotropic layer (hereinafter, also abbreviated as "transmittance central axis angle θ") is 0° or more and 45° or less.

In addition, a haze value of the optical film according to the embodiment of the present invention is more than 1% and 20% or less.

Here, the transmittance central axis is a direction in which the highest transmittance is exhibited in a case where the transmittance is measured by changing an inclination angle (polar angle) and an inclination direction (azimuthal angle) with respect to a normal direction of a surface of the light absorption anisotropic layer.

Specifically, Mueller matrix at a wavelength of 550 nm is measured using AxoScan OPMF-1 (manufactured by Opto Science, Inc.). More specifically, in the measurement, the azimuthal angle at which the transmittance central axis is inclined is first searched for, the Mueller matrix at a wavelength of 550 nm is measured while the polar angle which is the angle with respect to the surface of the light absorption anisotropic layer in the normal direction is changed from −70° to 70° at intervals of 1° in the surface (the plane which has the transmittance central axis and is orthogonal to the layer surface) having the normal direction of the light absorption anisotropic layer along the azimuthal angle thereof, and the transmittance of the light absorption anisotropic layer is derived. As a result, the direction at which the highest transmittance is exhibited is defined as the transmittance central axis.

The transmittance central axis denotes a direction of ab absorption axis (major axis direction of a molecule) of the dichroic substance contained in the light absorption anisotropic layer.

In addition, the haze value refers to a haze measured according to JIS K 7136:2000 "Plastic—Method for obtaining haze of transparent material", and refers to a value measured with a haze meter (for example, NDH4000 (manufactured by NIPPON DENSHOKU INDUSTRIES Co., Ltd.) and the like).

In the present invention, as described above, in a case where a haze value of an optical film including a light absorption anisotropic layer which contains a liquid crystalline compound and a dichroic substance, in which a transmittance central axis angle θ is 0° or more and 45° or less, is more than 1% and 20% or less, it is possible to suppress the change in redness with respect to the original image in images reflected in the surroundings (for example, window glass and the like) in a case of being used in an image display device.

The reason for this is not clear, but the present inventors presume as follows.

First, a second polarizer disclosed in JP4902516B is formed of an absorption dichroic substance and a liquid crystalline compound, and the absorption dichroic substance is aligned in a specific direction by using a guest-host effect of the liquid crystalline compound. Birefringence of the liquid crystalline compound and the absorption dichroic substance typically used here includes wavelength dispersibility, and for this reason, light with different polarization characteristics, such as S-polarized light and P-polarized light, is emitted from a surface of the second polarizer for each wavelength. In particular, since the S-polarized light is reflected more strongly than the P-polarized light on the surface of window glass in an incidence angle region around the Brewster's angle, the tint of the reflected image changes. For example, in a case where S-polarized light of a red color and P-polarized light of green to blue colors are emitted from the surface of the second polarizer, since the S-polarized light is reflected more strongly than the P-polarized light from the reflected image, a reflected image in which the hue is changed to redness is formed.

Therefore, in the present invention, by setting the haze value of the optical film including the predetermined light absorption anisotropic layer to more than 1% and 20% or less, since a polarization state of light emitted from the surface of the optical film can be eliminated, it is considered that the change in redness of the original image can be suppressed.

As described above, the haze value of the optical film according to the embodiment of the present invention is more than 1% and 20% or less, and from the reason that the change in redness of the reflected image with respect to the original image can be further suppressed, the haze value is preferably 2% or more and 18% or less and more preferably 3% or more and 15% or less.

In addition, from the reason that the change in redness of the reflected image with respect to the original image can be further suppressed and the alignment degree is also improved, the haze value of the optical film according to the embodiment of the present invention is preferably more than 1% and less than 10%.

In the present invention, a method of adjusting the haze value of the optical film is not particularly limited, and examples thereof include a method of adjusting temperature conditions in a case of aligning the liquid crystalline compound and the dichroic substance during formation of the light absorption anisotropic layer, a method of blending fine particles into the light absorption anisotropic layer, a method of fixing a liquid crystal state of the light absorption anisotropic layer to a smectic phase.

Light Absorption Anisotropic Layer

The light absorption anisotropic layer included in the optical film according to the embodiment of the present invention is a light absorption anisotropic layer containing a liquid crystalline compound and a dichroic substance, and is preferably a layer in which an alignment state of the liquid crystalline compound and the dichroic substance is fixed.

In addition, an angle between a transmittance central axis of the light absorption anisotropic layer and a normal line of a layer plane of the light absorption anisotropic layer is 0° or more and 45° or less, preferably 0° or more and less than 45°, more preferably 0° or more and 35° or less, and still more preferably 0° or more and less than 35°.

In the present invention, from the reason that the alignment degree of the light absorption anisotropic layer is increased, it is preferable that the dichroic substance contained in the light absorption anisotropic layer forms an arrangement structure.

Here, the arrangement structure refers to a state in which, in the light absorption anisotropic layer, the dichroic substances are collected to form an aggregate and molecules of the dichroic substances are periodically arranged in the aggregate.

In addition, the arrangement structure may be composed of only the dichroic substance, or may be composed of the liquid crystalline compound and the dichroic substance.

In addition, the arrangement structure may be composed of one kind of dichroic substance, or may be composed of a plurality of kinds of dichroic substances.

In addition, an arrangement structure composed of a certain kind of dichroic substance and an arrangement structure composed of another kind of dichroic substance may coexist in the light absorption anisotropic layer.

In addition, in a case where the light absorption anisotropic layer contains a plurality of kinds of dichroic substances, among the plurality of kinds of dichroic substances contained in the light absorption anisotropic layer, all of the plurality of kinds of dichroic substances may form the arrangement structure, or some kinds of dichroic substances may form the arrangement structure.

In addition, in the present invention, from the reason that the alignment degree of the light absorption anisotropic layer is further increased, in a cross section of the light absorption anisotropic layer observed with a scanning transmission electron microscope, in a case where a length of a major axis of the arrangement structure is denoted as L and a length of a minor axis of the arrangement structure is denoted as D, it is preferable that 3 or more arrangement structures satisfying L≥240 nm are observed per 40 $\mu m^2$, it is more preferable that 3 to 15 arrangement structures are observed, and it is still more preferable that 3 to 10 arrangement structures are observed.

Here, the cross section is observed with the scanning transmission electron microscope (hereinafter, also abbreviated as "STEM") as follows.

First, an ultra-thin section of the light absorption anisotropic layer, having a thickness of 100 nm in a film thickness direction, is produced using an ultramicrotome.

Next, the ultra-thin section is placed on a grid with a carbon support film for STEM observation.

Thereafter, the grid is placed in the scanning transmission electron microscope, and the cross section is observed at an electron beam acceleration voltage of 30 kV.

In addition, the length L of the major axis of the arrangement structure and the length D of the minor axis are specifically measured as follows.

First, as described above, the cross section of the light absorption anisotropic layer is observed with STEM, a captured image is analyzed to create a frequency histogram, and a frequency at which the frequency is maximized and a standard deviation of a frequency distribution are acquired.

Next, a frequency at which the frequency is 1.3 times the standard deviation on a dark side from the frequency at which the frequency is maximized is set as a threshold value.

Next, in image in which the brightness is binarized is created using the threshold value, and a portion having a major axis of 30 nm or more in the binarized dark region is extracted as the arrangement structure.

Furthermore, each of the extracted arrangement structures is approximated to an ellipse, a length of a major axis of the approximated ellipse is defined as the length L of the major axis of the arrangement structure, and a length of a minor axis of the approximated ellipse is defined as the length D of the minor axis of the arrangement structure.

The length L of the major axis and the length D of the minor axis of the arrangement structure may be measured using known image processing software. Examples of the image processing software include image processing software "ImageJ".

In the present invention, from the reason that it is easier to adjust the haze value of the optical film to more than 1% and 20% or less, it is preferable that the light absorption anisotropic layer is a layer fixed in a liquid crystal state of a smectic phase.

In the present invention, from the reason that it is easier to adjust the haze value of the optical film to more than 1% and 20% or less, it is preferable that the light absorption anisotropic layer contains fine particles having a refractive index different from a refractive index of the liquid crystalline compound.

Here, a difference in refractive index between the liquid crystalline compound and the fine particles may be compared by directly measuring and comparing refractive indices of both the liquid crystalline compound and the fine particles with an Abbe refractometer, or may be quantitatively compared by measuring spectral reflection spectrum or spectral ellipsometry of both the liquid crystalline compound and the fine particles.

As the fine particles, for example, inorganic particles such as silica, alumina, zircon, and zirconia, or organic fine particles such as an acrylic resin, a melamine resin, and a polyamide resin can be used.

As a size of the fine particles, fine particles having various sizes, for example, fine particles having a diameter of approximately 0.01 to 3 μm, can be used.

In addition, various shapes, such as a spherical shape, a rod shape, and a fibrous shape, can be used as a shape of the fine particles. In addition, the degree of depolarization can also be adjusted by using the above-described aspects in combination.

In addition, in a case where the light absorption anisotropic layer contains fine particles, a content of the fine particles is preferably 0.1% to 10% by mass, more preferably 0.2% to 5% by mass, and still more preferably 0.3% to 3% by mass with respect to the total mass of the light absorption anisotropic layer.

In the present invention, from the reason that it is easier to adjust the haze value of the optical film to more than 1% and 20% or less, a haze value of the light absorption anisotropic layer is preferably more than 0.7% and 15% or less, more preferably 1.5% or more and 13% or less, and still more preferably 2.0% or more and 10% or less.

As shown in Examples described later, the haze value of the light absorption anisotropic layer can be calculated from a difference in haze value between a laminate A including the light absorption anisotropic layer and having a layer configuration of three or more layers and a laminate B obtained by removing only the light absorption anisotropic layer from the laminate A.

In the present invention, it is preferable that the above-described light absorption anisotropic layer is a light absorption anisotropic layer formed of a liquid crystal composition containing the liquid crystalline compound and the dichroic substance.

In addition, the liquid crystal composition may contain an alignment agent, a solvent, a polymerization initiator, a polymerizable compound, an interface improver, and other additives.

Hereinafter, each component will be described.

Liquid Crystalline Compound

The liquid crystal composition contains a liquid crystalline compound. By containing the liquid crystalline compound, the dichroic substance can be aligned with a high alignment degree while the precipitation of the dichroic substances is suppressed.

In addition, the liquid crystalline compound contained in the liquid crystal composition can be typically classified into a rod-like type compound and a disk-like type compound depending on the shape thereof.

In addition, the liquid crystalline compound is preferably a liquid crystalline compound which does not exhibit dichroism in a visible region.

In the following description, the expression "the alignment degree of the light absorption anisotropic layer to be formed is further increased" is also referred to as "the effect of the present invention is more excellent".

As the liquid crystalline compound, any of a low-molecular-weight low-molecular-weight liquid crystalline compound or a high-molecular-weight liquid crystalline compound can be used.

Here, the "low-molecular-weight liquid crystalline compound" refers to a liquid crystalline compound having no repeating unit in the chemical structure.

In addition, the "high-molecular-weight liquid crystalline compound" refers to a liquid crystalline compound having a repeating unit in the chemical structure.

Examples of the low-molecular-weight liquid crystalline compound include liquid crystalline compounds described in JP2013-228706A.

Examples of the high-molecular-weight liquid crystalline compound include thermotropic liquid crystalline polymers described in JP2011-237513A. In addition, the high-molecular-weight liquid crystalline compound may include a crosslinkable group (such as an acryloyl group and a methacryloyl group) at a terminal.

From the reason that the effect of the present invention is likely to be realized, the liquid crystalline compound is preferably a rod-like liquid crystalline compound and more preferably a high-molecular-weight liquid crystalline compound.

The liquid crystalline compound may be used alone or in combination of two or more kinds thereof.

From the viewpoint that the effect of the present invention is more excellent, the liquid crystalline compound preferably includes the high-molecular-weight liquid crystalline compound, and particularly preferably includes both the high-molecular-weight liquid crystalline compound and the low-molecular-weight liquid crystalline compound.

It is preferable that the liquid crystalline compound includes a liquid crystalline compound represented by Formula (LC), or a polymer thereof. The liquid crystalline compound represented by Formula (LC) or the polymer thereof is a compound exhibiting liquid crystallinity. The liquid crystallinity may be a nematic phase or a smectic phase, or the liquid crystalline compound may exhibit both the nematic phase and the smectic phase, and it is preferable to exhibit at least the nematic phase.

The smectic phase may be a high-order smectic phase. The high-order smectic phase here denotes a smectic B phase, a smectic D phase, a smectic E phase, a smectic F phase, a smectic G phase, a smectic H phase, a smectic I phase, a smectic J phase, a smectic K phase, or a smectic L phase. Among these, a smectic B phase, a smectic F phase, or a smectic I phase is preferable.

In a case where the smectic liquid crystal phase exhibited by the liquid crystalline compound is any of these high-order smectic liquid crystal phases, the light absorption anisotropic layer with a higher alignment degree order can be produced. In addition, the light absorption anisotropic layer produced from such a high-order smectic liquid crystal phase with a high alignment degree order is a layer in which a Bragg peak derived from a high-order structure such as a hexatic phase and a crystal phase in X-ray diffraction measurement is obtained. The above-described Bragg peak is a peak derived from a plane periodic structure of molecular alignment, and according to the liquid crystal composition according to the present invention, a light absorption anisotropic layer having a periodic interval of 3.0 to 5.0 Å can be obtained.

$$Q1\text{-}S1\text{-}MG\text{-}S2\text{-}Q2 \tag{LC}$$

In Formula (LC), Q1 and Q2 each independently represent a hydrogen atom, a halogen atom, a linear, branched, or cyclic alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group (also referred to as a hetero ring group), a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), a sulfate group (—OSO$_3$H), or a crosslinkable group represented by any of Formulae (P1) to (P-30), and it is preferable that at least one of Q1 or Q2 represents a crosslinkable group represented by any of the following formulae.

(P-1)

(P-2)

(P-3)

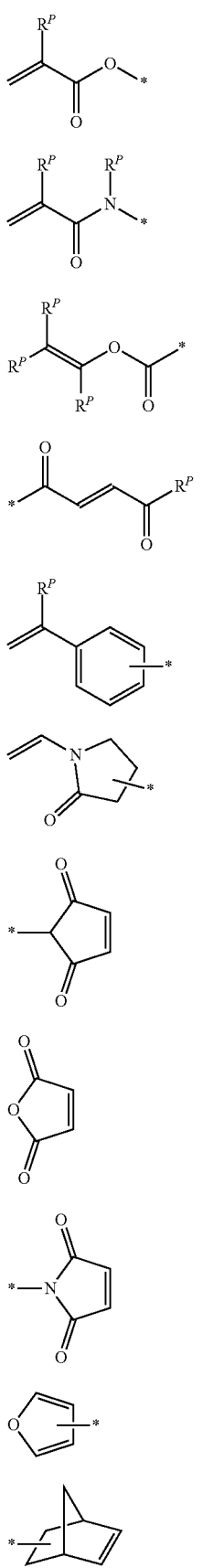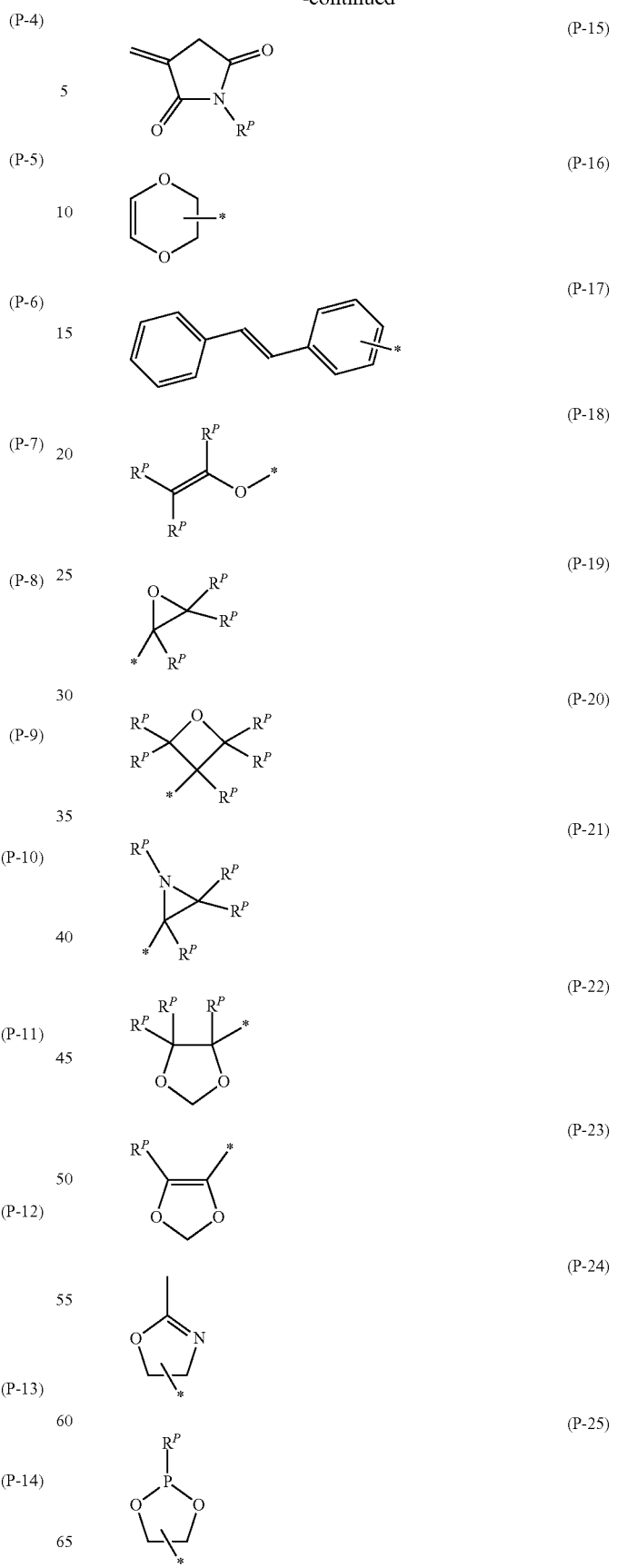

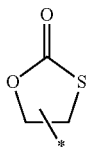
(P-26)

(P-27)

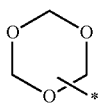
(P-28)

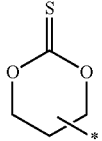
(P-29)

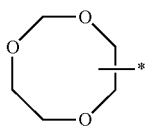
(P-30)

In Formulae (P-1) to (P-30), $R^P$ represents a hydrogen atom, a halogen atom, a linear, branched, or cyclic alkylene group having 1 to 10 carbon atoms, a halogenated alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), or a sulfate group (—OSO$_3$H), and a plurality of $R^P$'s may be the same or different from each other.

Examples of a preferred aspect of the crosslinkable group include a radically polymerizable group and a cationically polymerizable group. As the radically polymerizable group, a vinyl group represented by Formula (P-1), a butadiene group represented by Formula (P-2), a (meth)acryloyl group represented by Formula (P-4), a (meth)acrylamide group represented by Formula (P-5), a vinyl acetate group represented by Formula (P-6), a fumaric acid ester group represented by Formula (P-7), a styryl group represented by Formula (P-8), a vinylpyrrolidone group represented by Formula (P-9), a maleic acid anhydride represented by Formula (P-11), or a maleimide group represented by Formula (P-12) is preferable. As the cationically polymerizable group, a vinyl ether group represented by Formula (P-18), an epoxy group represented by Formula (P-19), or an oxetanyl group represented by Formula (P-20) is preferable.

In Formula (LC), S1 and S2 each independently represent a divalent spacer group, and suitable aspects of S1 and S2 include the same structures as those for SPW in Formula (W1), and thus the description thereof will not be repeated.

In Formula (LC), MG represents a mesogen group described below. The mesogen group represented by MG is a group representing a main skeleton of a liquid crystal molecule which contributes to liquid crystal formation. A liquid crystal molecule exhibits liquid crystallinity which is in an intermediate state (mesophase) between a crystal state and an isotropic liquid state. The mesogen group is not particularly limited, and for example, particularly description on pages 7 to 16 of "Flussige Kristalle in Tabellen II" (VEB Deutsche Verlag fur Grundstoff Industrie, Leipzig, 1984) and particularly description in Chapter 3 of "Liquid Crystal Handbook" (Maruzen, 2000) edited by Liquid Crystal Handbook Editing Committee can be referred to.

The mesogen group represented by MG preferably has 2 to 10 cyclic structures and more preferably has 3 to 7 cyclic structures.

Specific examples of the cyclic structure include an aromatic hydrocarbon group, a heterocyclic group, and an alicyclic group.

As the mesogen group represented by MG, from the viewpoint of expressing the liquid crystallinity, adjusting a liquid crystal phase transition temperature, availability of raw materials, and synthetic suitability, and from the viewpoint that the effect of the present invention is more excellent, a group represented by Formula (MG-A) or Formula (MG-B) is preferable, and a group represented by Formula (MG-B) is more preferable.

$$*\!-\!\!\left(\!A1\!\right)_{\!a1}\!\!-\!* \qquad\qquad\text{(MG-A)}$$

$$*\!-\!\!\left(\!A2\!-\!LA1\!\right)_{\!a2}\!\!A3\!-\!* \qquad\text{(MG-B)}$$

In Formula (MG-A), A1 represents a divalent group selected from the group consisting of an aromatic hydrocarbon group, a heterocyclic group, and an alicyclic group. These groups may be substituted with a substituent such as the substituent W.

It is preferable that the divalent group represented by A1 is a 4- to 15-membered ring. In addition, the divalent group represented by A1 may be a monocyclic ring or a fused ring.

In addition, * represents a bonding position to S1 or S2.

Examples of the divalent aromatic hydrocarbon group represented by A1 include a phenylene group, a naphthylene group, a fluorene-diyl group, an anthracene-diyl group, and a tetracene-diyl group. From the viewpoint of design diversity of the mesogenic skeleton and the availability of raw materials, a phenylene group or a naphthylene group is preferable.

The divalent heterocyclic group represented by A1 may be any of aromatic or non-aromatic, but from the viewpoint of further improving the alignment degree, a divalent aromatic heterocyclic group is preferable.

Examples of atoms other than carbon, constituting the divalent aromatic heterocyclic group, include a nitrogen atom, a sulfur atom, and an oxygen atom. In a case where the aromatic heterocyclic group has a plurality of atoms other than carbon, constituting a ring, these atoms may be the same or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, a thienooxazole-diyl group, and the following structures (II-1) to (II-4).

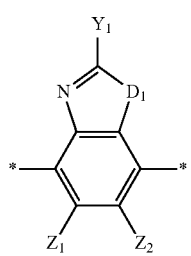

(II-1)

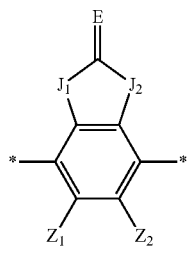

(II-2)

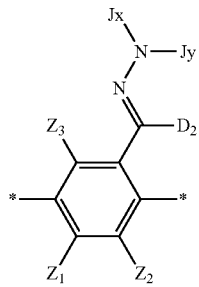

(II-3)

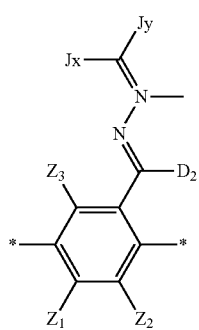

(II-4)

In Formulae (II-1) to (II-4), $D_1$ represents —S—, —O—, or —NR$^{11}$—, in which R$^{11}$ represents a hydrogen atom or an alkyl group having 1 to 6 carbon atoms; $Y_1$ represents an aromatic hydrocarbon group having 6 to 12 carbon atoms or an aromatic heterocyclic group having 3 to 12 carbon atoms; $Z_1$, $Z_2$, and $Z_3$ each independently represent a hydrogen atom, an aliphatic hydrocarbon group having 1 to 20 carbon atoms, an alicyclic hydrocarbon group having 3 to 20 carbon atoms, a monovalent aromatic hydrocarbon group having 6 to 20 carbon atoms, a halogen atom, a cyano group, a nitro group, —NR$^{12}$R$^{13}$, or —SR$^{12}$, in which $Z_1$ and $Z_2$ may be bonded to each other to form an aromatic ring or an aromatic heterocyclic ring, and R$^{12}$ and R$^{13}$ each independently represent a hydrogen atom or an alkyl group having 1 to 6 carbon atoms; $J_1$ and $J_2$ each independently represent a group selected from the group consisting of —O—, —NR$^{21}$— (R$^{21}$ represents a hydrogen atom or a substituent), —S—, and C(O)—; E represents a hydrogen atom or a non-metal atom of Group 14 to Group 16, to which a substituent may be bonded; Jx represents an organic group having 2 to 30 carbon atoms, which has at least one aromatic ring selected from the group consisting of an aromatic hydrocarbon ring and an aromatic heterocyclic ring; Jy represents a hydrogen atom, an alkyl group having 1 to 6 carbon atoms, which may have a substituent, or an organic group having 2 to 30 carbon atoms, which has at least one aromatic ring selected from the group consisting of an aromatic hydrocarbon ring and an aromatic heterocyclic ring; the aromatic ring of Jx and Jy may have a substituent, Jx and Jy may be bonded to each other to form a ring; and $D_2$ represents a hydrogen atom or an alkyl group having 1 to 6 carbon atoms, which may have a substituent.

In Formula (II-2), in a case where $Y_1$ represents an aromatic hydrocarbon group having 6 to 12 carbon atoms, the aromatic hydrocarbon group may be monocyclic or polycyclic. In a case where $Y_1$ represents an aromatic heterocyclic group having 3 to 12 carbon atoms, the aromatic heterocyclic group may be monocyclic or polycyclic.

In Formula (II-2), in a case where $J_1$ and $J_2$ represent —NR$^{21}$—, the substituent as R$^{21}$ can refer to, for example, description in paragraphs 0035 to 0045 of JP2008-107767A, and the content thereof is incorporated in the present specification.

In Formula (II-2), in a case where E represents a non-metal atom of Group 14 to Group 16, to which a substituent may be bonded, =O, =S, =NR', or =C(R')R' is preferable. R' represents a substituent, and as the substituent, for example, description in paragraphs [0035] to [0045] of JP2008-107767A can be referred to, and —NZ$^{41}$Z$^{42}$ (Z$^{41}$ and Z$^{42}$ each independently represent a hydrogen atom, an alkyl group, or an aryl group) is preferable.

Specific examples of the divalent alicyclic group represented by A1 include a cyclopentylene group and a cyclohexylene group, and the carbon atoms thereof may be substituted with —O—, —Si(CH$_3$)$_2$—, —N(Z)— (Z represents hydrogen, an alkyl group having 1 to 4 carbon atoms, a cycloalkyl group, an aryl group, a cyano group, or a halogen atom), —C(O)—, —S—, —C(S)—, —S(O)—, —SO$_2$—, or a group obtained by combining two or more of these groups.

In Formula (MG-A), a1 represents an integer of 2 to 10. A plurality of A1's may be the same or different from each other.

In Formula (MG-B), A2 and A3 each independently represent a divalent group selected from the group consisting of an aromatic hydrocarbon group, a heterocyclic group, and an alicyclic group. Specific examples and suitable aspects of A2 and A3 are the same as those for A1 in Formula (MG-A), and thus the description thereof will not be repeated.

In Formula (MG-B), a2 represents an integer of 1 to 10, a plurality of A2's may be the same or different from each other, and a plurality of LA1's may be the same or different from each other. From the reason that the effect of the present invention is more excellent, it is more preferable that a2 is 2 or more.

In Formula (MG-B), LA1 represents a single bond or a divalent linking group. Here, in a case where a2 is 1, LA1 is a divalent linking group, and in a case where a2 is 2 or more, at least one of a plurality of LA1's is a divalent linking group.

In Formula (MG-B), the divalent linking group represented by LA1 is the same as LW, and thus the description thereof will not be repeated.

Specific examples of MG include the following structures, and the hydrogen atoms on the aromatic hydrocarbon group, the heterocyclic group, and the alicyclic group in the following structures may be substituted with the substituent W described above.

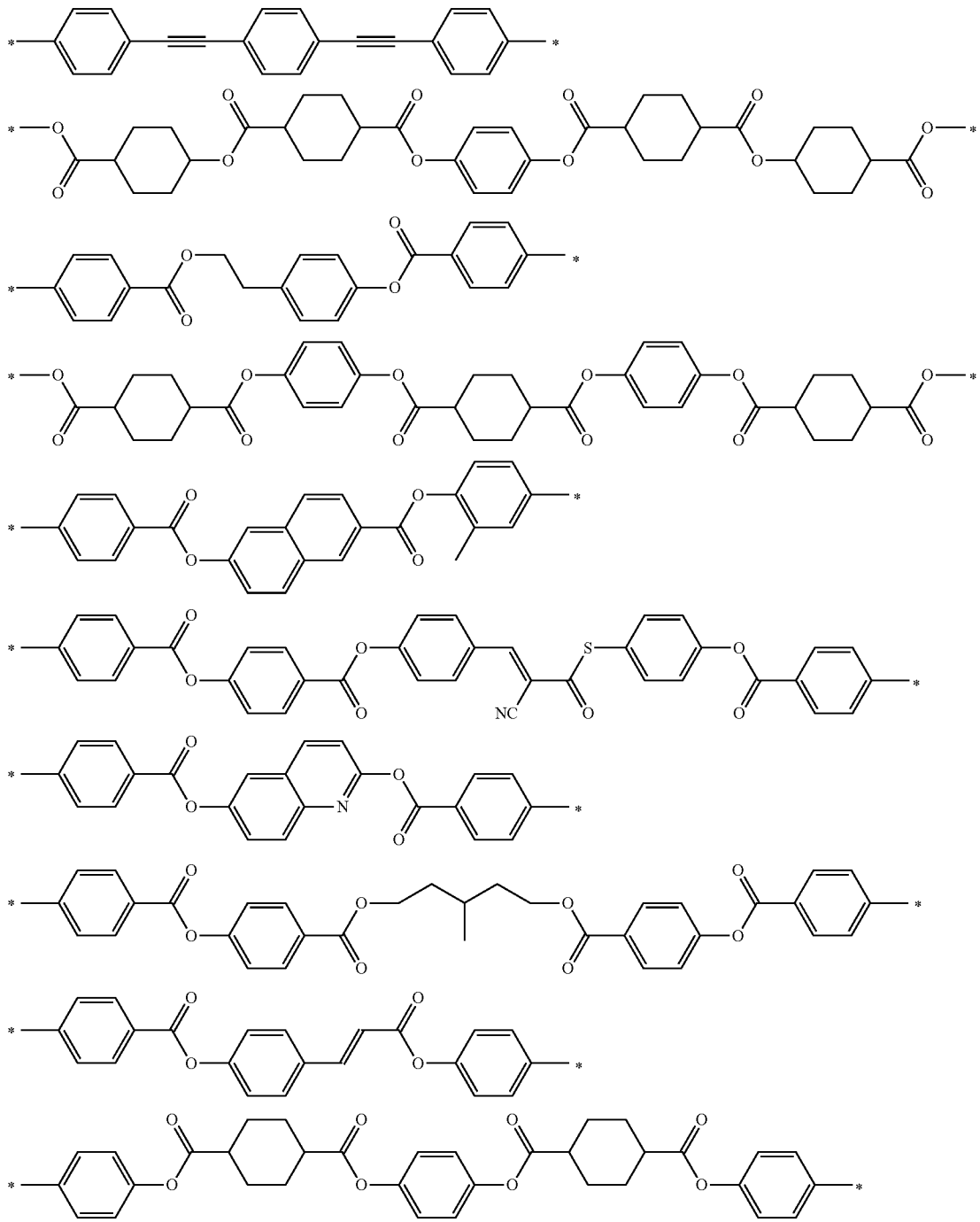

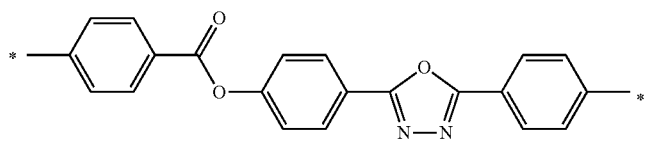
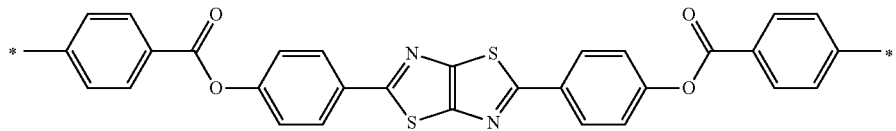
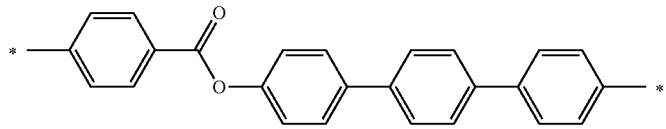
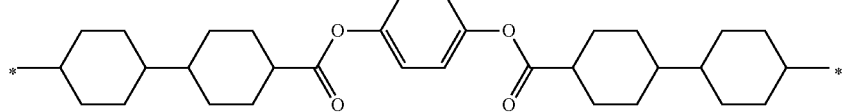
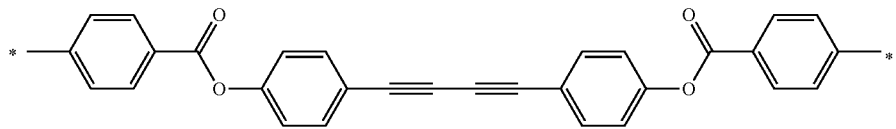
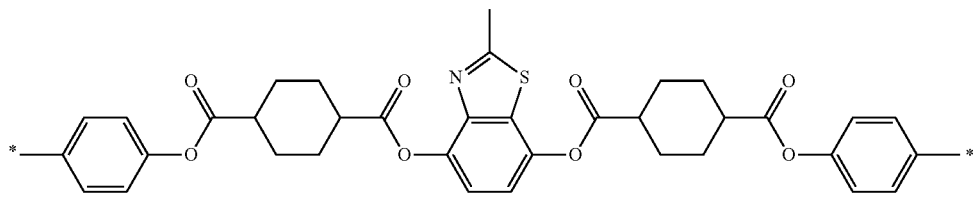
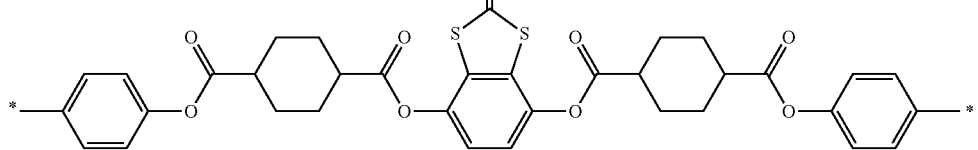
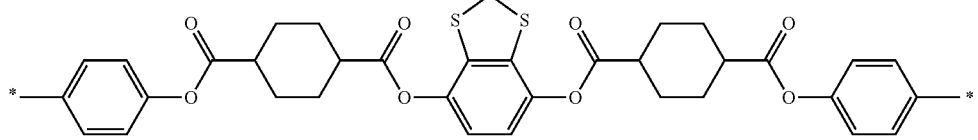
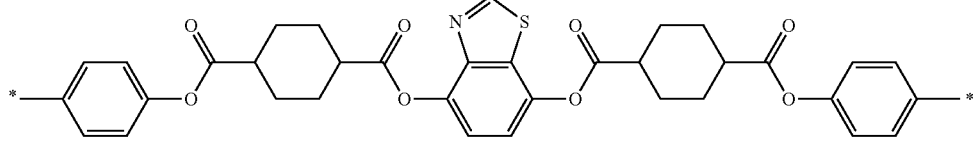

-continued
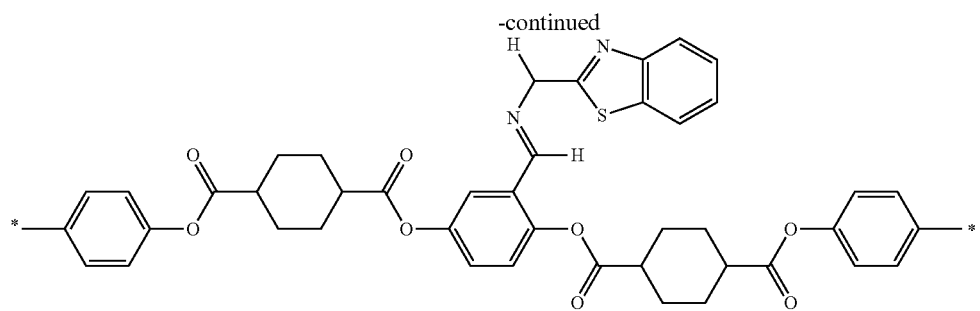
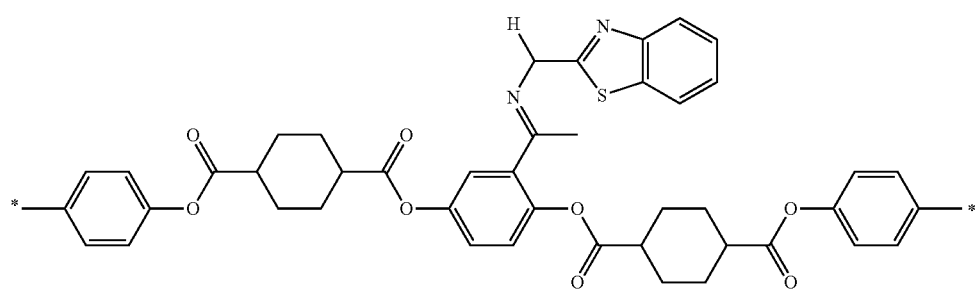
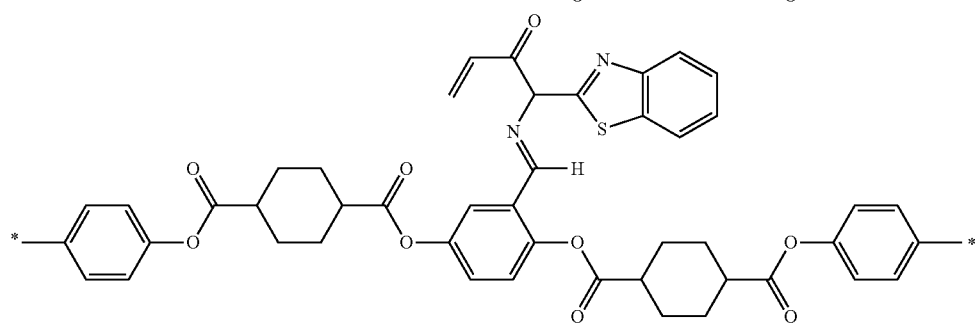
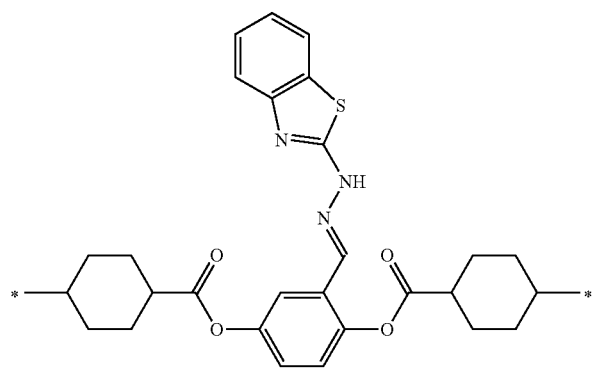
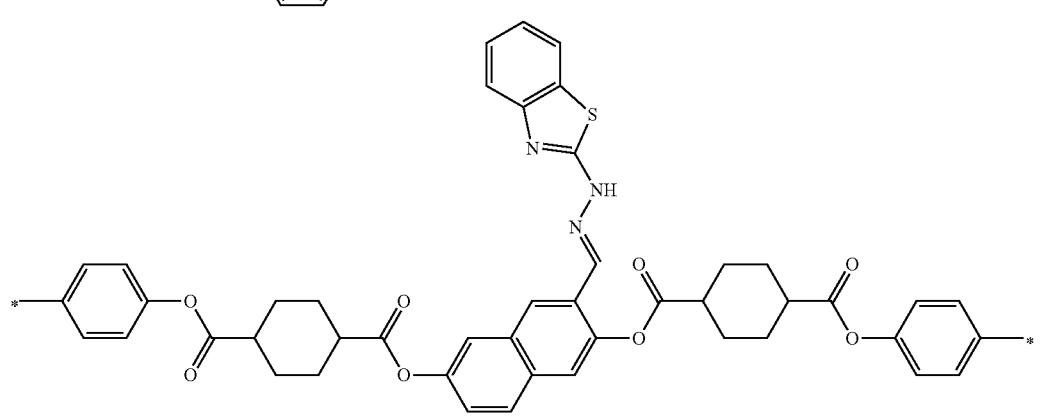

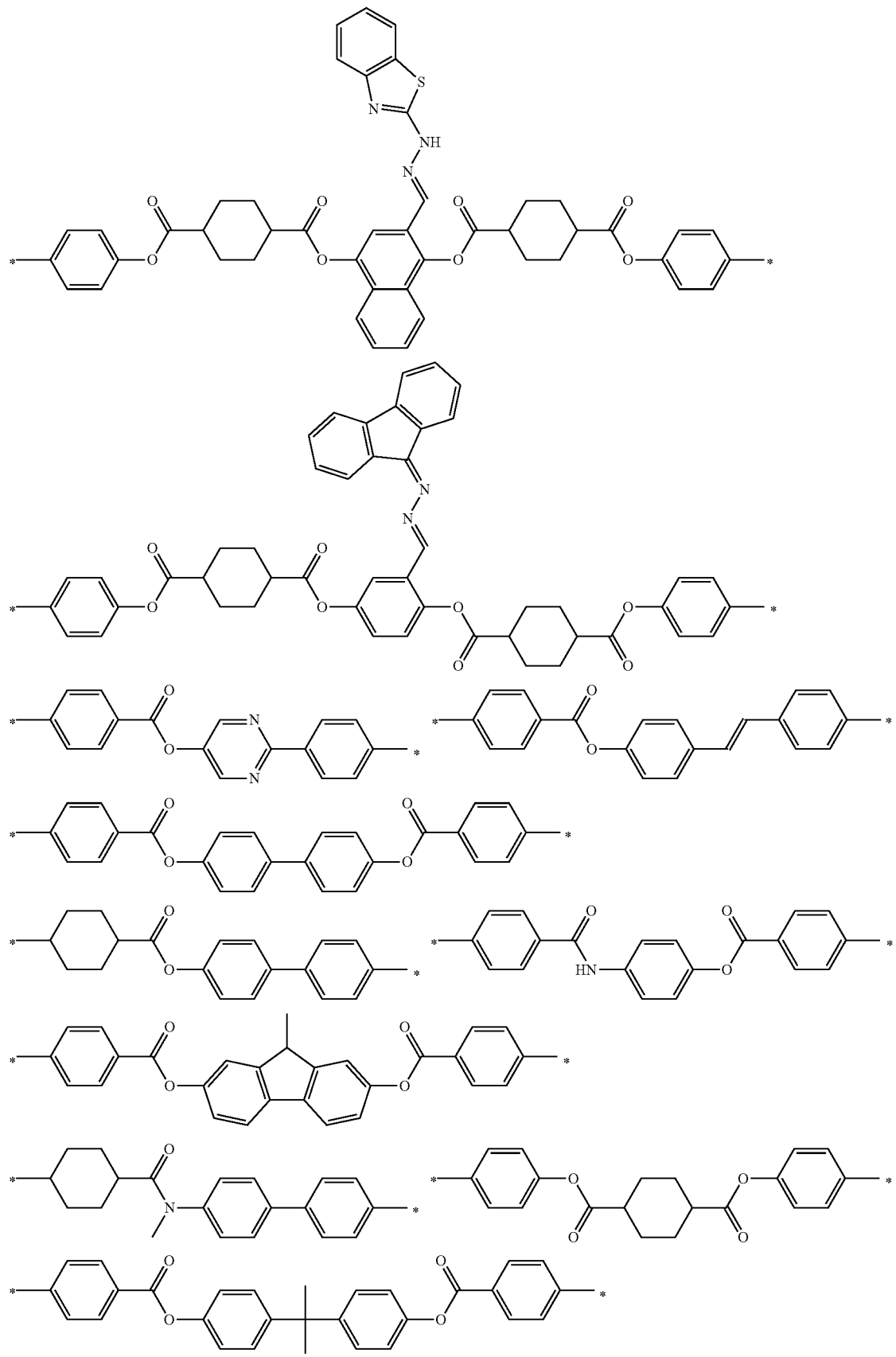

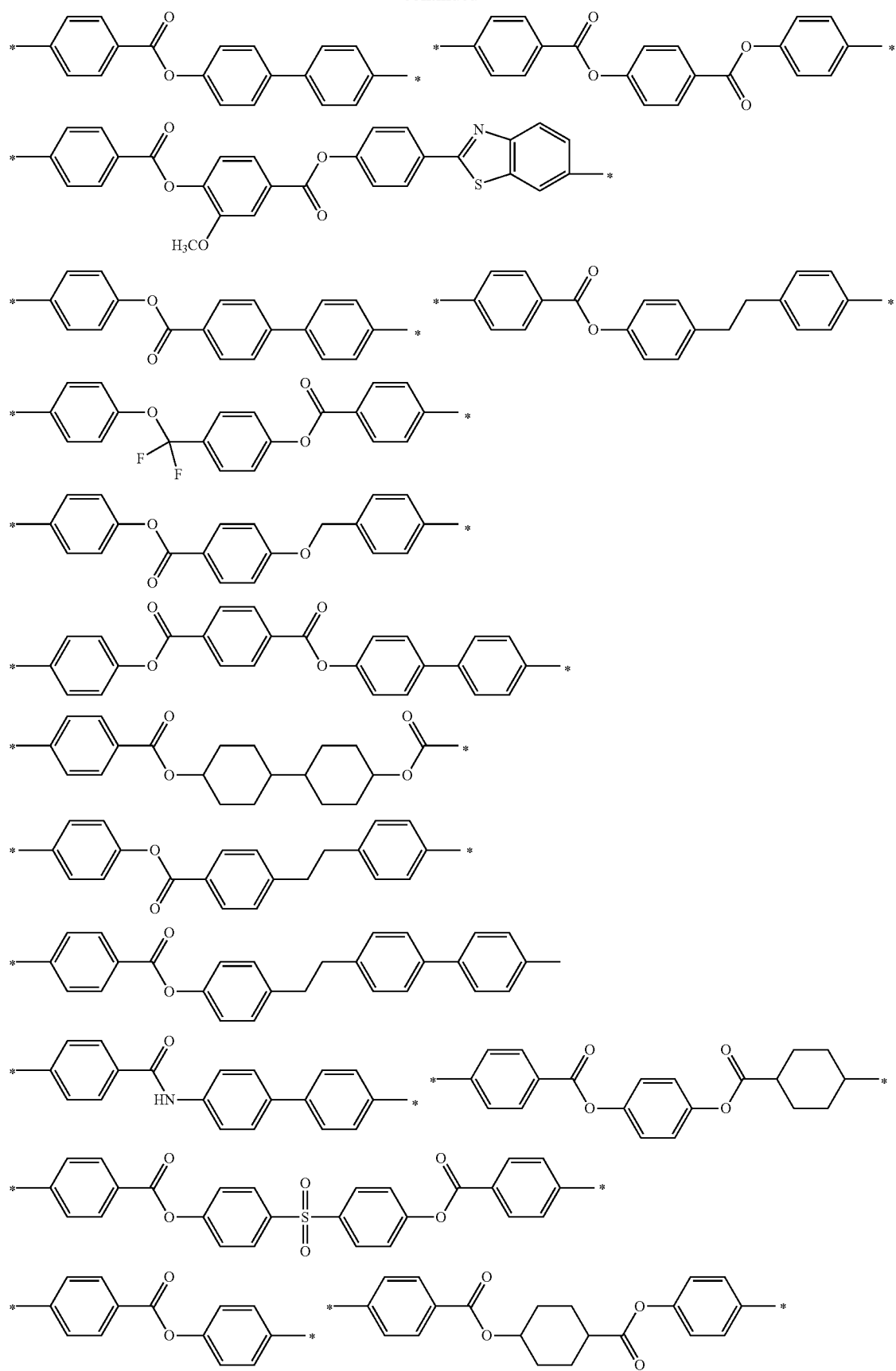

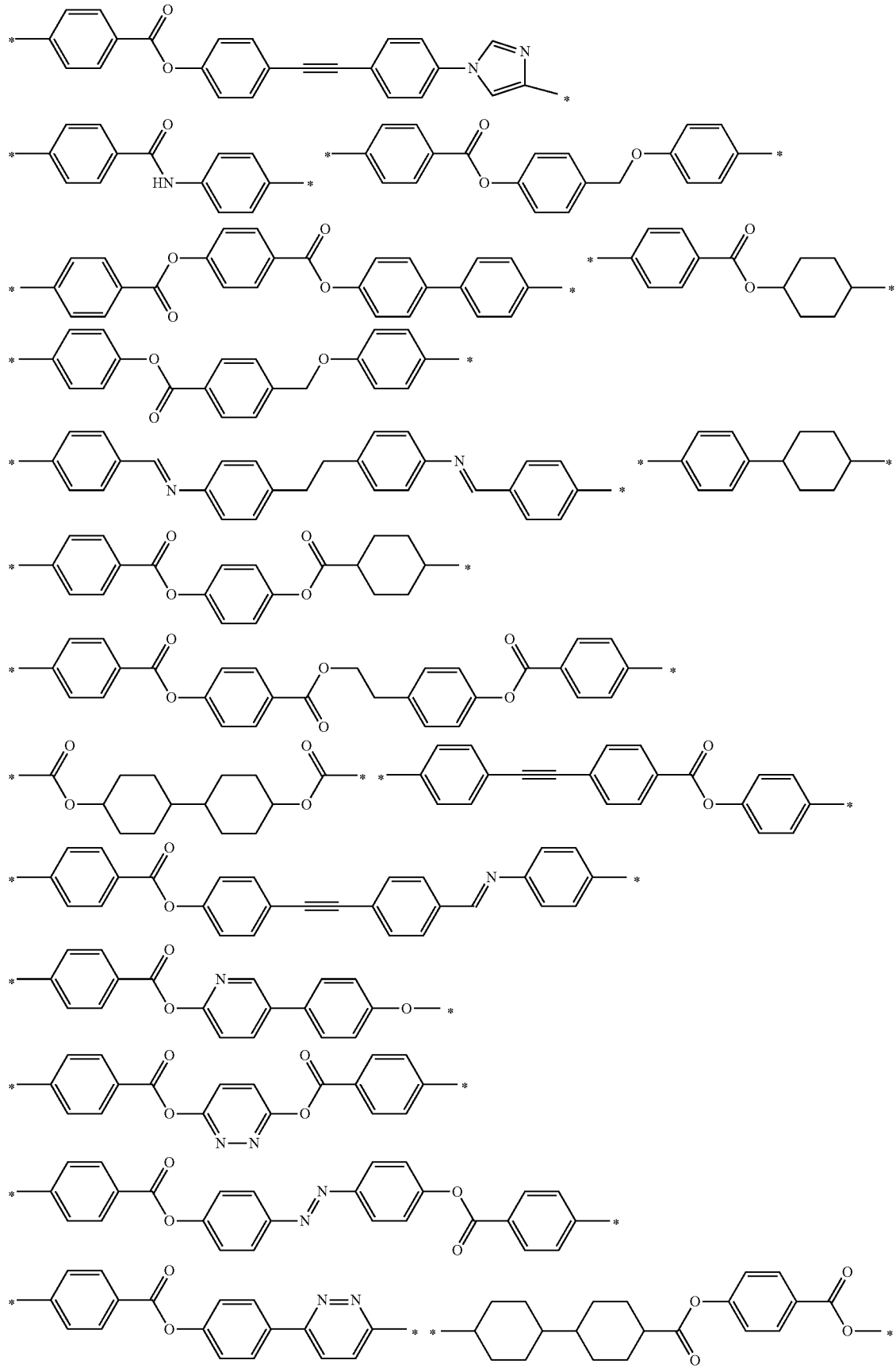

-continued

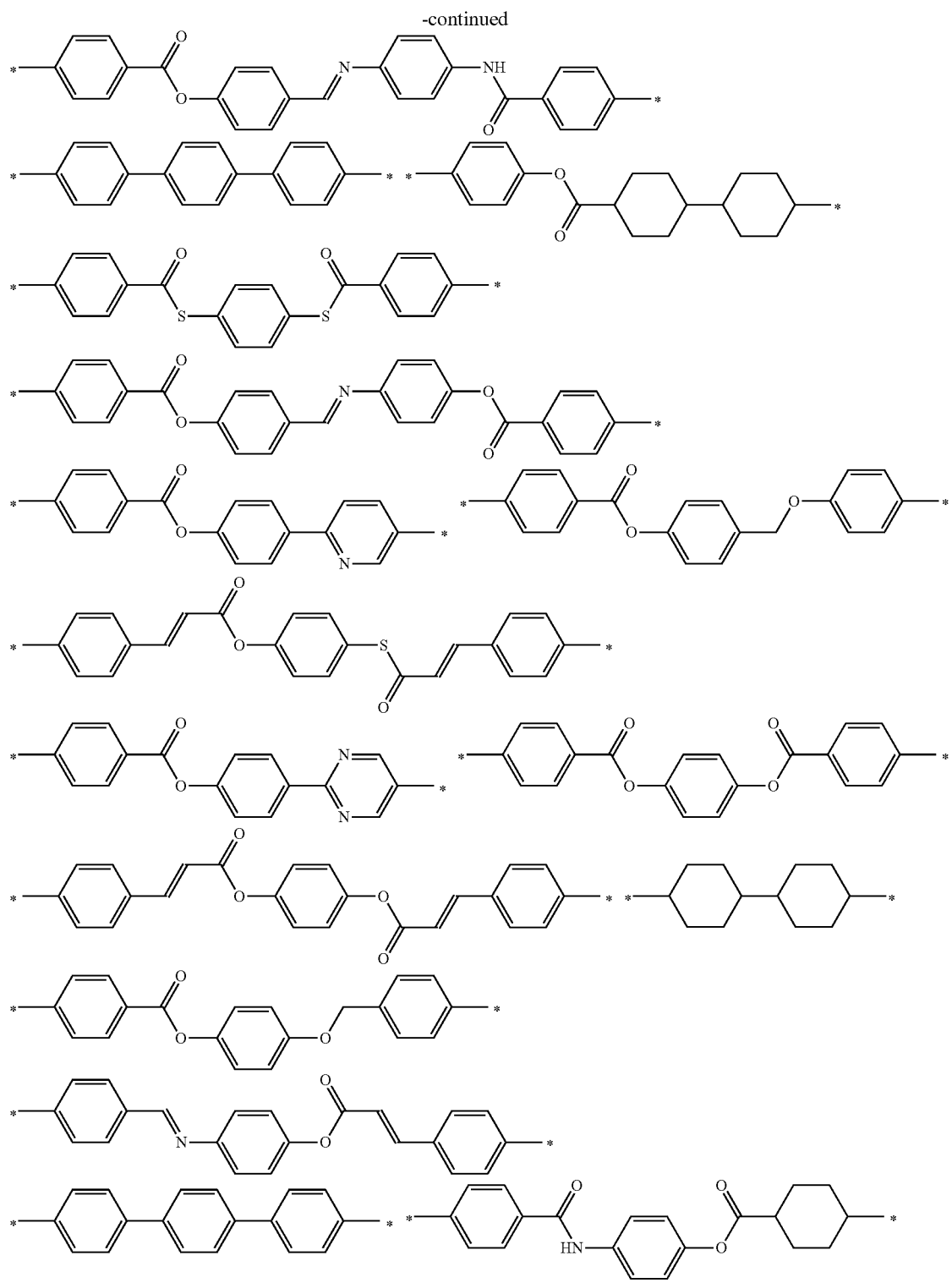

Low-Molecular-Weight Liquid Crystalline Compound

In a case where the liquid crystalline compound represented by Formula (LC) is the low-molecular-weight liquid crystalline compound, examples of preferred aspects of the cyclic structure of the mesogen group MG include a cyclohexylene group, a cyclopentylene group, a phenylene group, a naphthylene group, a fluorene-diyl group, a pyridine-diyl group, a pyridazine-diyl group, a thiophene-diyl group, an oxazole-diyl group, a thiazole-diyl group, and a thienothiophene-diyl group, and the number of cyclic structures is preferably 2 to 10 and more preferably 3 to 7.

Examples of preferred aspects of the substituent W in the mesogen structure include a halogen atom, a halogenated alkyl group, a cyano group, a hydroxy group, a nitro group, a carboxy group, an alkoxy group having 1 to 10 carbon atoms, an alkylcarbonyl group having 1 to 10 carbon atoms, an alkyloxycarbonyl group having 1 to 10 carbon atoms, an alkylcarbonyloxy group having 1 to 10 carbon atoms, an amino group, an alkylamino group having 1 to 10 carbon atoms, an alkylaminocarbonyl group, and a group in which LW in Formula (W1) represents a single bond, SPW represents a divalent spacer group, and Q represents a crosslinkable group represented by any of (P1) to (P30); and as the crosslinkable group, a vinyl group, a butadiene group, a (meth)acryloyl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group is preferable.

Preferred aspects of the divalent spacer groups S1 and S2 are the same as those for SPW described above, and thus the description thereof will not be repeated.

In a case where a low-molecular-weight liquid crystalline compound exhibiting smectic properties is used, the number of carbon atoms in the spacer group (the number of atoms in a case where the carbon atoms are substituted with "SP-C") is preferably 6 or more and more preferably 8 or more.

In a case where the liquid crystalline compound represented by Formula (LC) is the low-molecular-weight liquid crystalline compound, a plurality of low-molecular-weight liquid crystalline compounds may be used in combination, and it is preferable that 2 to 6 kinds of low-molecular-weight liquid crystalline compounds are used in combination, and it is more preferable that 2 to 4 kinds of low-molecular-weight liquid crystalline compounds are used in combination. By using the low-molecular-weight liquid crystalline compounds in combination, solubility can be improved, and the phase transition temperature of the liquid crystal composition can be adjusted.

Specific examples of the low-molecular-weight liquid crystalline compound include compounds represented by Formulae (LC-1) to (LC-77), but the low-molecular-weight liquid crystalline compound is not limited thereto.

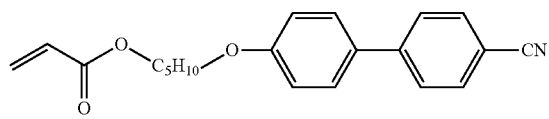

(LC-1)

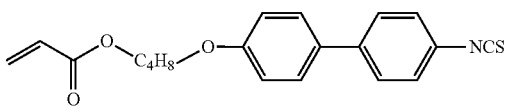

(LC-2)

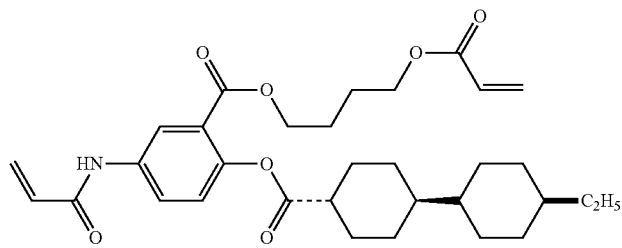

(LC-3)

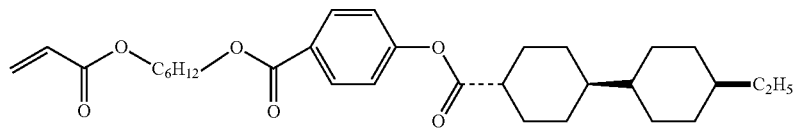

(LC-4)

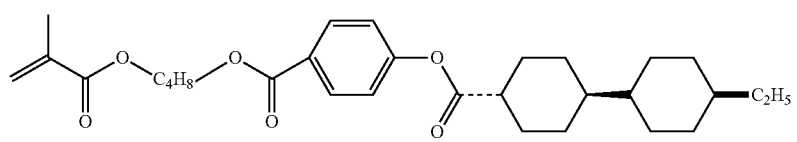

(LC-5)

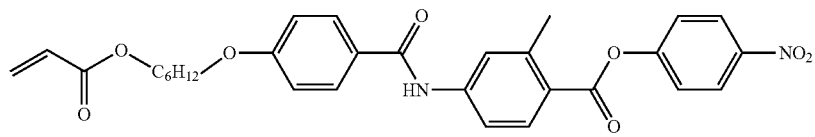

(LC-6)

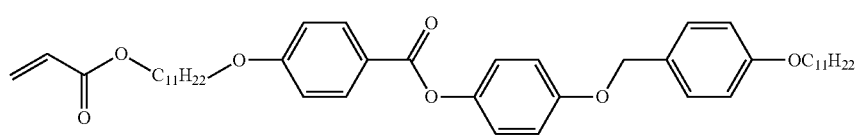

(LC-7)

(LC-8)
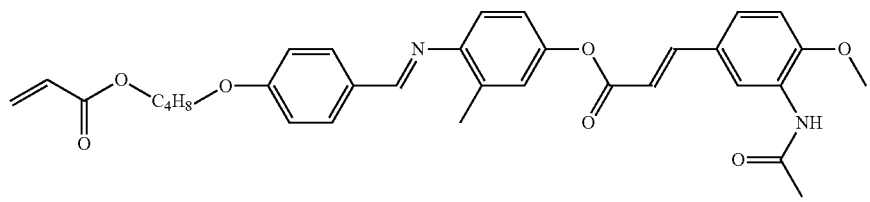
(LC-9)
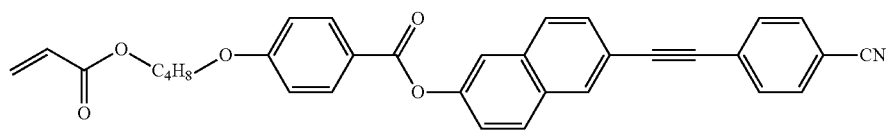
(LC-10)
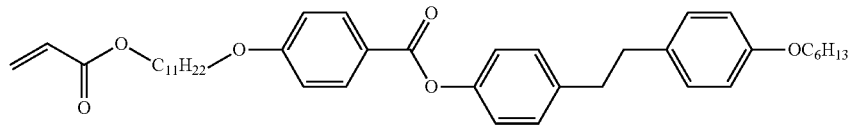
(LC-11)
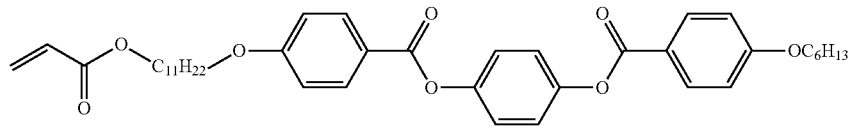
(LC-12)
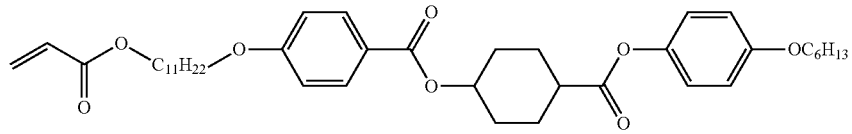
(LC-13)
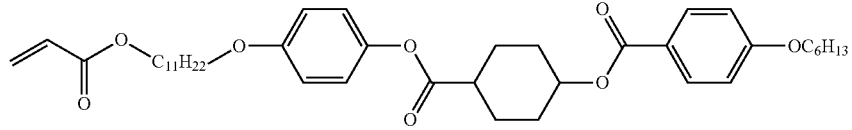
(LC-14)
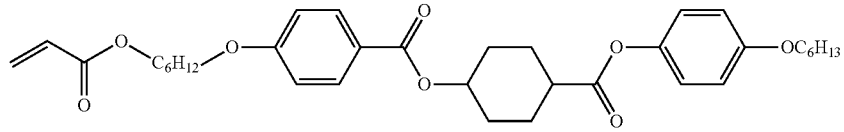
(LC-15)
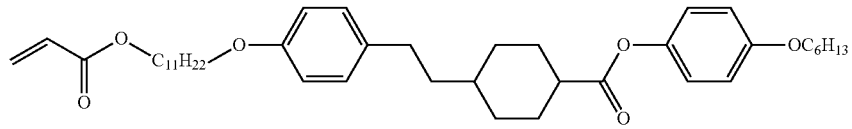
(LC-16)
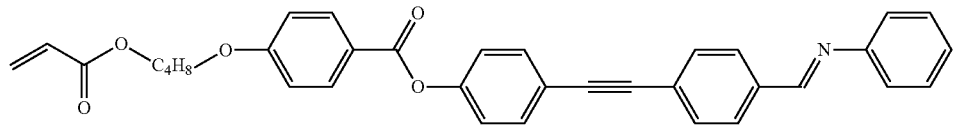
(LC-17)
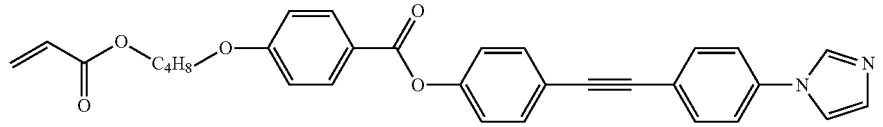
(LC-18)
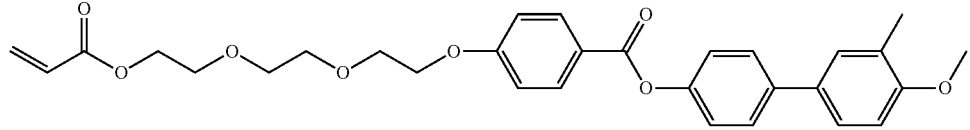

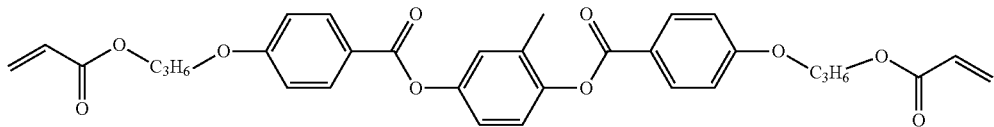
(LC-19)
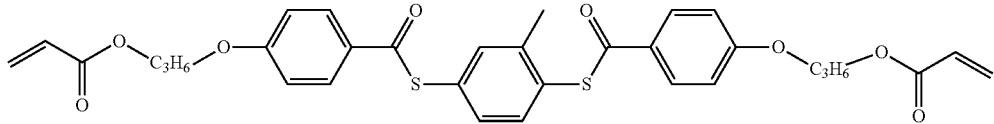
(LC-20)
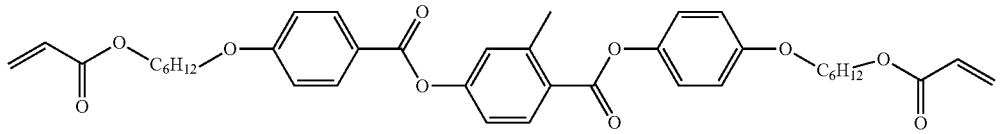
(LC-21)
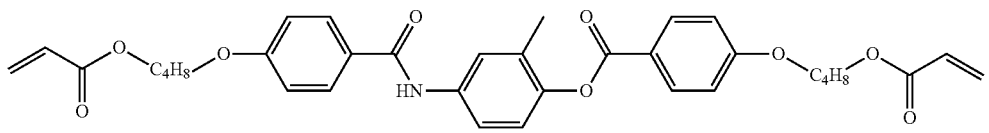
(LC-22)
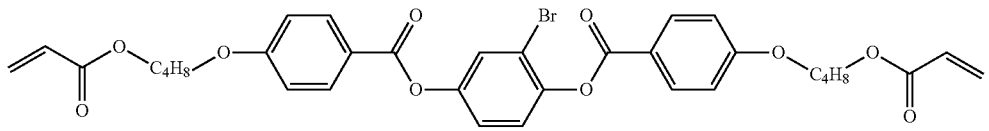
(LC-23)
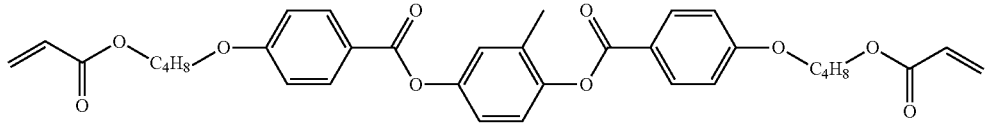
(LC-24)
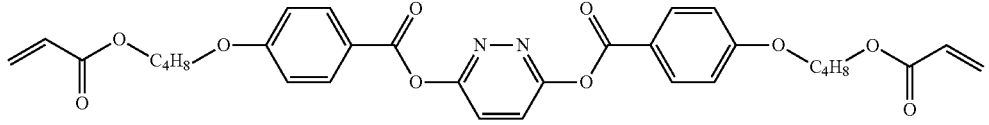
(LC-25)
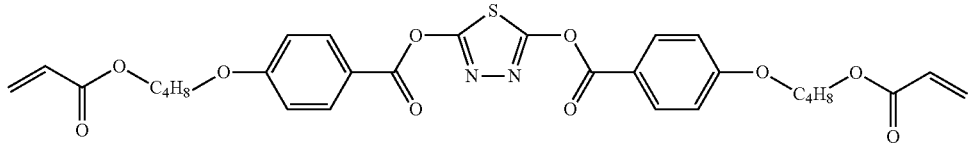
(LC-26)
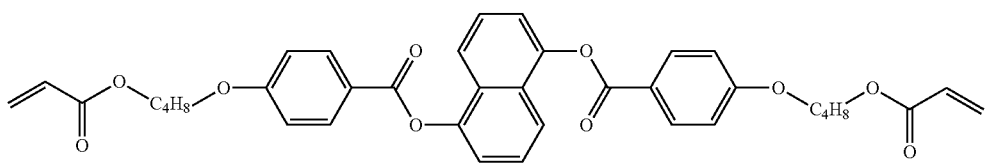
(LC-27)
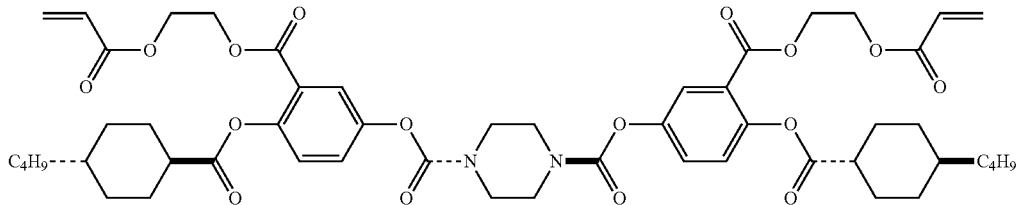
(LC-28)

-continued
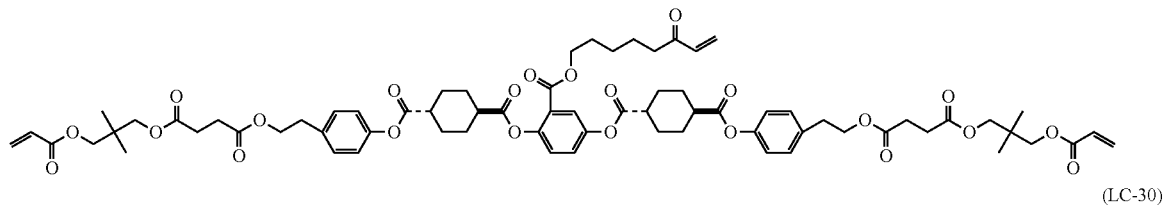
(LC-29)
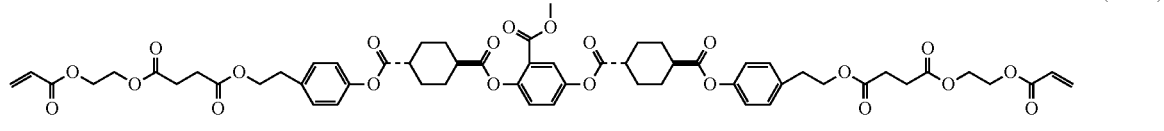
(LC-30)
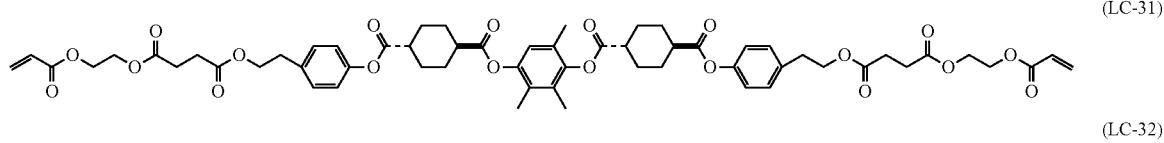
(LC-31)
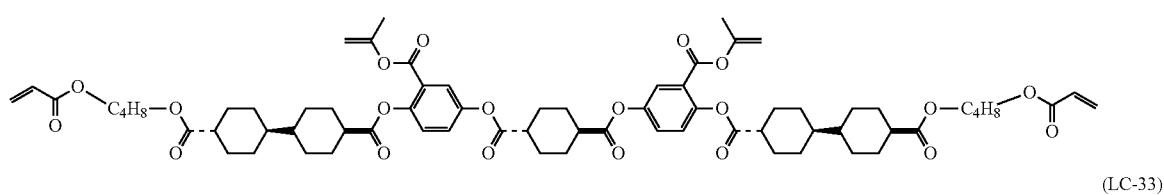
(LC-32)
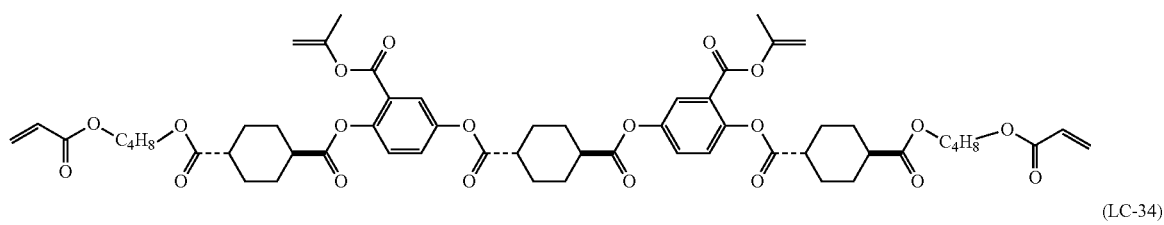
(LC-33)
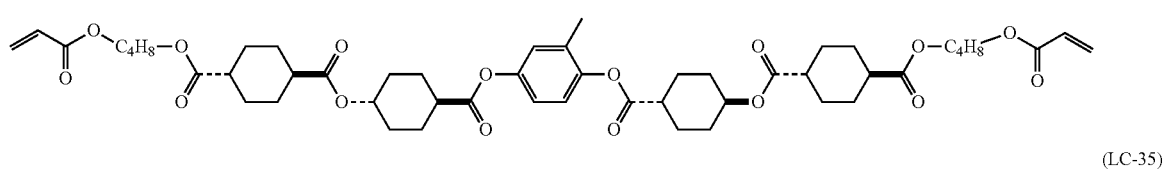
(LC-34)
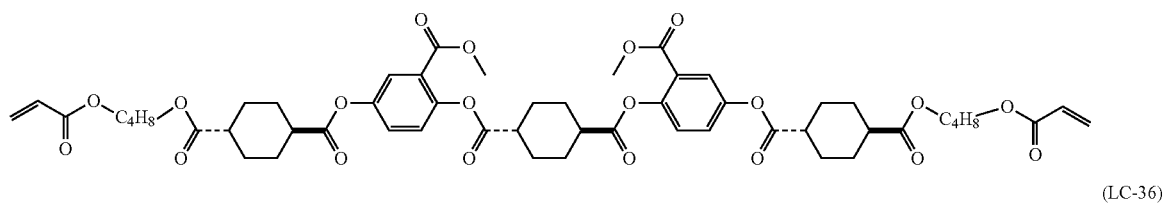
(LC-35)
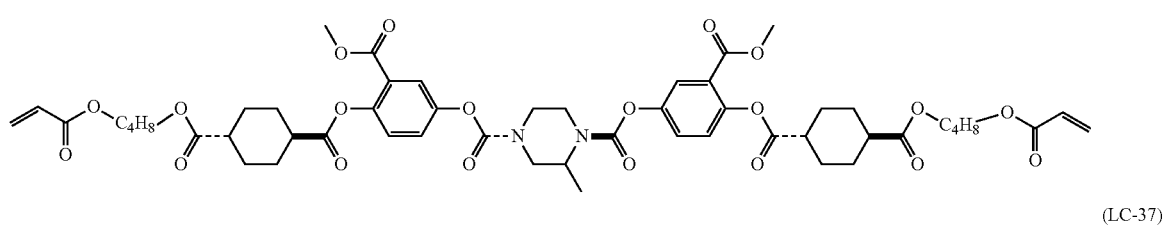
(LC-36)
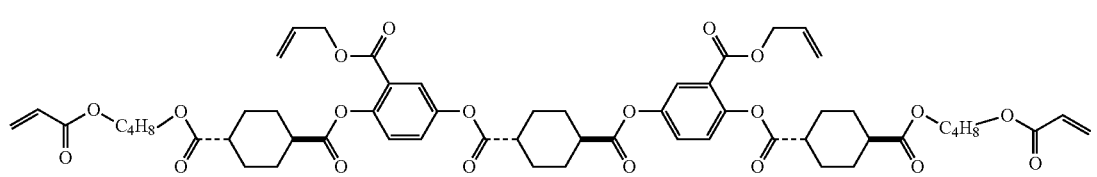
(LC-37)

-continued
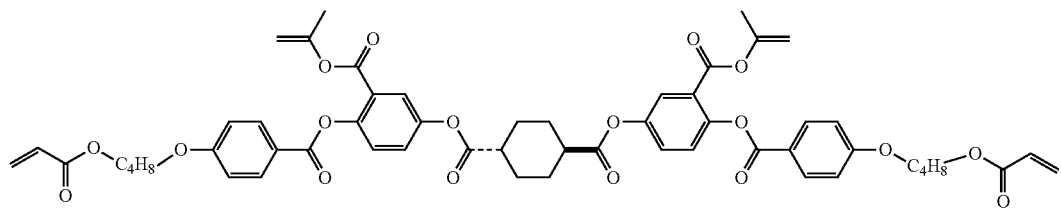
(LC-38)
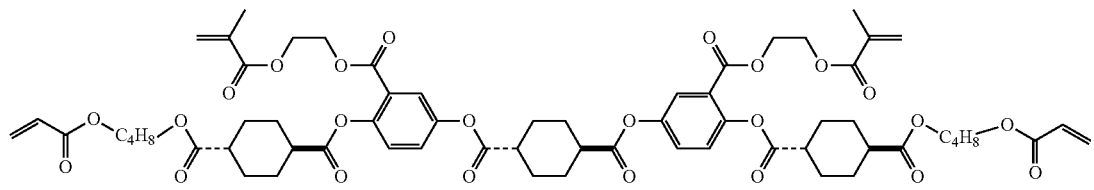
(LC-39)
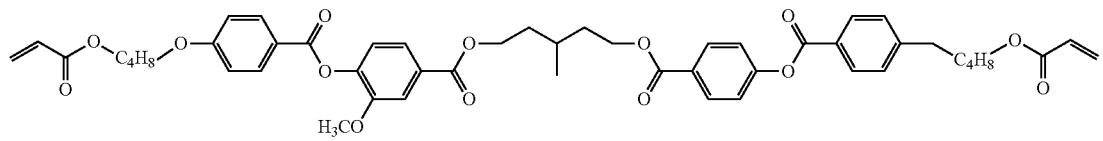
(LC-40)
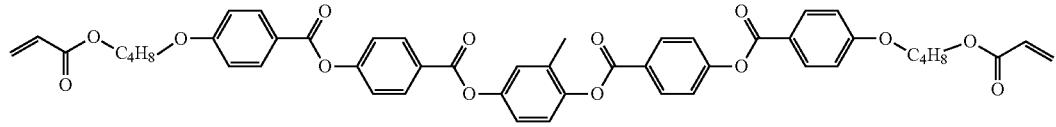
(LC-41)
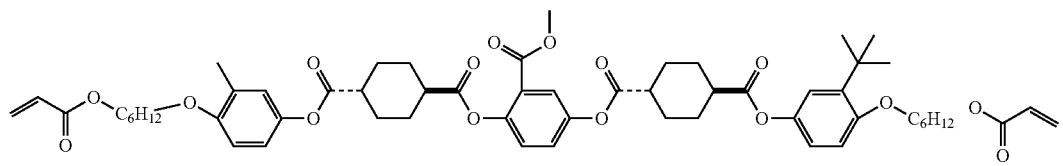
(LC-42)
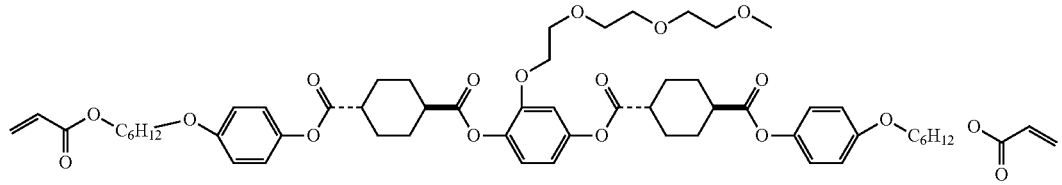
(LC-43)
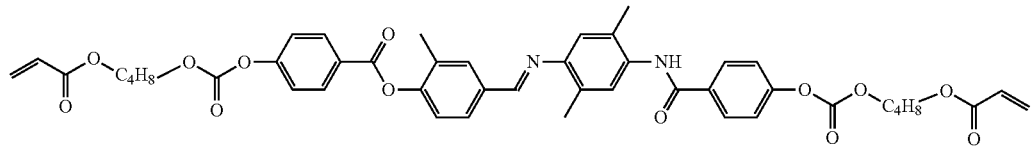
(LC-44)
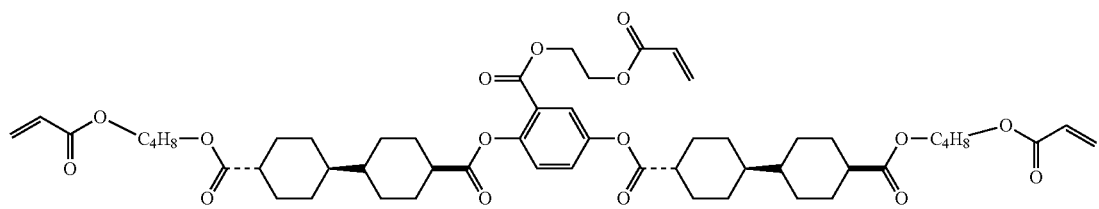
(LC-45)
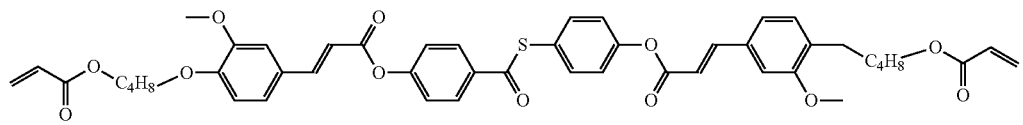
(LC-46)

(LC-47)
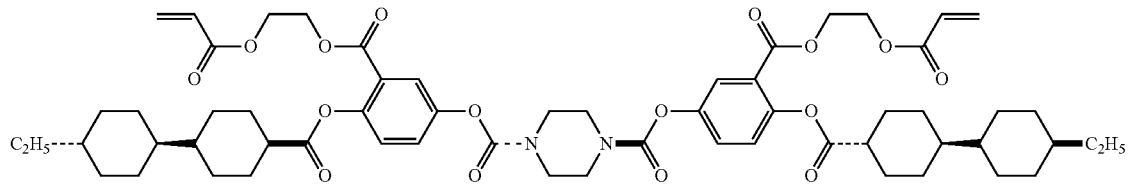
(LC-48)
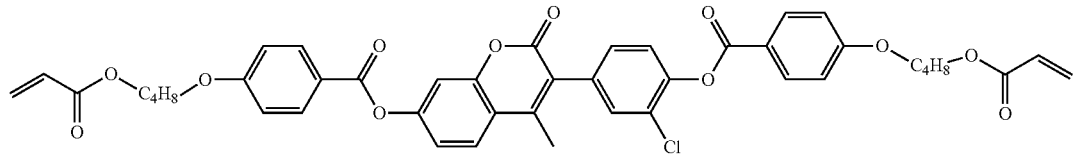
(LC-49)
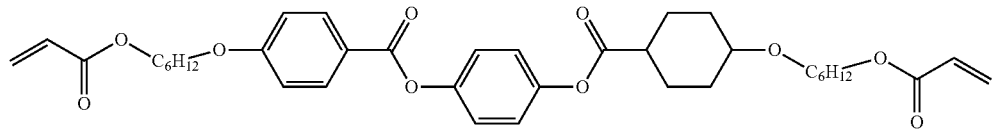
(LC-50)
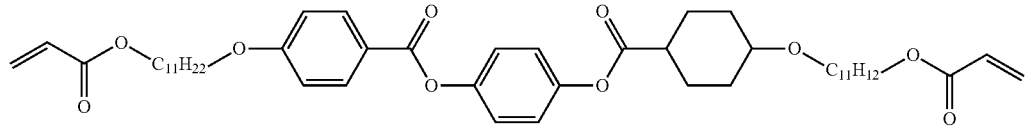
(LC-51)
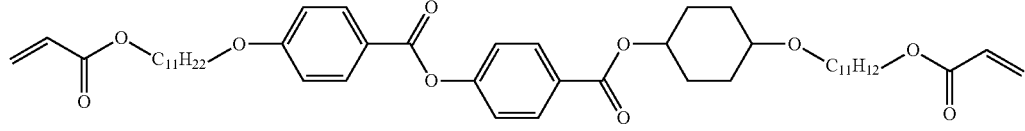
(LC-52)
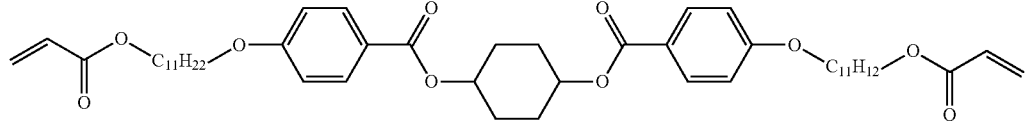
(LC-53)
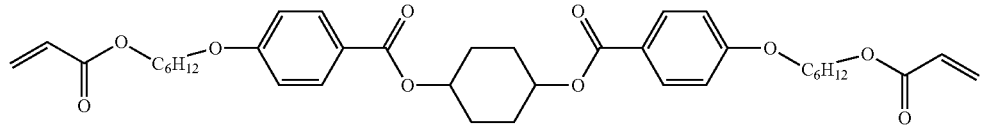
(LC-54)
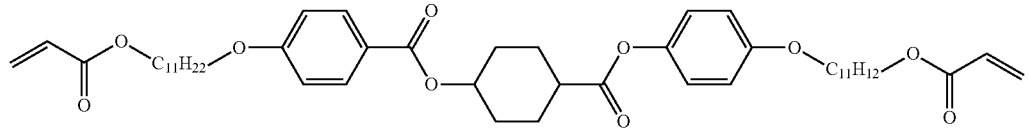
(LC-55)
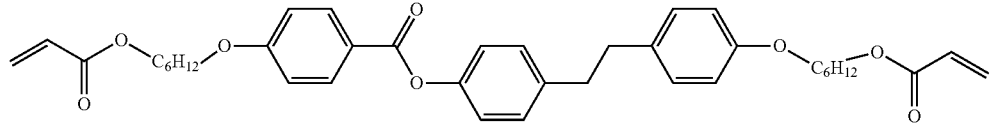
(LC-56)
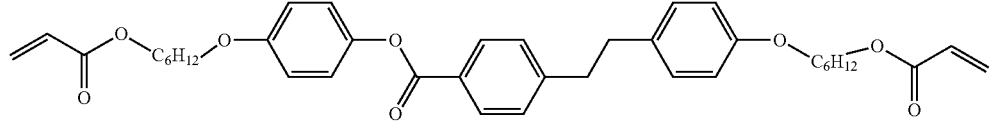

-continued
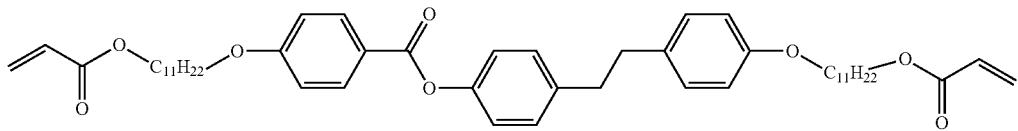
(LC-57)
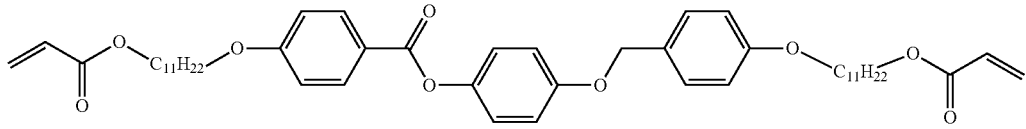
(LC-58)
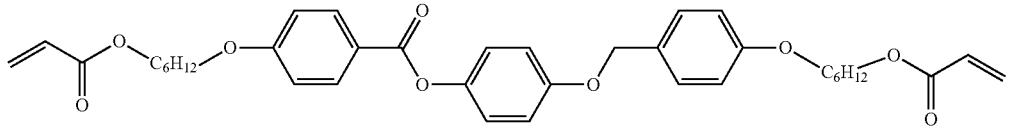
(LC-59)
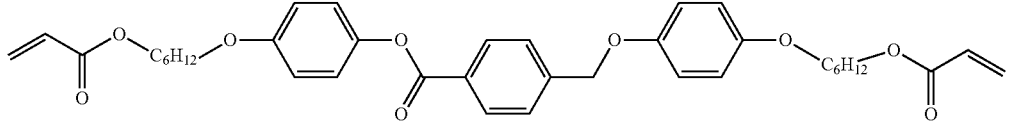
(LC-60)
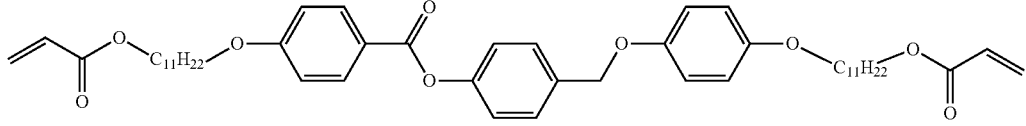
(LC-61)
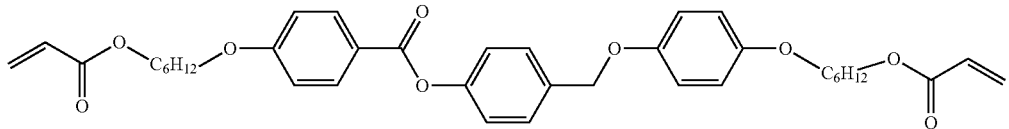
(LC-62)
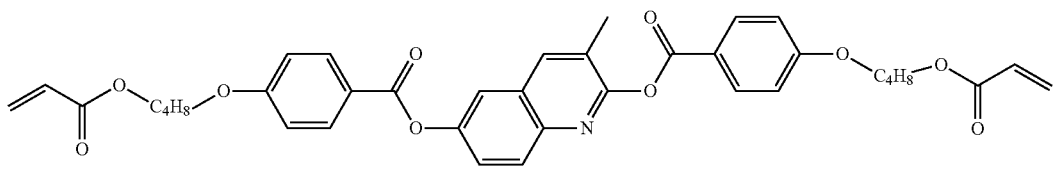
(LC-63)
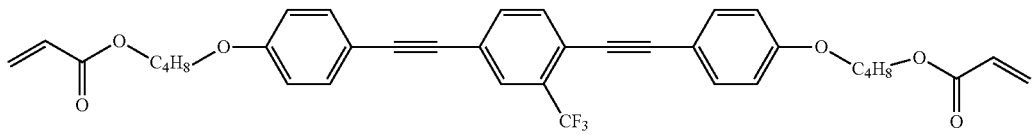
(LC-64)
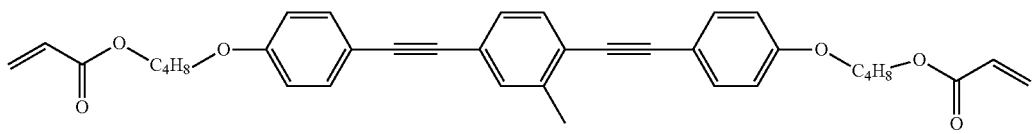
(LC-65)
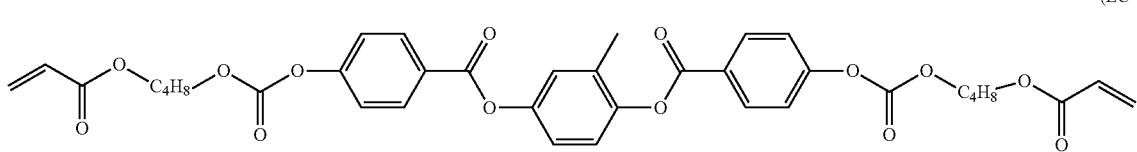
(LC-65)

-continued
(LC-66)
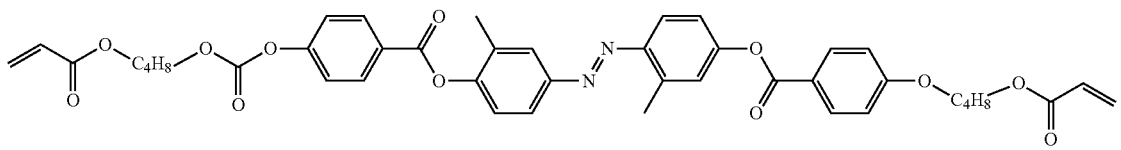
(LC-67)
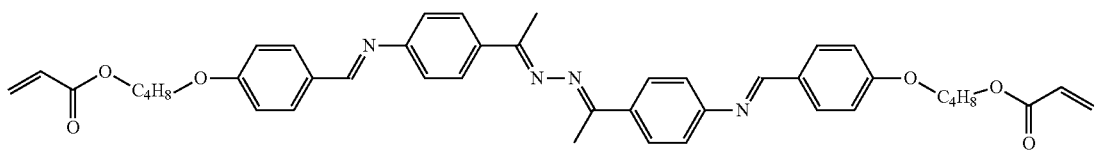
(LC-68)
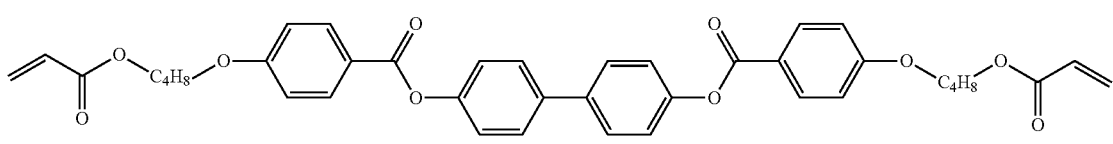
(LC-69)
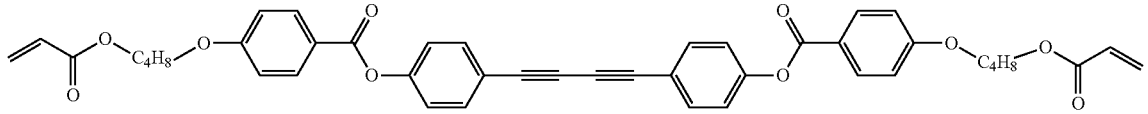
(LC-70)
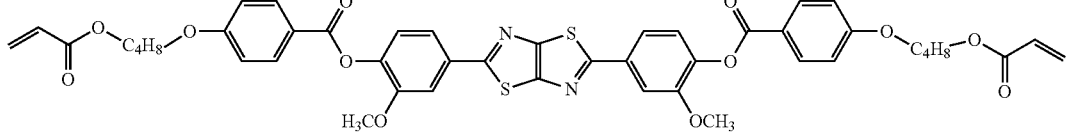
(LC-71)
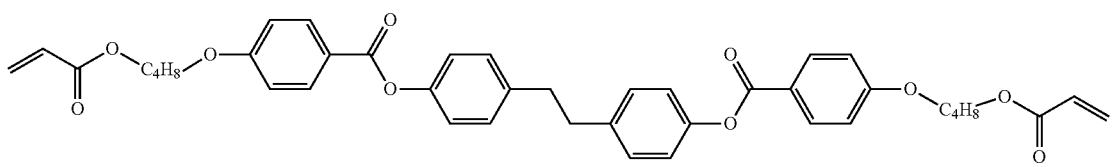
(LC-72)
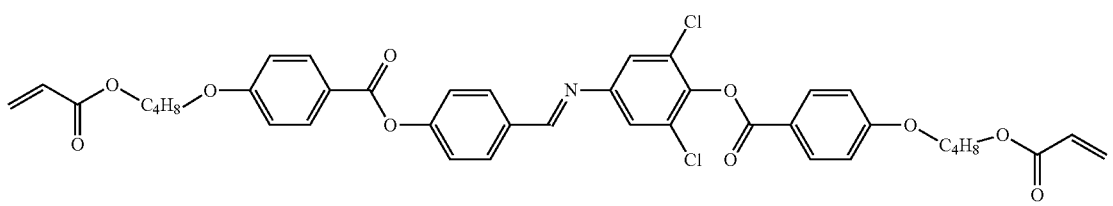
(LC-73)
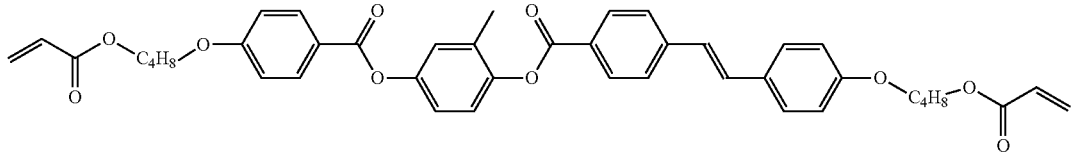
(LC-74)
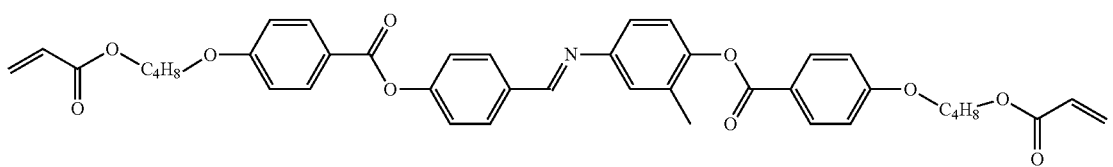

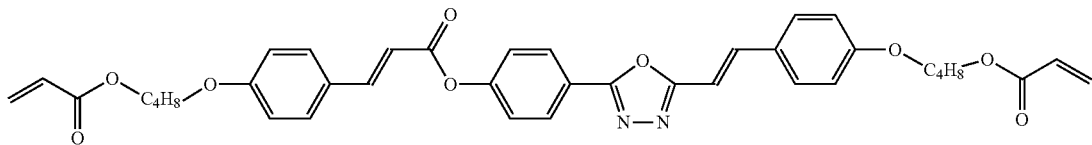
(LC-75)

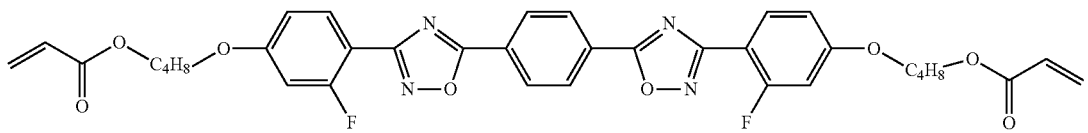
(LC-76)

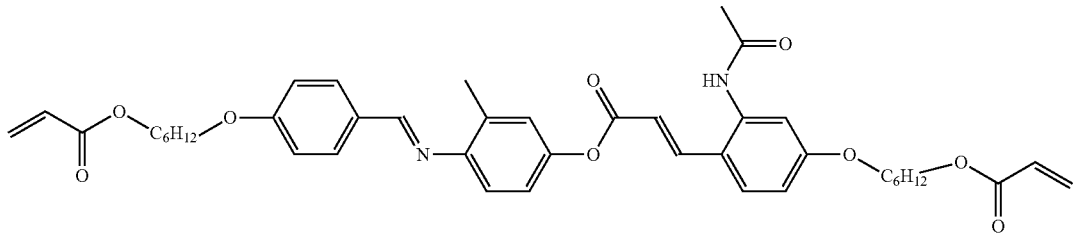
(LC-77)

High-Molecular-Weight Liquid Crystalline Compound

The high-molecular-weight liquid crystalline compound is preferably a homopolymer or a copolymer, including a repeating unit described below, and may be any of a random polymer, a block polymer, a graft polymer, or a star polymer.

Repeating Unit (1)

It is preferable that the high-molecular-weight liquid crystalline compound includes a repeating unit represented by Formula (1) (hereinafter, also referred to as "repeating unit (1)").

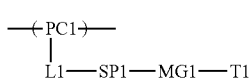
(1)

In Formula (1), PC1 represents a main chain of the repeating unit, L1 represents a single bond or a divalent linking group, SP1 represents a spacer group, MG1 represents the mesogen group MG in Formula (LC) described above, and T1 represents a terminal group.

Examples of the main chain of the repeating unit, represented by PC1, include groups represented by Formulae (P1-A) to (P1-D). Among these, from the viewpoint of diversity and handleability of a monomer serving as a raw material, a group represented by Formula (P1-A) is preferable.

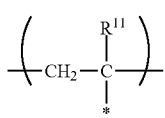
(P1-A)

(P1-B)

$$\left(\begin{array}{c} R^{12} \\ | \\ CH-CH-O \end{array}\right)_{\!\!\overline{\phantom{x}}}$$

(P1-C)

$$\left(\begin{array}{c} R^{13} \\ | \\ CH_2-C-CH_2-O \\ | \\ * \end{array}\right)_{\!\!\overline{\phantom{x}}}$$

(P1-D)

$$\left(\begin{array}{c} R^{14} \\ | \\ O-Si \\ | \\ * \end{array}\right)_{\!\!\overline{\phantom{x}}}$$

In Formulae (P1-A) to (P1-D), "*" represents a bonding position to L1 in Formula (1). In Formulae (P1-A) to (P1-D), $R^{11}$, $R^{12}$, $R^{13}$, and $R^{14}$ each independently represent a hydrogen atom, a halogen atom, a cyano group, an alkyl group having 1 to 10 carbon atoms, or an alkoxy group having 1 to 10 carbon atoms. The above-described alkyl group may be a linear or branched alkyl group, or an alkyl group having a cyclic structure (cycloalkyl group). In addition, the number of carbon atoms in the above-described alkyl group is preferably 1 to 5.

It is preferable that the group represented by Formula (P1-A) is one unit of a partial structure of poly(meth)acrylic acid ester, which is obtained by polymerization of (meth)acrylic acid ester.

It is preferable that the group represented by Formula (P1-B) is an ethylene glycol unit formed by ring-opening polymerization of an epoxy group of a compound having the epoxy group.

It is preferable that the group represented by Formula (P1-C) is a propylene glycol unit formed by ring-opening polymerization of an oxetane group of a compound having the oxetane group.

It is preferable that the group represented by Formula (P1-D) is a siloxane unit of a polysiloxane obtained by polycondensation of a compound having at least one of an alkoxysilyl group or a silanol group. Here, examples of the compound having at least one of an alkoxysilyl group or a silanol group include a compound having a group represented by Formula $SiR^{14}(OR^{15})_2$—. In the formula, $R^{14}$ has the same definition as that for $R^{14}$ in Formula (P1-D), and a plurality of $R^{15}$'s each independently represent a hydrogen atom or an alkyl group having 1 to 10 carbon atoms.

The divalent linking group represented by L1 is the same divalent linking group as LW in Formula (W1) described above, and examples of preferred aspects thereof include —C(O)O—, —OC(O)—, —O—, —S—, —C(O)NR$^{16}$—, —NR$^{16}$C(O)—, —S(O)$_2$—, and —NR$^{16}$R$^{17}$—. In the formulae, $R^{16}$ and $R^{17}$ each independently represent a hydrogen atom or an alkyl group having 1 to 6 carbon atoms, which may have a substituent (for example, the substituent W described above). In the specific examples of the divalent linking group, the bonding site on the left side is bonded to PC1 and the bonding site on the right side is bonded to SP1.

In a case where PC1 represents the group represented by Formula (P1-A), it is preferable that L1 is a group represented by —C(O)O— or —C(O)NR$^{16}$—.

In a case where PC1 represents the group represented by any of Formulae (P1-B) to (P1-D), it is preferable that L1 is a single bond.

The spacer group represented by SP1 represents the same groups as S1 and S2 in Formula (LC) described above, and from the viewpoint of the alignment degree, a group having at least one structure selected from the group consisting of an oxyethylene structure, an oxypropylene structure, a polysiloxane structure, and an alkylene fluoride structure, or a linear or branched alkylene group having 2 to 20 carbon atoms is preferable. However, the above-described alkylene group may include —O—, —S—, —O—CO—, —CO—O—, —O—CO—O—, —O—CNR— (R represents an alkyl group having 1 to 10 carbon atoms), or —S(O)$_2$—.

From the reason of easily expressing liquid crystallinity and availability of raw materials, it is more preferable that the spacer group represented by SP1 is a group having at least one structure selected from the group consisting of an oxyethylene structure, an oxypropylene structure, a polysiloxane structure, and an alkylene fluoride structure.

Here, the oxyethylene structure represented by SP1 is preferably a group represented by *—(CH$_2$—CH$_2$O)$_{n1}$—* is preferable. In the formula, n1 represents an integer of 1 to 20, and * represents a bonding position to L1 or MG1. From the reason that the effect of the present invention is more excellent, n1 is preferably an integer of 2 to 10, more preferably an integer of 2 to 6, and most preferably 2 to 4.

In addition, the oxypropylene structure represented by SP1 is preferably a group represented by *—(CH(CH$_3$)—CH$_2$O)$_{n2}$—*. In the formula, n2 represents an integer of 1 to 3, and * represents a bonding position to L1 or MG1.

In addition, the polysiloxane structure represented by SP1 is preferably a group represented by *—(Si(CH$_3$)$_2$—O)$_{n3}$—*. In the formula, n3 represents an integer of 6 to 10, and * represents a bonding position to L1 or MG1.

In addition, the alkylene fluoride structure represented by SP1 is preferably a group represented by *—(CF$_2$—CF$_2$)$_{n4}$—*. In the formula, n4 represents an integer of 6 to 10, and * represents a bonding position to L1 or MG1.

Examples of the terminal group represented by T1 include a hydrogen atom, a halogen atom, a cyano group, a nitro group, a hydroxy group, —SH, a carboxyl group, a boronic acid group, —SO$_3$H, —PO$_3$H$_2$, —NR$^{11}$R$^{12}$ ($R^{11}$ and $R^{12}$ each independently represent a hydrogen atom, a substituted or unsubstituted alkyl group having 1 to 10 carbon atoms, a cycloalkyl group, or an aryl group), an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an acyloxy group having 1 to 10 carbon atoms, an acylamino group having 1 to 10 carbon atoms, an alkoxycarbonyl group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a crosslinkable group-containing group.

Examples of the above-described crosslinkable group-containing group include -L-CL described above. L represents a single bond or a linking group. Specific examples of the linking group are the same as those for LW and SPW described above. CL represents a crosslinkable group, examples thereof include the group represented by Q1 or Q2 described above, and the above-described group represented by any of Formulae (P1) to (P30) is preferable. In addition, T1 may be a group obtained by combining two or more of these groups.

From the reason that the effect of the present invention is more excellent, T1 is preferably an alkoxy group having 1 to 10 carbon atoms, more preferably an alkoxy group having 1 to 5 carbon atoms, and still more preferably a methoxy group. These terminal groups may be further substituted with the groups or polymerizable groups described in JP2010-244038A.

From the reason that the effect of the present invention is more excellent, the number of atoms in the main chain of T1 is preferably 1 to 20, more preferably 1 to 15, still more preferably 1 to 10, and particularly preferably 1 to 7. In a case where the number of atoms in the main chain of T1 is 20 or less, the alignment degree of the light absorption anisotropic layer is further improved. Here, the "main chain" of T1 means the longest molecular chain bonded to M1, and the number of hydrogen atoms is not included in the number of atoms in the main chain of T1. For example, in a case where T1 is an n-butyl group, the number of atoms in the main chain is 4, and in a case where T1 is an sec-butyl group, the number of atoms in the main chain is 3.

A content of the repeating unit (1) is preferably 40% to 100% by mass and more preferably 50% to 95% by mass with respect to all repeating units (100% by mass) of the high-molecular-weight liquid crystalline compound. In a case where the content of the repeating unit (1) is 40% by mass or more, an excellent light absorption anisotropic layer can be obtained due to favorable aligning properties. In addition, in a case where the content of the repeating unit (1) is 100% by mass or less, an excellent light absorption anisotropic layer can be obtained due to favorable aligning properties.

The high-molecular-weight liquid crystalline compound may include only one of the repeating unit (1), or two or more kinds of the repeating units (1). In a case where the high-molecular-weight liquid crystalline compound includes two or more kinds of repeating units (1), the above-described content of the repeating unit (1) indicates the total content of the repeating units (1).

Log P Value

In Formula (1), a difference ($|\log P_1 - \log P_2|$) between a log P value of PC1, L1, and SP1 (hereinafter, also referred to as "log $P_1$") and a log P value of MG1 (hereinafter, also referred to as "log $P_2$") is 4 or more, and from the viewpoint of further improving the alignment degree of the light absorption anisotropic layer, it is preferably 4.25 or more and more preferably 4.5 or more.

In addition, from the viewpoint of adjusting the liquid crystal phase transition temperature and the synthetic suitability, the upper limit value of the above-described difference is preferably 15 or less, more preferably 12 or less, and still more preferably 10 or less.

Here, the log P value is an index for expressing properties of hydrophilicity and hydrophobicity of a chemical structure, and is also referred to as a hydrophilic-hydrophobic parameter. The log P value can be calculated using software such as ChemBioDraw Ultra or HSPiP (Ver. 4.1.07). In addition, the log P value can be acquired experimentally by the method of the OECD Guidelines for the Testing of Chemicals, Sections 1, Test No. 117, or the like. In the present invention, a value calculated by inputting the structural formula of a compound to HSPiP (Ver. 4.1.07) is adopted as the log P value unless otherwise specified.

The above-described log $P_1$ indicates the log P value of PC1, L1, and SP1 as described above. The expression "log P value of PC1, L1, and SP1" indicates the log P value of a structure in which PC1, L1, and SP1 are integrated, which is not the sum of the log P values of PC1, L1, and SP1. Specifically, the log $P_1$ is calculated by inputting a series of structural formulae of PC1 to SP1 in Formula (1) into the above-described software.

However, in the calculation of the log $P_1$, with regard to a part of the group represented by PC1 in the series of structural formulae of PC1 to SP1, the structure of the group represented by PC1 itself (for example, Formulae (P1-A) to (P1-D) described above) may be used, or a structure of a group which can be PC1 after polymerization of a monomer used to obtain the repeating unit represented by Formula (1) may be used.

Here, specific examples of the latter (the group which can be PC1) are as follows. In a case where PC1 is obtained by polymerization of (meth)acrylic acid ester, PC1 is a group represented by $CH_2=C(R^1)-$ ($R^1$ represents a hydrogen atom or a methyl group). In addition, in a case where PC1 is obtained by polymerization of ethylene glycol, PC1 is ethylene glycol, and in a case where PC1 is obtained by polymerization of propylene glycol, PC1 is propylene glycol. In addition, in a case where PC1 is obtained by condensation polymerization of silanol, PC1 is silanol (a compound represented by Formula $Si(R^2)_3(OH)$; a plurality of $R^2$'s each independently represent a hydrogen atom or an alkyl group, and at least one of the plurality of $R^2$'s represents an alkyl group).

In a case where the above-described difference between log $P_1$ and log $P_2$ is 4 or more, the log $P_1$ may be less than the log $P_2$ or may be more than the log $P_2$.

Here, the log P value of a general mesogen group (the log $P_2$ described above) tends to be in a range of 4 to 6. In a case where the log $P_1$ is less than the log $P_2$, the value of log $P_1$ is preferably 1 or less and more preferably 0 or less. On the other hand, in a case where the log $P_1$ is more than the log $P_2$, the value of log $P_1$ is preferably 8 or more and more preferably 9 or more.

In a case where PC1 in Formula (1) is obtained by polymerization of (meth)acrylic acid ester and the log $P_1$ is less than the log $P_2$, the log P value of SP1 in Formula (1) is preferably 0.7 or less and more preferably 0.5 or less. On the other hand, in a case where PC1 in Formula (1) is obtained by polymerization of (meth)acrylic acid ester and the log $P_1$ is more than the log $P_2$, the log P value of SP1 in Formula (1) is preferably 3.7 or more and more preferably 4.2 or more.

Examples of the structure having a log P value of 1 or less include an oxyethylene structure and an oxypropylene structure. Examples of the structure having a log P value of 6 or more include a polysiloxane structure and an alkylene fluoride structure.

Repeating Units (21) and (22)

From the viewpoint of improving the alignment degree, it is preferable that the high-molecular-weight liquid crystalline compound has a repeating unit having an electron-donating property and/or an electron-withdrawing property at a terminal. More specifically, it is more preferable that the high-molecular-weight liquid crystalline compound includes a repeating unit (21) having a mesogen group and an electron-withdrawing group which is present at the terminal of the mesogen group and has a σp value of more than 0, and a repeating unit (22) having a mesogen group and a group which is present at the terminal of the mesogen group and has a σp value of 0 or less. As described above, in a case where the high-molecular-weight liquid crystalline compound includes the repeating unit (21) and the repeating unit (22), the alignment degree of the light absorption anisotropic layer to be formed using the high-molecular-weight liquid crystalline compound is further improved as compared with a case where the high-molecular-weight liquid crystalline compound has only one of the repeating unit (21) or the repeating unit (22). The details of the reason for this are not clear, but it is presumed as follows.

That is, it is presumed that, since opposite dipole moments generated in the repeating unit (21) and the repeating unit (22) cause intermolecular interactions, an interaction between the mesogen groups in a minor axis direction is strengthened, and an orientation in which the liquid crystals are aligned is more uniform, and as a result, the degree of order of the liquid crystals is considered to be high. Accordingly, it is presumed that the aligning properties of the dichroic substance are enhanced, and thus the alignment degree of the light absorption anisotropic layer to be formed increases.

The repeating units (21) and (22) described above may be the repeating unit represented by Formula (1) described above.

The repeating unit (21) has a mesogen group and an electron-withdrawing group which is present at the terminal of the mesogen group and has a σp value of more than 0.

The above-described electron-withdrawing group is a group which is positioned at the terminal of the mesogen group and has a σp value of more than 0. Examples of the electron-withdrawing group (group having a σp value of more than 0) include a group represented by EWG in Formula (LCP-21) described below, and specific examples thereof are also the same as those described below.

The σp value of the above-described electron-withdrawing group is more than 0, and from the viewpoint of further increasing the alignment degree of the light absorption anisotropic layer, it is preferably 0.3 or more and more preferably 0.4 or more. From the viewpoint that the uniformity of alignment is excellent, the upper limit of the σp value of the above-described electron-withdrawing group is preferably 1.2 or less and more preferably 1.0 or less.

The σp value is a Hammett's substituent constant σp value (also simply referred to as "σp value") and is a parameter showing the intensity of the electron-withdrawing property and the electron-donating property of a substituent, which numerically expresses the effect of the substituent on the acid dissociation equilibrium constant of substituted benzoic acid. The Hammett's substituent constant σp value in the present specification indicates the substituent constant σ in a case where the substituent is positioned at the para-position of benzoic acid.

As the Hammett's substituent constant σp value of each group in the present specification, a value described in the document "Hansch et al., Chemical Reviews, 1991, Vol, 91, No. 2, p. 165 to 195" is adopted. With regard to a group in which the Hammett's substituent constant σp value is not described in the document above, the Hammett's substituent constant σp value can be calculated using software "ACD/Chem Sketch (ACD/Labs 8.00 Release Product Version: 8.08)" based on a difference between the pKa of benzoic acid and the pKa of a benzoic acid derivative having a substituent at the para-position.

The repeating unit (21) is not particularly limited as long as it has, at a side chain thereof, the mesogen group and the electron-withdrawing group which present at the terminal of the mesogen group and has a σp value of more than 0, but from the viewpoint of further increasing the alignment degree of the light absorption anisotropic layer, a repeating unit represented by Formula (LCP-21) is preferable.

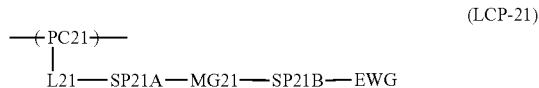

(LCP-21)

In Formula (LCP-21), PC21 represents a main chain of a repeating unit, and more specifically represents the same structure as that for PC1 in Formula (1) described above; L21 represents a single bond or a divalent linking group, and more specifically represents the same structure as that for L1 in Formula (1) described above; SP21A and SP21B each independently represent a single bond or a spacer group, and more specifically represent the same structure as that for SP1 in Formula (1) described above; MG21 represents a mesogen structure, and more specifically represents the mesogen group MG in Formula (LC) described above; and EWG represents an electron-withdrawing group having a σp value of more than 0.

The spacer group represented by SP21A and SP21B represent the same groups as Formulae S1 and S2 described above, and a group having at least one structure selected from the group consisting of an oxyethylene structure, an oxypropylene structure, a polysiloxane structure, and an alkylene fluoride structure, or a linear or branched alkylene group having 2 to 20 carbon atoms is preferable. However, the above-described alkylene group may include —O—, —O—CO—, —CO—O—, or —O—CO—O—.

From the reason of easily expressing liquid crystallinity and availability of raw materials, it is preferable that the spacer group represented by SP1 has at least one structure selected from the group consisting of an oxyethylene structure, an oxypropylene structure, a polysiloxane structure, and an alkylene fluoride structure.

It is preferable that SP21B is a single bond or a linear or branched alkylene group having 2 to 20 carbon atoms. However, the above-described alkylene group may include —O—, —O—CO—, —CO—O—, or —O—CO—O—.

Among these, from the viewpoint of further increasing the alignment degree of the light absorption anisotropic layer, the spacer group represented by SP21B is preferably a single bond. In other words, it is preferable that the repeating unit 21 has a structure in which EWG which the electron-withdrawing group in Formula (LCP-21) is directly linked to MG21 which is the mesogen group in Formula (LCP-21). In this manner, it is presumed that, in a case where the electron-withdrawing group is directly linked to the mesogen group, the intermolecular interaction due to an appropriate dipole moment works more effectively in the high-molecular-weight liquid crystalline compound, and the orientation in which the liquid crystals are aligned is more uniform, and as a result, the degree of order of the liquid crystals and the alignment degree are considered to be high.

EWG represents an electron-withdrawing group having a σp value of more than 0. Examples of the electron-withdrawing group having a σp value of more than 0 include an ester group (specifically, a group represented by *—C(O)O—$R^E$), a (meth)acryloyl group, a (meth)acryloyloxy group, a carboxy group, a cyano group, a nitro group, a sulfo group, —S(O)(O)—$OR^E$, —S(O)(O)—$R^E$, —O—S(O)(O)—$R^E$, an acyl group (specifically, a group represented by *—C(O)$R^E$), an acyloxy group (specifically, a group represented by *—OC(O)$R^E$), an isocyanate group (—N=C(O)), *—C(O)N($R^F$)$_2$, a halogen atom, and an alkyl group substituted with any of these groups (preferably having 1 to 20 carbon atoms). In each of the above-described groups, * represents a bonding position to SP21B. $R^E$ represents an alkyl group having 1 to 20 carbon atoms (preferably 1 to 4 carbon atoms and more preferably 1 or 2 carbon atoms). $R^F$'s each independently represents a hydrogen atom or an alkyl group having 1 to 20 carbon atoms (preferably 1 to 4 carbon atoms and more preferably 1 or 2 carbon atoms).

Among the above-described groups, from the viewpoint of further exhibiting the effect of the present invention, it is preferable that EWG is a group represented by *—C(O)O—$R^E$, a (meth)acryloyloxy group, a cyano group, or a nitro group.

From the viewpoint that the high-molecular-weight liquid crystalline compound and the dichroic substance can be uniformly aligned while maintaining a high alignment degree of the light absorption anisotropic layer, a content of the repeating unit (21) is preferably 60% by mass or less, more preferably 50% by mass or less, and still more preferably 45% by mass or less with respect to all repeating units (100% by mass) of the high-molecular-weight liquid crystalline compound.

From the viewpoint of further exhibiting the effect of the present invention, the lower limit of the content of the repeating unit (21) is preferably 1% by mass or more and more preferably 3% by mass or more with respect to all repeating units (100% by mass) of the high-molecular-weight liquid crystalline compound.

In the present invention, the content of each repeating unit included in the high-molecular-weight liquid crystalline compound is calculated based on the charged amount (mass) of each monomer used for obtaining each repeating unit.

The high-molecular-weight liquid crystalline compound may include only one of the repeating unit (21), or two or more kinds of the repeating units (21). In a case where the high-molecular-weight liquid crystalline compound includes two or more kinds of repeating units (21), there is an advantage in that solubility of the high-molecular-weight liquid crystalline compound in a solvent is improved and the liquid crystal phase transition temperature is easily adjusted. In the case where the high-molecular-weight liquid crystalline compound includes two or more kinds of repeating units (21), it is preferable that the total amount thereof is within the above-described range.

In the case where the high-molecular-weight liquid crystalline compound includes two or more kinds of repeating units (21), a repeating unit (21) which does not include a crosslinkable group in EWG and a repeating unit (21) which includes a polymerizable group in EWG may be used in combination. In this manner, curing properties of the light absorption anisotropic layer are further improved. As the crosslinkable group, a vinyl group, a butadiene group, a (meth)acryloyl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group is preferable.

In this case, from the viewpoint of balance between the curing properties and the alignment degree of the light absorption anisotropic layer, a content of the repeating unit (21) including a polymerizable group in EWG is preferably 1% to 30% by mass with respect to all repeating units (100% by mass) of the high-molecular-weight liquid crystalline compound.

Hereinafter, examples of the repeating unit (21) are shown below, but the repeating unit (21) is not limited to the following repeating units.

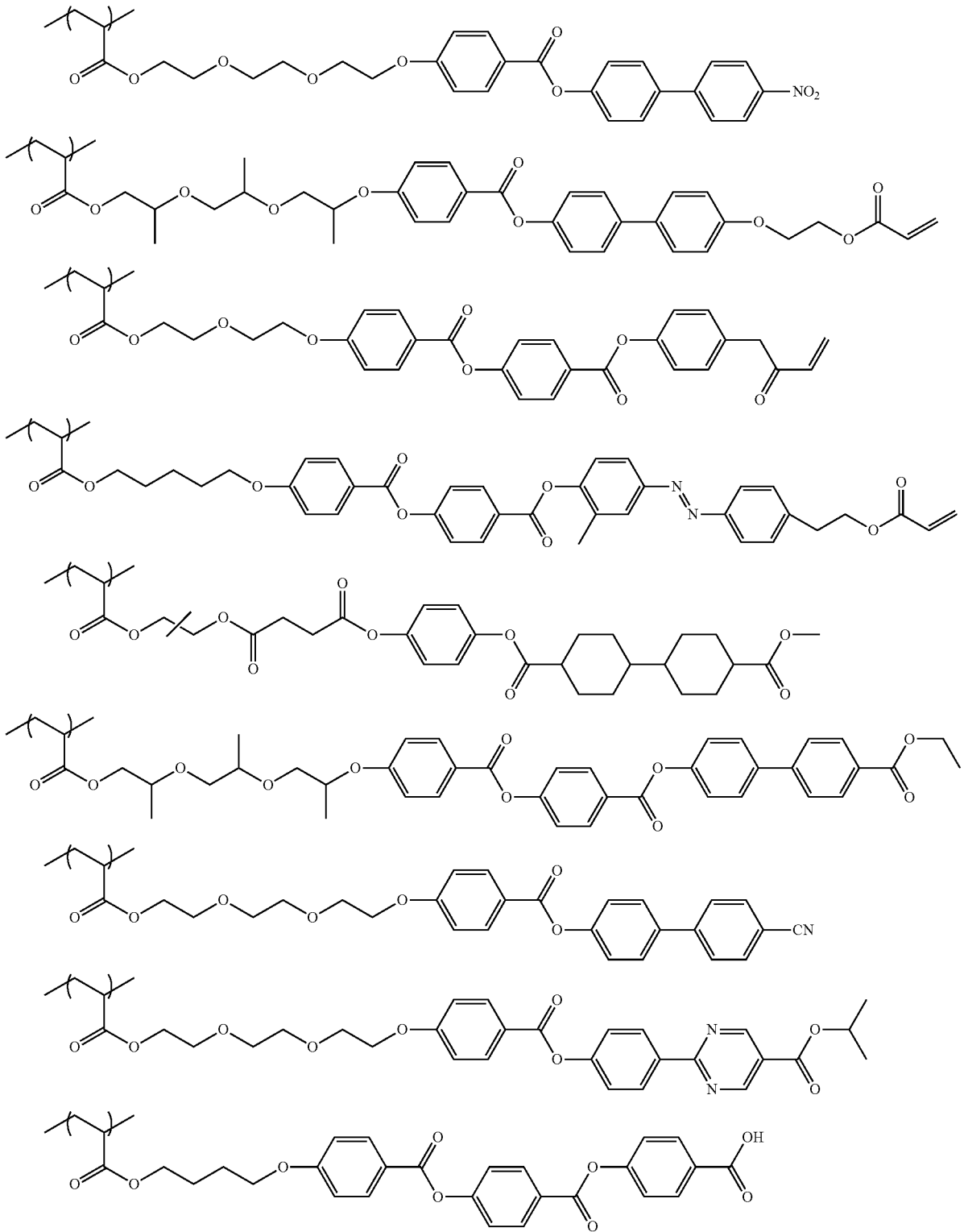

-continued
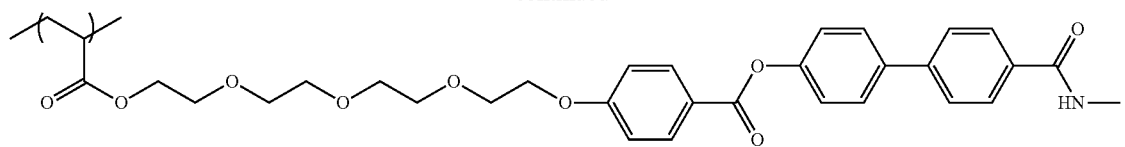
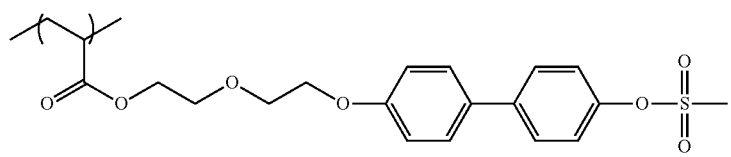
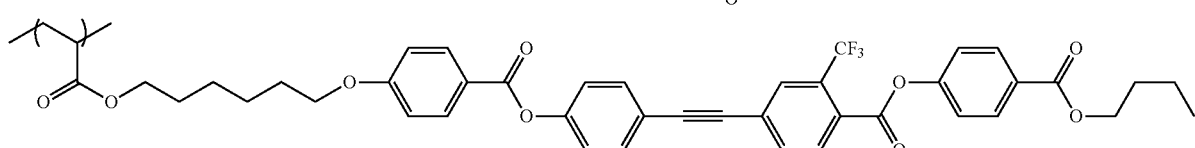
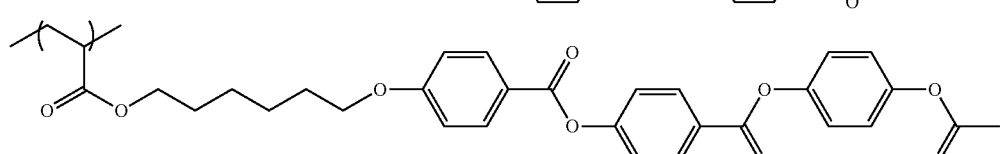
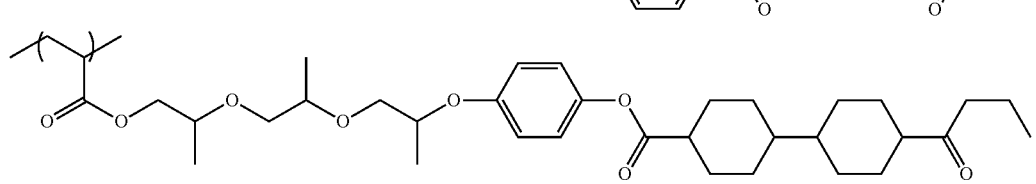
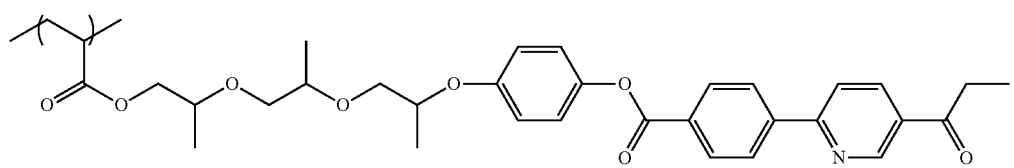
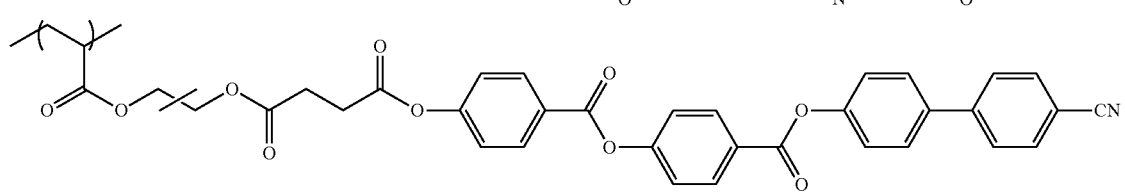
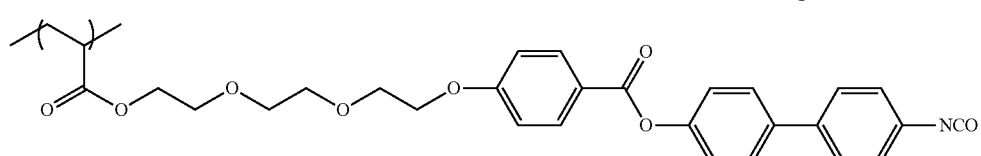
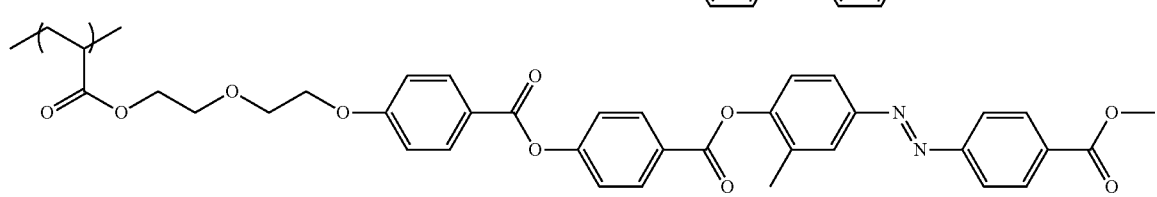
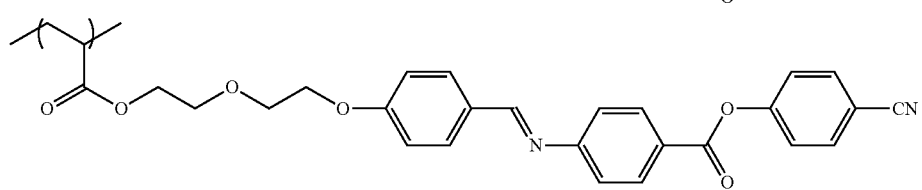

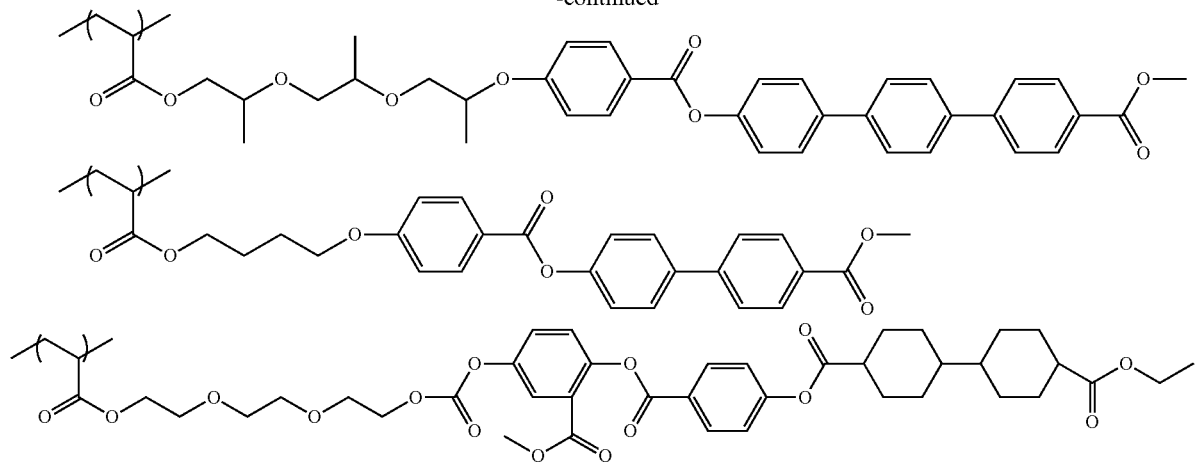

As a result of intensive studies on composition (content ratio) and electron-donating property and electron-withdrawing property of the terminal groups in the repeating unit (21) and the repeating unit (22), the present inventors have found that the alignment degree of the light absorption anisotropic layer is further increased by decreasing the content ratio of the repeating unit (21) in a case where the electron-withdrawing property of the electron-withdrawing group of the repeating unit (21) is high (that is, in a case where the σp value is large) and that the alignment degree of the light absorption anisotropic layer is further increased by increasing the content ratio of the repeating unit (21) in a case where the electron-withdrawing property of the electron-withdrawing group of the repeating unit (21) is low (that is, in a case where the σp value is close to 0).

The details of the reason for this are not clear, but it is presumed as follows. That is, it is presumed that, since the intermolecular interaction due to an appropriate dipole moment works in the high-molecular-weight liquid crystalline compound, the orientation in which the liquid crystals are aligned is more uniform, and as a result, the degree of order of the liquid crystals and the alignment degree of the light absorption anisotropic layer are considered to be high.

Specifically, the product of the σp value of the above-described electron-withdrawing group (EWG in Formula (LCP-21)) in the repeating unit (21) and the content ratio (on a mass basis) of the repeating unit (21) to the high-molecular-weight liquid crystalline compound is preferably 0.020 to 0.150, more preferably 0.050 to 0.130, and particularly preferably 0.055 to 0.125. In a case where the above-described product is within the above-described range, the alignment degree of the light absorption anisotropic layer is further increased.

The repeating unit (22) has a mesogen group and a group which is present at the terminal of the mesogen group and has a σp value of 0 or less. In a case where the high-molecular-weight liquid crystalline compound has the repeating unit (22), the high-molecular-weight liquid crystalline compound and the dichroic substance can be uniformly aligned.

The mesogen group is a group representing a main skeleton of a liquid crystal molecule which contributes to liquid crystal formation, the details thereof are as described in MG of Formula (LCP-22) described below, and specific examples thereof are also the same as described below.

The above-described group is positioned at the terminal of the mesogen group and has a σp value of 0 or less. Examples of the above-described group (a group having a σp value of 0 or less) include a hydrogen atom having a σp value of 0, and a group (electron-donating group) which has a σp value of less than 0 and is represented by T22 in Formula (LCP-22) described below. Among the above-described groups, specific examples of the group (electron-donating group) having a σp value of less than 0 are the same as those for T22 in Formula (LCP-22) described below.

The σp value of the above-described group is 0 or less, and from the viewpoint that the uniformity of alignment is more excellent, it is preferably less than 0, more preferably −0.1 or less, and particularly preferably −0.2 or less. The lower limit value of the σp value of the above-described group is preferably −0.9 or more and more preferably −0.7 or more.

The repeating unit (22) is not particularly limited as long as it has, at a side chain thereof, the mesogen group and the group which is present at the terminal of the mesogen group and has a σp value of 0 or less, and from the viewpoint of further increasing the uniformity of alignment of liquid crystal, a repeating unit represented by Formula (PCP-22), which does not correspond to the above-described repeating unit represented by Formula (LCP-21), is preferable.

(LCP-22)

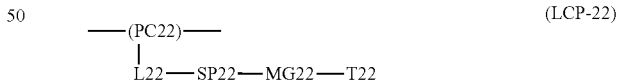

In Formula (LCP-22), PC22 represents a main chain of the repeating unit, and more specifically represents the same structure as that for PC1 in Formula (1) described above; L22 represents a single bond or a divalent linking group, and more specifically represents the same structure as that for L1 in Formula (1) described above; SP22 represents a spacer group, and more specifically represents the same structure as that for SP1 in Formula (1) described above; MG22 represents a mesogen structure, and more specifically represents the same structure as the mesogen group MG in Formula (LC) described above; and T22 represents an electron-donating group having a Hammett's substituent constant σp value of less than 0.

T22 represents an electron-donating group having a σp value of less than 0. Examples of the electron-donating group having a σp value of less than 0 include a hydroxy group, an alkyl group having 1 to 10 carbon atoms, an alkoxy group having 1 to 10 carbon atoms, and an alkylamino group having 1 to 10 carbon atoms.

In a case where the number of atoms in the main chain of T22 is 20 or less, the alignment degree of the light absorption anisotropic layer is further improved. Here, the "main chain" of T22 means the longest molecular chain bonded to MG22, and the number of hydrogen atoms is not included in the number of atoms in the main chain of T22. For example, in a case where T22 is an n-butyl group, the number of atoms in the main chain is 4, and in a case where T22 is an sec-butyl group, the number of atoms in the main chain is 3.

Hereinafter, examples of the repeating unit (22) are shown below, but the repeating unit (22) is not limited to the following repeating units.

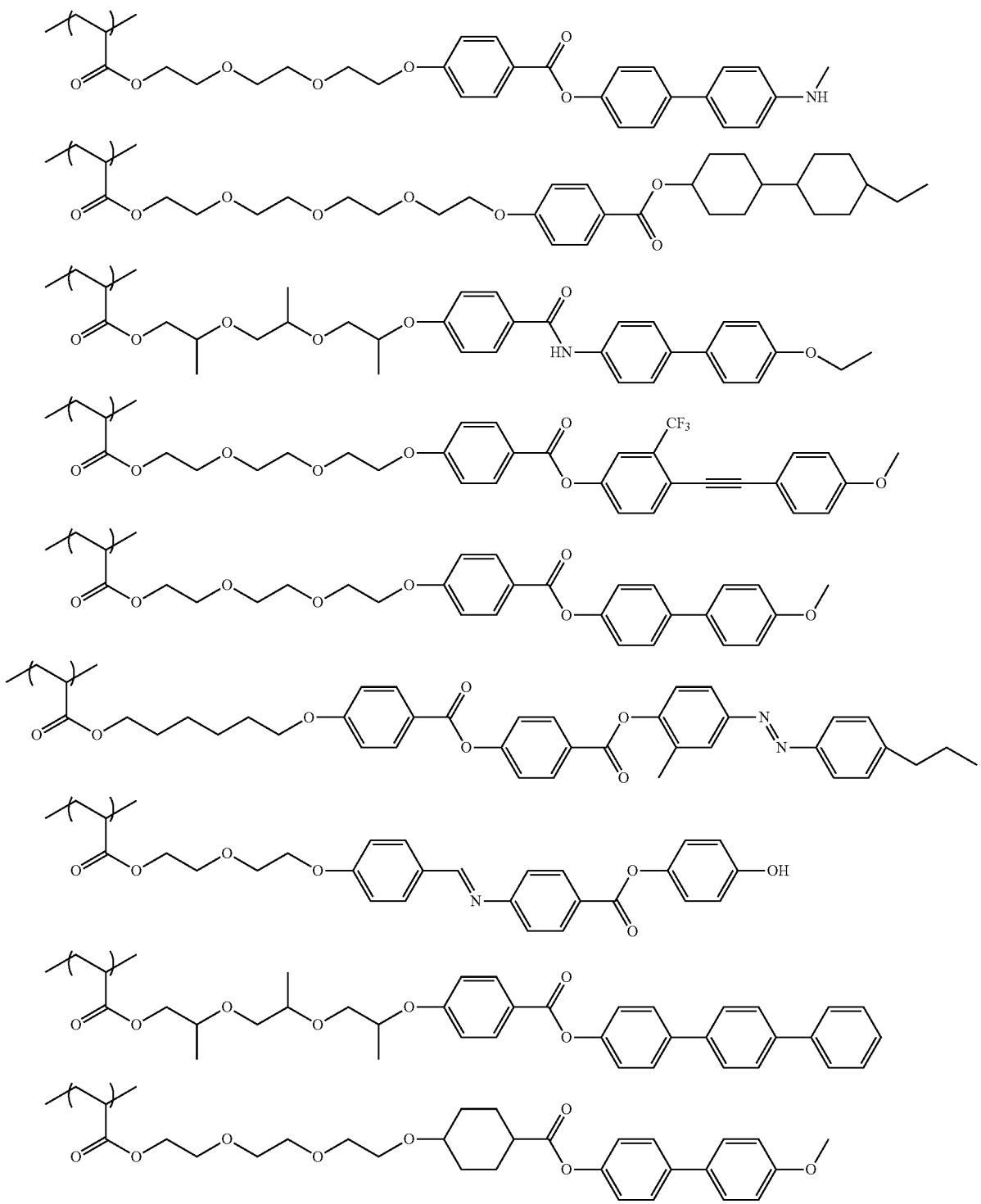

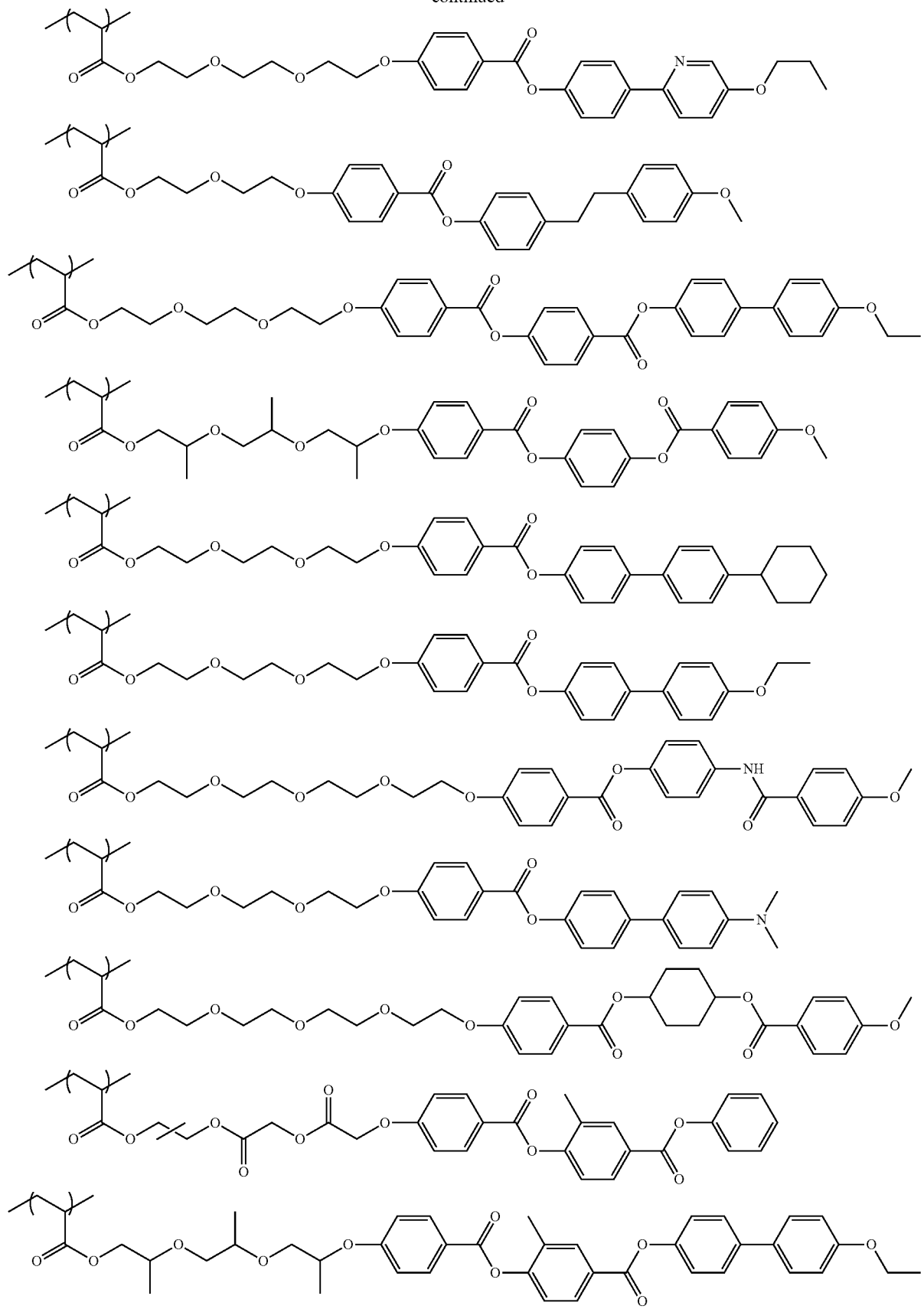

It is preferable that the structures of the repeating unit (21) and the repeating unit (22) have a part in common. It is presumed that the liquid crystals are uniformly aligned as the structures of repeating units are more similar to each other. In this manner, the alignment degree of the light absorption anisotropic layer is further improved.

Specifically, from the viewpoint of further increasing the alignment degree of the light absorption anisotropic layer, it is preferable to satisfy at least one of a condition that SP21A of Formula (LCP-21) has the same structure as that for SP22 of Formula (LCP-22), a condition that MG21 of Formula (LCP-21) has the same structure as that for MG22 of Formula (LCP-22), or a condition that L21 of Formula (LCP-21) has the same structure as that for L22 of Formula (LCP-22); more preferable to satisfy two or more of the conditions; and particularly preferable to satisfy all the conditions.

From the viewpoint that the uniformity of alignment is excellent, a content of the repeating unit (22) is preferably 50% by mass or more, more preferably 55% or more, and particularly preferably 60% or more with respect to all repeating units (100% by mass) of the high-molecular-weight liquid crystalline compound.

From the viewpoint of improving the alignment degree, the upper limit value of the content of the repeating unit (22) is preferably 99% by mass or less and more preferably 97% by mass or less with respect to all repeating units (100% by mass) of the high-molecular-weight liquid crystalline compound.

The high-molecular-weight liquid crystalline compound may include only one of the repeating unit (22), or two or more kinds of the repeating units (22). In a case where the high-molecular-weight liquid crystalline compound includes two or more kinds of repeating units (22), there is an advantage in that solubility of the high-molecular-weight liquid crystalline compound in a solvent is improved and the liquid crystal phase transition temperature is easily adjusted. In the case where the high-molecular-weight liquid crystalline compound includes two or more kinds of repeating units (22), it is preferable that the total amount thereof is within the above-described range.

Repeating Unit (3)

From the viewpoint of improving solubility in a general-purpose solvent, the high-molecular-weight liquid crystalline compound can include a repeating unit (3) not containing a mesogen. Particularly, in order to improve the solubility while suppressing a decrease in alignment degree, it is preferable that the repeating unit (3) not containing a mesogen is a repeating unit having a molecular weight of 280 or less. As described above, the reason why the solubility is improved while a decrease in alignment degree is suppressed by including the repeating unit having a molecular weight of 280 or less, which does not contain a mesogen, is presumed as follows.

That is, it is considered that, in a case where the high-molecular-weight liquid crystalline compound includes the repeating unit (3) not containing a mesogen in a molecular chain thereof, since a solvent is likely to enter the high-molecular-weight liquid crystalline compound, the solubility is improved, but the alignment degree is decreased due to the non-mesogenic repeating unit (3). However, it is presumed that, since the molecular weight of the above-described repeating unit is small, the alignment of the repeating unit (1), the repeating unit (21), or the repeating unit (22) described above, which contains the mesogen group, is unlikely to be disturbed, and thus the decrease in the alignment degree is suppressed.

It is preferable that the above-described repeating unit (3) is a repeating unit having a molecular weight of 280 or less.

The molecular weight of the repeating unit (3) does not indicate a molecular weight of a monomer used to obtain the repeating unit (3), but indicates the molecular weight of the repeating unit (3) in a state of being incorporated into the high-molecular-weight liquid crystalline compound by polymerization of the monomer.

The molecular weight of the repeating unit (3) is 280 or less, preferably 180 or less and more preferably 100 or less. The lower limit value of the molecular weight of the repeating unit (3) is commonly 40 or more, and preferably 50 or more. In a case where the molecular weight of the repeating unit (3) is 280 or less, a light absorption anisotropic layer having excellent solubility of the high-molecular-weight liquid crystalline compound and having a high alignment degree can be obtained.

On the other hand, in a case where the molecular weight of the repeating unit (3) is more than 280, the alignment of the liquid crystals in the portion of the repeating unit (1), the repeating unit (21), or the repeating unit (22) is disturbed, and thus the alignment degree is decreased. In addition, since the solvent is unlikely to enter the high-molecular-weight liquid crystalline compound, the solubility of the high-molecular-weight liquid crystalline compound is decreased.

Specific examples of the repeating unit (3) include a repeating unit which does not include a crosslinkable group (for example, an ethylenically unsaturated group) (hereinafter, also referred to as "repeating unit (3-1)"), and a repeating unit which includes the crosslinkable group (hereinafter, also referred to as "repeating unit (3-2)").

Repeating Unit (3-1)

Specific examples of a monomer used for polymerization of the repeating unit (3-1) include acrylic acid [72.1], α-alkylacrylic acids (such as methacrylic acid [86.1] and itaconic acid [130.1]), esters and amides derived from these acids (such as N-i-propylacrylamide [113.2], N-n-butylacrylamide [127.2], N-t-butylacrylamide [127.2], N,N-dimethylacrylamide [99.1], N-methylmethacrylamide [99.1], acrylamide [71.1], methacrylamide [85.1], diacetoneacrylamide [169.2], acryloylmorpholine [141.2], N-methylol acrylamide [101.1], N-methylol methacrylamide [115.1], methyl acrylate [86.0], ethyl acrylate [100.1], hydroxyethyl acrylate [116.1], n-propyl acrylate [114.1], i-propyl acrylate [114.2], 2-hydroxypropyl acrylate [130.1], 2-methyl-2-nitropropyl acrylate [173.2], n-butyl acrylate [128.2], i-butyl acrylate [128.2], t-butyl acrylate [128.2], t-pentyl acrylate [142.2], 2-methoxyethyl acrylate [130.1], 2-ethoxyethyl acrylate [144.2], 2-ethoxy ethoxyethyl acrylate [188.2], 2,2,2-trifluoroethyl acrylate [154.1], 2,2-dimethylbutyl acrylate [156.2], 3-methoxybutyl acrylate [158.2], ethyl carbitol acrylate [188.2], phenoxyethyl acrylate [192.2], n-pentyl acrylate [142.2], n-hexyl acrylate [156.2], cyclohexyl acrylate [154.2], cyclopentyl acrylate [140.2], benzyl acrylate [162.2], n-octyl acrylate [184.3], 2-ethylhexyl acrylate [184.3], 4-methyl-2-propylpentyl acrylate [198.3], methyl methacrylate [100.1], 2,2,2-trifluoroethyl methacrylate [168.1], hydroxy ethyl methacrylate [130.1], 2-hydroxypropyl methacrylate [144.2], n-butyl methacrylate [142.2], i-butyl methacrylate [142.2], sec-butyl methacrylate [142.2], n-octyl methacrylate [198.3], 2-ethylhexyl methacrylate [198.3], 2-methoxyethyl methacrylate [144.2], 2-ethoxyethyl methacrylate [158.2], benzyl methacrylate [176.2], 2-norbornyl methyl methacrylate [194.3], 5-norbornen-2-ylmethyl methacrylate [194.3], and dimethylaminoethyl methacrylate [157.2]), vinyl esters (such as vinyl acetate [86.1]), esters derived from maleic acid or fumaric acid (such as dimethyl maleate [144.1] and diethyl fumarate [172.2]), maleimides (such as N-phenylmaleimide [173.2]), maleic acid [116.1], fumaric acid [116.1], p-styrenesulfonic acid [184.1], acrylonitrile [53.1], methacrylonitrile [67.1], dienes (such as butadiene [54.1], cyclopentadiene [66.1], and isoprene [68.1]), aromatic vinyl compounds (such as styrene [104.2], p-chlorostyrene [138.6], t-butylstyrene [160.3], and α-methylstyrene [118.2]), N-vinylpyrrolidone [111.1], N-vinyloxazolidone [113.1], N-vinyl succinimide [125.1], N-vinylformamide [71.1], N-vinyl-N-methylformamide [85.1], N-vinylacetamide [85.1], N-vinyl-N-methylacetamide [99.1], 1-vinylimidazole [94.1], 4-vinylpyridine [105.2], vinylsulfonic acid [108.1], sodium vinyl sulfonate [130.2], sodium allyl sulfonate [144.1], sodium methallyl sulfonate [158.2], vinylidene chloride [96.9], vinyl alkyl ethers (such as methyl vinyl ether [58.1]), ethylene [28.0], propylene [42.1], 1-butene [56.1], and isobutene [56.1]. The numerical value in [ ] indicates the molecular weight of the monomer.

The above-described monomer may be used alone, or in combination of two or more kinds thereof.

Among the above-described monomers, acrylic acid, a-alkylacrylic acids, esters and amides derived from these acids, acrylonitrile, methacrylonitrile, or aromatic vinyl compounds are preferable.

As monomers other than the above-described monomers, compounds described in Research Disclosure No. 1955 (July, 1980) can be used.

Hereinafter, specific examples of the repeating unit (3-1) and molecular weights thereof are shown below, but the present invention is not limited to these specific examples.

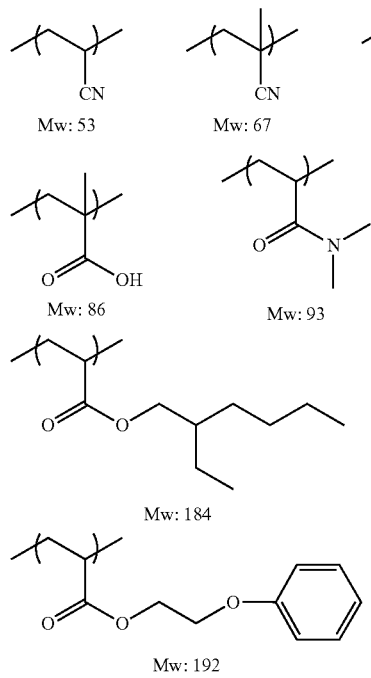

Repeating Unit (3-2)

Specific examples of the crosslinkable group in the repeating unit (3-2) include the groups represented by P1 to P30 described above. Among these, a vinyl group, a butadiene group, a (meth)acryloyl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group is more preferable.

From the viewpoint of easily carrying out the polymerization, it is preferable that the repeating unit (3-2) is a repeating unit represented by Formula (3).

In Formula (3), PC32 represents a main chain of a repeating unit, and more specifically represents the same structure as that for PC1 in Formula (1) described above; L32 represents a single bond or a divalent linking group, and more specifically represents the same structure as that for L1 in Formula (1) described above; and P32 represents a crosslinkable group represented by any of Formulae (P1) to (P30) described above.

Hereinafter, specific examples of the repeating unit (3-2) and weight-average molecular weights (Mw) thereof are shown below, but the present invention is not limited to these specific examples.

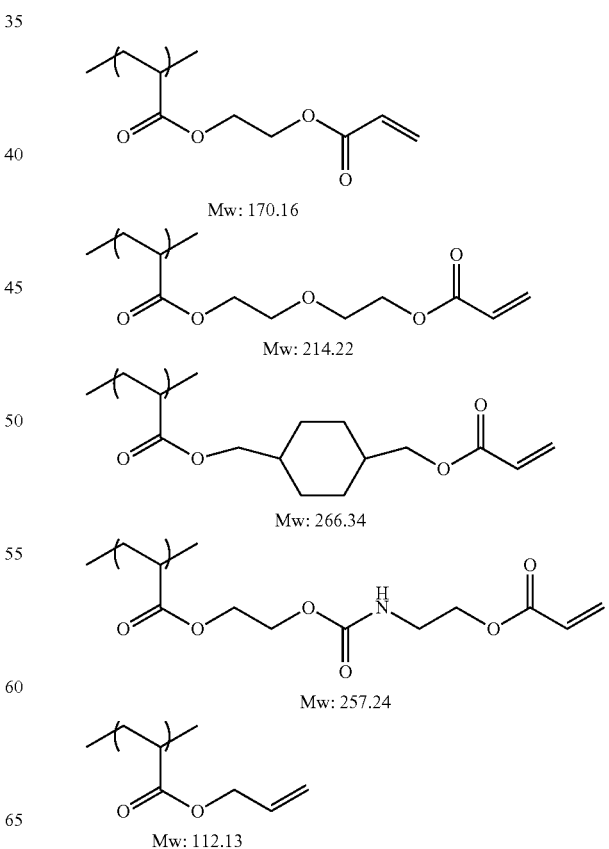

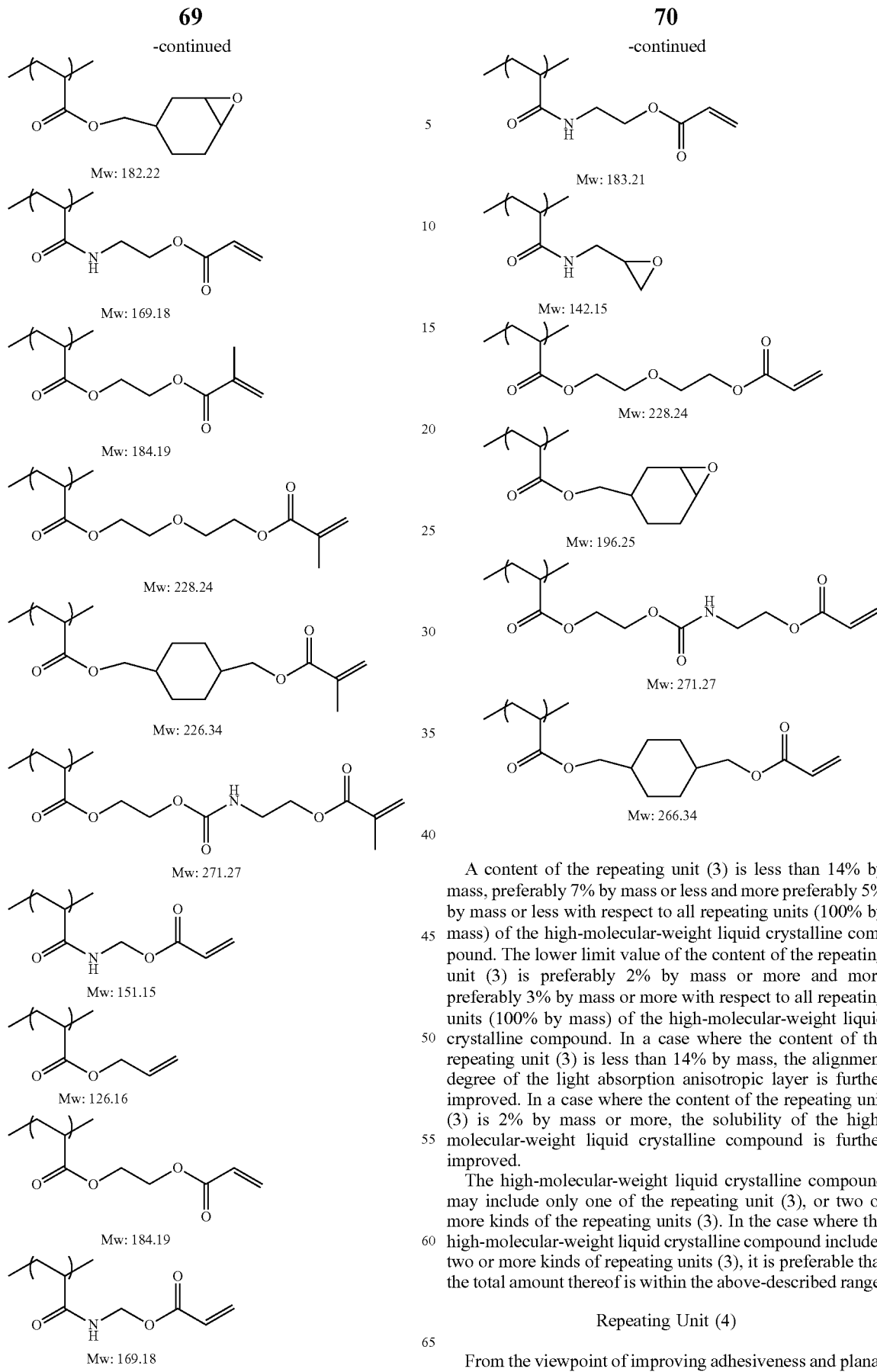

A content of the repeating unit (3) is less than 14% by mass, preferably 7% by mass or less and more preferably 5% by mass or less with respect to all repeating units (100% by mass) of the high-molecular-weight liquid crystalline compound. The lower limit value of the content of the repeating unit (3) is preferably 2% by mass or more and more preferably 3% by mass or more with respect to all repeating units (100% by mass) of the high-molecular-weight liquid crystalline compound. In a case where the content of the repeating unit (3) is less than 14% by mass, the alignment degree of the light absorption anisotropic layer is further improved. In a case where the content of the repeating unit (3) is 2% by mass or more, the solubility of the high-molecular-weight liquid crystalline compound is further improved.

The high-molecular-weight liquid crystalline compound may include only one of the repeating unit (3), or two or more kinds of the repeating units (3). In the case where the high-molecular-weight liquid crystalline compound includes two or more kinds of repeating units (3), it is preferable that the total amount thereof is within the above-described range.

Repeating Unit (4)

From the viewpoint of improving adhesiveness and planar uniformity, the high-molecular-weight liquid crystalline compound may include a repeating unit (4) having a flexible structure with a long molecular chain (SP4 in Formula (4) described below). The reason for this is presumed as follows.

That is, in a case where the high-molecular-weight liquid crystalline compound has such a flexible structure with a long molecular chain, entanglement of the molecular chains constituting the high-molecular-weight liquid crystalline compound is likely to occur, and aggregation destruction of the light absorption anisotropic layer (specifically, destruction of the light absorption anisotropic layer itself) is suppressed. As a result, it is presumed that adhesiveness between the light absorption anisotropic layer and an underlayer (for example, a base material or an alignment film) is improved. In addition, it is considered that a decrease in planar uniformity occurs due to low compatibility between the dichroic substance and the high-molecular-weight liquid crystalline compound. That is, it is considered that, in a case where the compatibility between the dichroic substance and the high-molecular-weight liquid crystalline compound is not sufficient, a planar defect (alignment defect) having the dichroic substance to be precipitated as a nucleus occurs. On the other hand, it is presumed that, in the case where the high-molecular-weight liquid crystalline compound has such a flexible structure with a long molecular chain, a light absorption anisotropic layer in which precipitation of the dichroic substance is suppressed and the planar uniformity is excellent is obtained. Here, the expression "planar uniformity is excellent" denotes that the alignment defect occurring in a case where the liquid crystal composition containing the high-molecular-weight liquid crystalline compound is repelled on the underlayer (for example, the base material or the alignment film) is less likely to occur.

The above-described repeating unit (4) is a repeating unit represented by Formula (4).

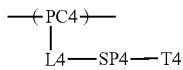

(4)

In Formula (4), PC4 represents a main chain of a repeating unit, and more specifically represents the same structure as that for PC1 in Formula (1) described above; L4 represents a single bond or a divalent linking group, and more specifically represents the same structure as that for L1 in Formula (1) described above (preferably a single bond); SP4 represents an alkylene group having 10 or more atoms in the main chain; and T4 represents a terminal group, and more specifically represents the same structure as that for T1 in Formula (1) described above.

Specific examples and suitable aspects of PC4 are the same as those for PC1 in Formula (1), and thus the description thereof will not be repeated.

From the viewpoint of further exhibiting the effect of the present invention, L4 is preferably a single bond.

In Formula (4), SP4 represents an alkylene group having 10 or more atoms in the main chain. Here, one or more of —CH$_2$—'s constituting the alkylene group represented by SP4 may be replaced with "SP-C" described above, and particularly preferably replaced with at least one group selected from the group consisting of —O—, —S—, —N(R$^{21}$)—, —C(=O)—, —C(=S)—, —C(R$^{22}$)=C(R$^{23}$)—, an alkynylene group, —Si(R$^{24}$)(R$^{25}$)—, —N=N—, —C(R$^{26}$)=N—N=C(R$^{27}$)—, —C(R$^{28}$)=N—, and S(=O)$_2$—. In addition, R$^{21}$ to R$^{28}$ each independently represent a hydrogen atom, a halogen atom, a cyano group, a nitro group, or a linear or branched alkyl group having 1 to 10 carbon atoms. In addition, the hydrogen atoms included in one or more of —CH$_2$—'s constituting the alkylene group represented by SP4 may be replaced with "SP—H" described above.

The number of atoms in the main chain of SP4 is 10 or more, and from the viewpoint of obtaining a light absorption anisotropic layer in which at least one of the adhesiveness or the planar uniformity is more excellent, the number of atoms thereof is preferably 15 or more and more preferably 19 or more. In addition, from the viewpoint of obtaining a light absorption anisotropic layer with a more excellent alignment degree, the upper limit of the number of atoms in the main chain of SP2 is preferably 70 or less, more preferably 60 or less, and particularly preferably 50 or less.

Here, the "main chain" of SP4 means a partial structure required for directly linking L4 and T4 to each other, and the "number of atoms in the main chain" means the number of atoms constituting the partial structure. In other words, the "main chain" of SP4 is a partial structure in which the number of atoms linking L4 and T4 to each other is the smallest. For example, in a case where SP4 is a 3,7-dimethyldecanyl group, the number of atoms in the main chain is 10, and in a case where SP4 is a 4,6-dimethyldodecanyl group, the number of atoms in the main chain is 12. In addition, in Formula (4-1), the inside of the frame shown by the dotted quadrangle corresponds to SP4, and the number of atoms in the main chain of SP4 (corresponding to the total number of atoms circled by the dotted line) is 11.

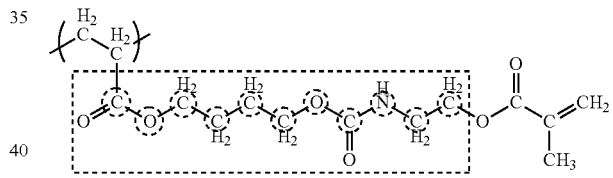

(4-1)

The alkylene group represented by SP4 may be linear or branched.

From the viewpoint of obtaining a light absorption anisotropic layer with a more excellent alignment degree, the number of carbon atoms in the alkylene group represented by SP4 is preferably 8 to 80, preferably 15 to 80, more preferably 25 to 70, and particularly preferably 25 to 60.

From the viewpoint of obtaining a light absorption anisotropic layer with more excellent adhesiveness and planar uniformity, it is preferable that one or more of —CH$_2$—'s constituting the alkylene group represented by SP4 are replaced with "SP-C" described above.

In addition, in a case of a plurality of —CH$_2$—'s constituting the alkylene group represented by SP4, from the viewpoint of obtaining a light absorption anisotropic layer with more excellent adhesiveness and planar uniformity, it is more preferable that only some of the plurality of —CH$_2$—'s are replaced with "SP-C" described above.

Among "SP-C", at least one group selected from the group consisting of —O—, —S—, —N(R$^{21}$)—, —C(=O)—, —C(=S)—, —C(R$^{22}$)=C(R$^{23}$)—, an alkynylene group, —Si(R$^{24}$)(R$^{25}$)—, —N=N—, —C(R$^{26}$)=N—N=C(R$^{27}$)—, —C(R$^{28}$)=N—, and S(=O)$_2$— is preferable; and from the viewpoint of obtaining a light absorption anisotropic layer with more excellent adhesiveness and planar uniformity, at least one group selected from the group consisting of —O—, —N($R^{21}$)—, —C(=O)—, and S(=O)$_2$— is more preferable, and at least one group selected from the group consisting of —O—, —N($R^{21}$)—, and C(=O)— is particularly preferable.

Particularly, it is preferable that SP4 is a group having at least one selected from the group consisting of an oxyalkylene structure in which one or more of —CH$_2$—'s constituting an alkylene group are replaced with —O—, an ester structure in which one or more of —CH$_2$—CH$_2$—'s constituting an alkylene group are replaced with —O— or C(=O)—, and a urethane bond in which one or more of —CH$_2$—CH$_2$—CH$_2$—'s constituting an alkylene group are replaced with —O—, —C(=O)—, or NH—.

The hydrogen atoms included in one or more of —CH$_2$—'s constituting the alkylene group represented by SP4 may be replaced with "SP—H" described above. In this case, one or more hydrogen atoms included in —CH$_2$— may be replaced with "SP—H". That is, only one hydrogen atom included in —CH$_2$— may be replaced with "SP—H", or all (two) hydrogen atoms included in —CH$_2$— may be replaced with "SP—H".

Among "SP—H", at least one group selected from the group consisting of a halogen atom, a cyano group, a nitro group, a hydroxy group, a linear alkyl group having 1 to 10 carbon atoms, a branched alkyl group having 1 to 10 carbon atoms, and a halogenated alkyl group having 1 to 10 carbon atoms is preferable; and at least one group selected from the group consisting of a hydroxy group, a linear alkyl group having 1 to 10 carbon atoms, and a branched alkyl group having 1 to 10 carbon atoms is still more preferable.

As described above, T4 represents the same terminal group as that for T1, and is preferably a hydrogen atom, a methyl group, a hydroxy group, a carboxy group, a sulfonic acid group, a phosphoric acid group, a boronic acid group, an amino group, a cyano group, a nitro group, a phenyl group which may have a substituent, or -L-CL (L represents a single bond or a divalent linking group, and specific examples of the divalent linking group are the same as those for LW and SPW described above; CL represents a crosslinkable group, examples thereof include the group represented by Q1 or Q2 described above, and a crosslinkable group represented by any of Formulae (P1) to (P30) is preferable), in which CL is preferably a vinyl group, a butadiene group, a (meth)acryloyl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group.

The epoxy group may be an epoxycycloalkyl group, and from the viewpoint that the effect of the present invention is more excellent, the number of carbon atoms in a cycloalkyl group moiety of the epoxycycloalkyl group is preferably 3 to 15, more preferably 5 to 12, and particularly preferably 6 (that is, it is still more preferable that the epoxycycloalkyl group is an epoxycyclohexyl group).

Examples of a substituent of the oxetanyl group include an alkyl group having 1 to 10 carbon atoms, and from the viewpoint that the effect of the present invention is more excellent, an alkyl group having 1 to 5 carbon is preferable. The alkyl group as the substituent of the oxetanyl group may be linear or branched, but is preferably linear from the viewpoint that the effect of the present invention is more excellent.

Examples of a substituent of the phenyl group include a boronic acid group, a sulfonic acid group, a vinyl group, and an amino group, and from the viewpoint that the effect of the present invention is more excellent, a boronic acid group is preferable.

Specific examples of the repeating unit (4) include the following structures, but the present invention is not limited thereto. In the following specific examples, n1 represents an integer of 2 or more, and n2 represents an integer of 1 or more.

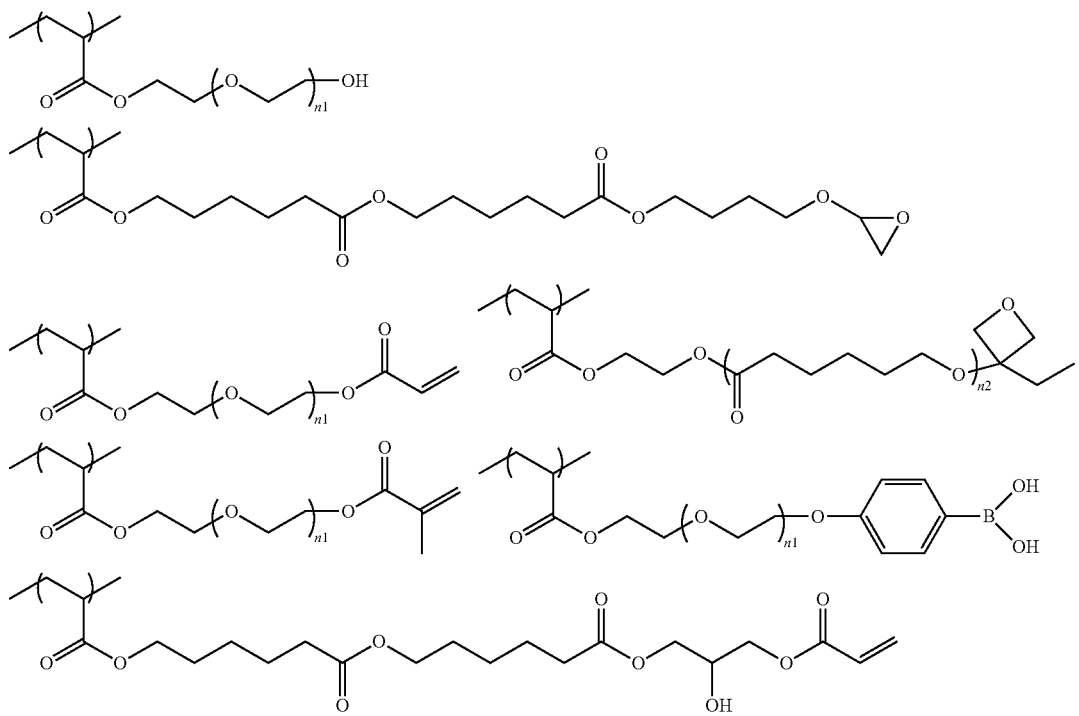

-continued

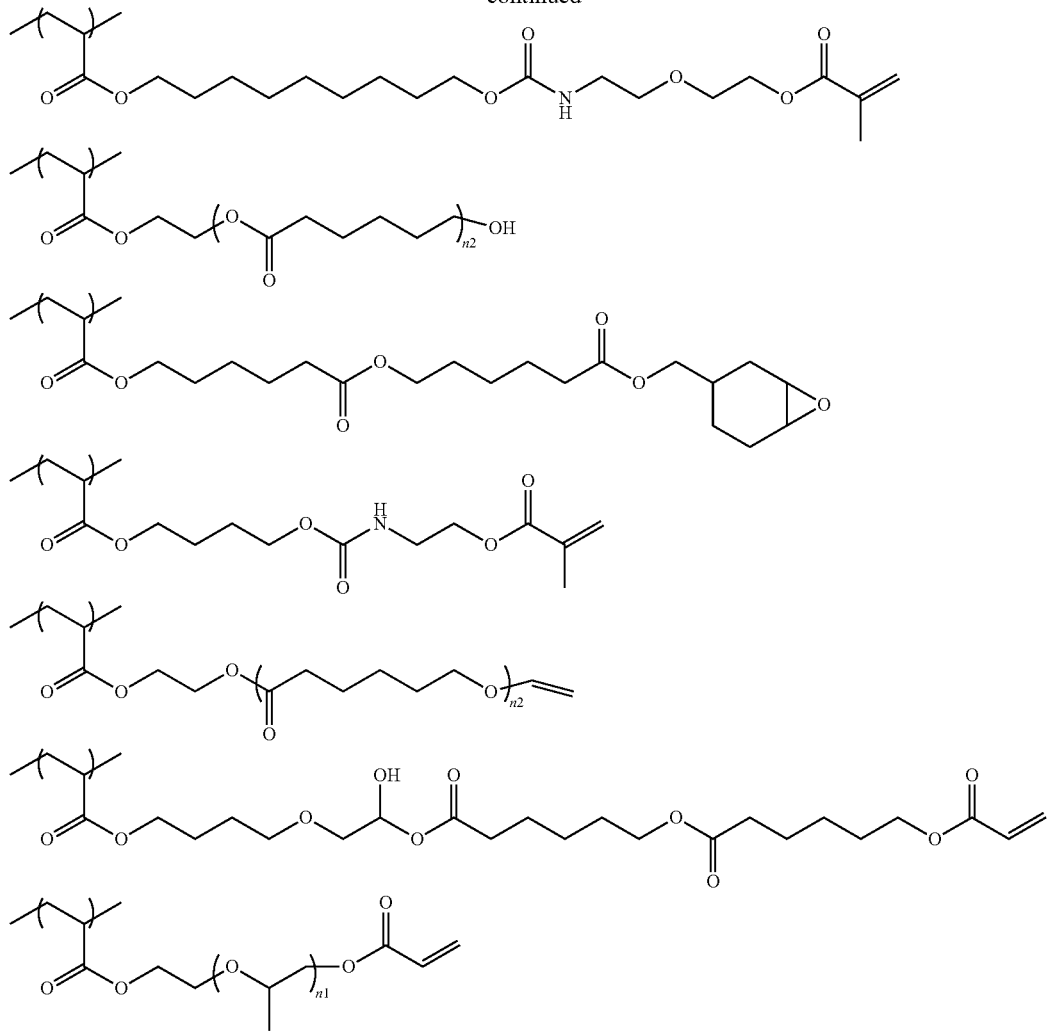

A content of the repeating unit (4) is preferably 2% to 20% by mass and more preferably 3% to 18% by mass with respect to all repeating units (100% by mass) of the high-molecular-weight liquid crystalline compound. In a case where the content of the repeating unit (4) is 2% by mass or more, a light absorption anisotropic layer having more excellent adhesiveness is obtained. In addition, in a case where the content of the repeating unit (4) is 20% by mass or less, a light absorption anisotropic layer having more excellent planar uniformity is obtained.

The high-molecular-weight liquid crystalline compound may include only one of the repeating unit (4), or two or more kinds of the repeating units (4). In a case where the high-molecular-weight liquid crystalline compound includes two or more kinds of repeating units (4), the above-described content of the repeating unit (4) indicates the total content of the repeating units (4).

Repeating Unit (5)

From the viewpoint of the planar uniformity, the high-molecular-weight liquid crystalline compound can include a repeating unit (5) to be introduced by polymerizing a polyfunctional monomer. Particularly, in order to improve the planar uniformity while suppressing a decrease in alignment degree, it is preferable that the high-molecular-weight liquid crystalline compound includes 10% by mass or less of the repeating unit (5) to be introduced by polymerizing a polyfunctional monomer. As described above, the reason why the planar uniformity can be improved while a decrease in alignment degree is suppressed by including 10% by mass or less of the repeating unit (5) is presumed as follows.

The repeating unit (5) is a unit to be introduced to the high-molecular-weight liquid crystalline compound by polymerizing a polyfunctional monomer. Therefore, it is considered that the high-molecular-weight liquid crystalline compound includes a high-molecular-weight body in which a three-dimensional crosslinking structure is formed by the repeating unit (5). Here, since the content of the repeating unit (5) is small, the content of the high-molecular-weight body including the repeating unit (5) is considered to be very small.

It is presumed that a light absorption anisotropic layer in which cissing of the liquid crystal composition is suppressed and the planar uniformity is excellent is obtained due to the presence of a very small amount of the high-molecular-weight body with the three-dimensional crosslinking structure formed as described above.

In addition, it is presumed that the effect of suppressing a decrease in alignment degree can be maintained because the content of the high-molecular-weight body is very small.

It is preferable that the above-described repeating unit (5) to be introduced by polymerizing a polyfunctional monomer is a repeating unit represented by Formula (5).

(5)

In Formula (5), PC5A and PC5B represent the main chain of the repeating unit, and more specifically represent the same structure as that for PC1 in Formula (1) described above; L5A and L5B represent a single bond or a divalent linking group, and more specifically represents the same structure as that for L1 in Formula (1) described above; SP5A and SP5B represent a spacer group, and more specifically represents the same structure as that for SP1 in Formula (1) described above; MG5A and MG5B represent a mesogen structure, and more specifically represent the same structure as that for the mesogen group MG in Formula (LC) described above; and a and b represent an integer of 0 or 1.

PC5A and PC5B may be the same group or groups different from each other, but from the viewpoint of further improving the alignment degree of the light absorption anisotropic layer, it is preferable that PC5A and PC5B are the same group.

Both L5A and L5B may be a single bond, the same group, or groups different from each other, but from the viewpoint of further improving the alignment degree of the light absorption anisotropic layer, both L5A and L5B are preferably a single bond or the same group, and more preferably the same group.

Both SP5A and SP5B may be a single bond, the same group, or groups different from each other, but from the viewpoint of further improving the alignment degree of the light absorption anisotropic layer, both SP5A and SP5B are preferably a single bond or the same group, and more preferably the same group.

Here, the same group in Formula (5) means that the chemical structures thereof are the same regardless of the orientation in which each group is bonded. For example, even in a case where SP5A is *—$CH_2$—$CH_2$—O—** (* represents a bonding position to L5A, and ** represents a bonding position to MG5A) and SP5B is *—O—$CH_2$—$CH_2$—** (* represents a bonding position to MG5B, and ** represents a bonding position to L5B), SP5A and SP5B are the same group.

a and b are each independently an integer of 0 or 1, and preferably 1 from the viewpoint of further improving the alignment degree of the light absorption anisotropic layer.

a and b may be the same or different from each other, but from the viewpoint of further improving the alignment degree of the light absorption anisotropic layer, it is preferable that both a and b are 1.

From the viewpoint of further improving the alignment degree of the light absorption anisotropic layer, the sum of a and b is preferably 1 or 2 (that is, the repeating unit represented by Formula (5) has a mesogen group), and more preferably 2.

From the viewpoint of further improving the alignment degree of the light absorption anisotropic layer, it is preferable that the partial structure represented by -(MG5A)$_a$-(MG5B)$_b$- has a cyclic structure. In this case, from the viewpoint of further improving the alignment degree of the light absorption anisotropic layer, the number of cyclic structures in the partial structure represented by -(MG5A2)$_a$-(MG5B)$_b$- is preferably 2 or more, more preferably 2 to 8, still more preferably 2 to 6, and particularly preferably 2 to 4.

From the viewpoint of further improving the alignment degree of the light absorption anisotropic layer, the mesogen groups represented by MG5A and MG5B each independently preferably include one or more cyclic structures, more preferably include 2 to 4 cyclic structures, still more preferably include 2 or 3 cyclic structures, and particularly preferably include 2 cyclic structures.

Specific examples of the cyclic structure include an aromatic hydrocarbon group, a heterocyclic group, and an alicyclic group, and among these, an aromatic hydrocarbon group or an alicyclic group is preferable.

MG5A and MG5B may be the same group or groups different from each other, but from the viewpoint of further improving the alignment degree of the light absorption anisotropic layer, it is preferable that MG5A and MG5B are the same group.

As the mesogen group represented by MG5A and MG5B, from the viewpoint of expressing the liquid crystallinity, adjusting a liquid crystal phase transition temperature, availability of raw materials, and synthetic suitability, and from the viewpoint that the effect of the present invention is more excellent, the mesogen group MG in Formula (LC) described above is preferable.

Particularly, in the repeating unit (5), it is preferable that PC5A and PC5B are the same group, both L5A and L5B are a single bond or the same group, both SP5A and SP5B are a single bond or the same group, and MG5A and MG5B are the same group. In this manner, the alignment degree of the light absorption anisotropic layer is further improved.

A content of the repeating unit (5) is preferably 10% by mass or less, more preferably 0.001% to 5% by mass, and still more preferably 0.05% to 3% by mass with respect to the content (100% by mass) of all repeating units of the high-molecular-weight liquid crystalline compound.

The high-molecular-weight liquid crystalline compound may include only one of the repeating unit (5), or two or more kinds of the repeating units (5). In the case where the high-molecular-weight liquid crystalline compound includes two or more kinds of repeating units (5), it is preferable that the total amount thereof is within the above-described range.

Star-Shaped Polymer

The high-molecular-weight liquid crystalline compound may be a star-shaped polymer. The star-shaped polymer in the present invention means a polymer having three or more polymer chains extending from the nucleus, and is specifically represented by Formula (6).

The star-shaped polymer represented by Formula (6) as the high-molecular-weight liquid crystalline compound can form a light absorption anisotropic layer having a high alignment degree while having high solubility (excellent solubility in a solvent).

(6)

In Formula (6), $n_A$ represents an integer of 3 or greater, and preferably an integer of 4 or more. The upper limit value of $n_A$ is not limited thereto, but is commonly 12 or less and preferably 6 or less.

A plurality of PI's each independently represent a polymer chain having any of the repeating units represented by Formulae (1), (21), (22), (3), (4), and (5) described above. However, at least one of the plurality of PI's represents a polymer chain having the repeating unit represented by Formula (1) described above.

A represents an atomic group which is the nucleus of the star-shaped polymer. Specific examples of A include structures obtained by removing hydrogen atoms from thiol groups of a polyfunctional thiol compound, described in paragraphs [0052] to [0058] of JP2011-074280A, paragraphs [0017] to [0021] of JP2012-189847A, paragraphs [0012] to [0024] of JP2013-031986A, and paragraphs [0118] to [0142] of JP2014-104631A. In this case, A and PI are bonded to each other through a sulfide bond.

The number of thiol groups in the above-described polyfunctional thiol compound from which A is derived is preferably 3 or more and more preferably 4 or more. The upper limit value of the number of thiol groups in the polyfunctional thiol compound is commonly 12 or less and preferably 6 or less.

Specific examples of the polyfunctional thiol compound are shown below.

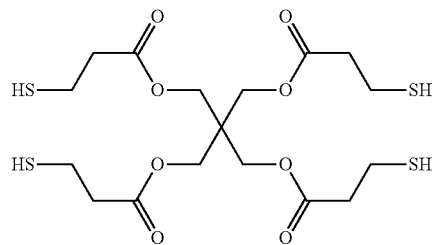

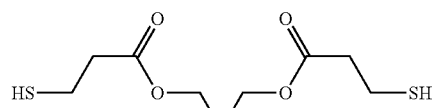

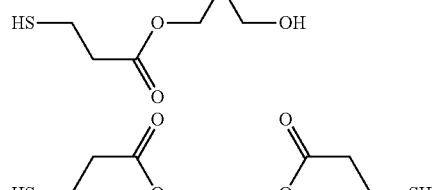

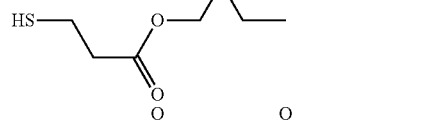

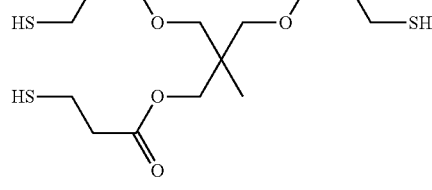

-continued

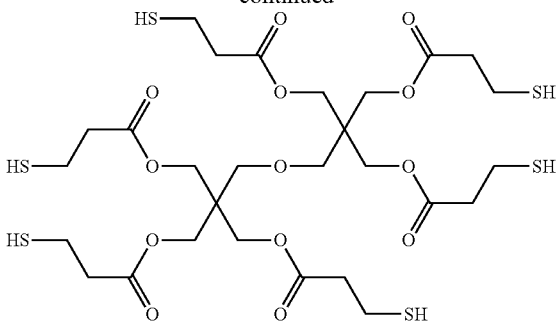

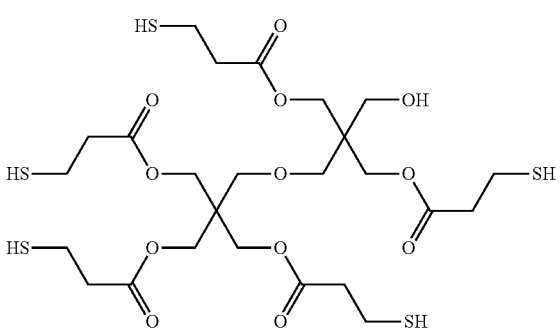

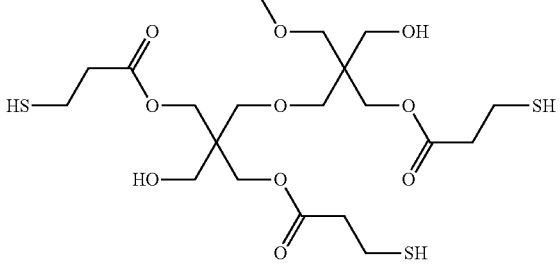

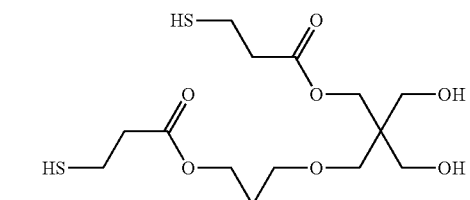

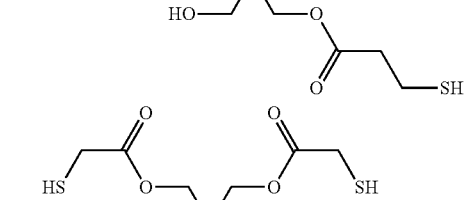

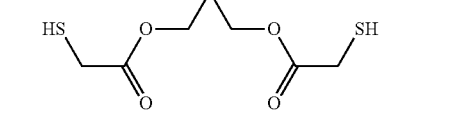

81

-continued

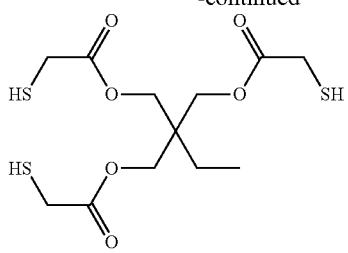

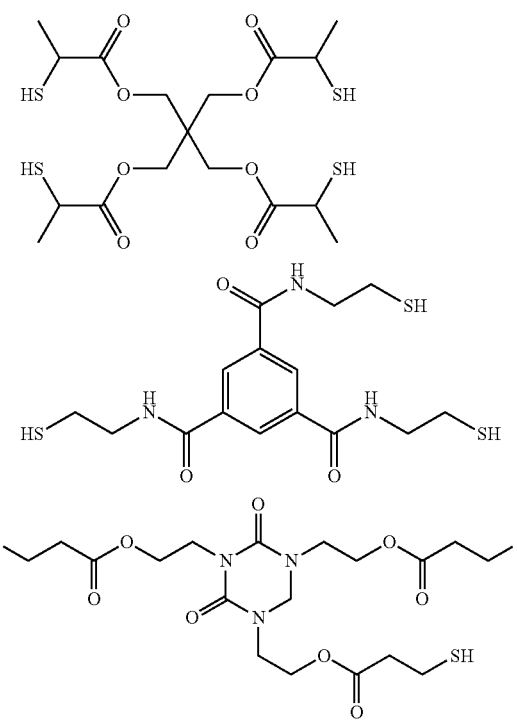

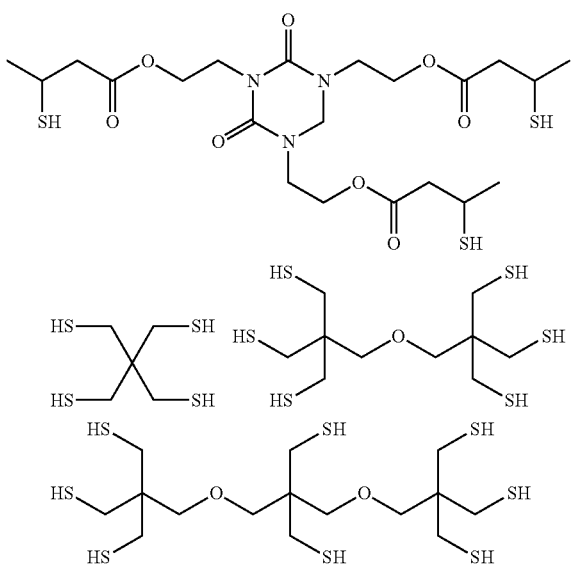

82

-continued

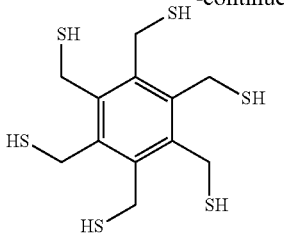

From the viewpoint of improving the alignment degree, the high-molecular-weight liquid crystalline compound may be a thermotropic liquid crystal and a crystalline polymer.

Thermotropic Liquid Crystal

A thermotropic liquid crystal is a liquid crystal which shows transition to a liquid crystal phase due to a change in temperature.

The specific compound is the thermotropic liquid crystal, and the thermotropic liquid crystal may exhibit any of a nematic phase or a smectic phase, but from the reason that the alignment degree of the light absorption anisotropic layer is further increased and haze is unlikely to be observed (haze is better), it is preferable that the thermotropic liquid crystal exhibits at least a nematic phase.

A temperature range showing the nematic phase is preferably room temperature (23° C.) to 450° C. from the viewpoint that the alignment degree of the light absorption anisotropic layer is further increased and the haze is unlikely to be observed, and more preferably 40° C. to 400° C. from the viewpoint of handleability and manufacturing suitability.

Crystalline Polymer

The crystalline polymer is a polymer showing a transition to a crystal layer due to a change in temperature. The crystalline polymer may show a glass transition other than the transition to the crystal layer.

From the viewpoint that the alignment degree of the light absorption anisotropic layer is further increased and the haze is unlikely to be observed, it is preferable that the crystalline polymer is a high-molecular-weight liquid crystalline compound which has a transition from a crystal phase to a liquid crystal phase in a case of being heated (glass transition may be present in the middle of the transition), or a high-molecular-weight liquid crystalline compound which has a transition to a crystal phase in a case where the temperature is lowered after entering a liquid crystal state by being heated (glass transition may be present in the middle of the transition).

The presence or absence of crystallinity of the high-molecular-weight liquid crystalline compound is evaluated as follows.

Two light absorption anisotropic layers of an optical microscope (ECLIPSE E600 POL, manufactured by Nikon Corporation) are arranged to be orthogonal to each other, and a sample table is set between the two light absorption anisotropic layers. A small amount of the high-molecular-weight liquid crystalline compound is placed on slide glass, and the slide glass is set on a hot stage placed on the sample table. While the state of the sample is observed, the temperature of the hot stage is increased to a temperature at which the high-molecular-weight liquid crystalline compound exhibits liquid crystallinity, and the high-molecular-weight liquid crystalline compound is allowed to enter a liquid crystal state. After the high-molecular-weight liquid crystalline compound enters the liquid crystal state, the behavior of the liquid crystal phase transition is observed while the temperature of the hot stage is gradually lowered, and the temperature of the liquid crystal phase transition is recorded. In a case where the high-molecular-weight liquid crystalline compound exhibits a plurality of liquid crystal phases (for example, a nematic phase and a smectic phase), all the transition temperatures are also recorded.

Next, approximately 5 mg of a sample of the high-molecular-weight liquid crystalline compound is put into an aluminum pan, and the pan is covered and set on a differential scanning calorimeter (DSC) (an empty aluminum pan is used as a reference). The high-molecular-weight liquid crystalline compound measured in the above-described manner is heated to a temperature at which the compound exhibits a liquid crystal phase, and the temperature is maintained for 1 minute. Thereafter, the calorific value is measured while the temperature is lowered at a rate of 10° C./min. An exothermic peak is confirmed from the obtained calorific value spectrum.

As a result, in a case where an exothermic peak is observed at a temperature other than the liquid crystal phase transition temperature, it can be said that the exothermic peak is a peak due to crystallization and the high-molecular-weight liquid crystalline compound has crystallinity.

On the other hand, in a case where an exothermic peak is not observed at a temperature other than the liquid crystal phase transition temperature, it can be said that the high-molecular-weight liquid crystalline compound does not have crystallinity.

A method of obtaining the crystalline polymer is not particularly limited, but as a specific example, a method of using a high-molecular-weight liquid crystalline compound including the above-described repeating unit (1) is preferable, and a method of using a suitable aspect among high-molecular-weight liquid crystalline compounds having the described above repeating unit (1) is more preferable.

Crystallization Temperature

From the viewpoint that the alignment degree of the light absorption anisotropic layer is further increased and the haze is unlikely to be observed, the crystallization temperature of the high-molecular-weight liquid crystalline compound is preferably −50° C. or higher and lower than 150° C., more preferably 120° C. or lower, still more preferably −20° C. or higher and lower than 120° C., and particularly preferably 95° C. or lower. From the viewpoint of reducing haze, the above-described crystallization temperature of the high-molecular-weight liquid crystalline compound is preferably lower than 150° C.

The crystallization temperature is a temperature of an exothermic peak due to crystallization in the above-described DSC.

Molecular Weight

From the viewpoint that the effect of the present invention is more excellent, a weight-average molecular weight (Mw) of the high-molecular-weight liquid crystalline compound is preferably 1000 to 500,000 and more preferably 2,000 to 300,000. In a case where the Mw of the high-molecular-weight liquid crystalline compound is within the above-described range, the high-molecular-weight liquid crystalline compound is easily handled.

In particular, from the viewpoint of suppressing cracking during coating, the weight-average molecular weight (Mw) of the high-molecular-weight liquid crystalline compound is preferably 10,000 or more and more preferably 10,000 to 300,000.

In addition, from the viewpoint of temperature latitude of the alignment degree, the weight-average molecular weight (Mw) of the high-molecular-weight liquid crystalline compound is preferably less than 10,000 and preferably 2,000 or more and less than 10,000.

Here, the weight-average molecular weight and the number-average molecular weight in the present invention are values measured by a gel permeation chromatography (GPC) method.

Solvent (eluent): N-methylpyrrolidone
Device name: TOSOH HLC-8220GPC
Column: using three columns of TOSOH TSKgel Super AWM-H (6 mm×15 cm) connected
Column temperature: 25° C.
Sample concentration: 0.1% by mass
Flow rate: 0.35 mL/min
Calibration curve: TSK standard polystyrene (manufactured by TOSOH Corporation), calibration curves of 7 samples with Mw of 2,800,000 to 1,050 (Mw/Mn=1.03 to 1.06) are used The high-molecular-weight liquid crystalline compound may exhibit nematic or smectic liquid crystallinity, but it is preferable that the high-molecular-weight liquid crystalline compound exhibits at least the nematic liquid crystallinity.

The temperature range at which the nematic phase is exhibited is preferably 0° C. to 450° C., and from the viewpoint of handleability and manufacturing suitability, preferably 30° C. to 400° C.

Content

From the viewpoint that the effect of the present invention is more excellent, a content of the liquid crystalline compound is preferably 10% to 97% by mass, more preferably 40% to 95% by mass, and still more preferably 60% to 95% by mass with respect to the total solid content (100% by mass) of the liquid crystal composition.

In a case where the liquid crystalline compound includes a high-molecular-weight liquid crystalline compound, a content of the high-molecular-weight liquid crystalline compound is preferably 10% to 99% by mass, more preferably 30% to 95% by mass, and still more preferably 40% to 90% by mass with respect to the total mass (100 parts by mass) of the liquid crystalline compound.

In a case where the liquid crystalline compound includes a low-molecular-weight liquid crystalline compound, a content of the low-molecular-weight liquid crystalline compound is preferably 1% to 90% by mass, more preferably 5% to 70% by mass, and still more preferably 10% to 60% by mass with respect to the total mass (100 parts by mass) of the liquid crystalline compound.

In a case where the liquid crystalline compound includes both the high-molecular-weight liquid crystalline compound and the low-molecular-weight liquid crystalline compound, from the viewpoint that the effect of the present invention is more excellent, a mass ratio (low-molecular-weight liquid crystalline compound/high-molecular-weight liquid crystalline compound) of the content of the low-molecular-weight liquid crystalline compound to the content of the high-molecular-weight liquid crystalline compound is preferably 5/95 to 70/30 and more preferably 10/90 to 50/50.

Here, the "solid content in the liquid crystal composition" denotes a component excluding a solvent, and specific examples of the solid content include the above-described liquid crystalline compound, and a dichroic substance, a polymerization initiator, an interface improver described later.

Dichroic Substance

The liquid crystal composition further contains a dichroic substance.

In the present invention, the dichroic substance means a coloring agent having different absorbances depending on directions. The dichroic substance may or may not exhibit liquid crystallinity.

The dichroic substance is not particularly limited, and examples thereof include a visible light absorbing material (dichroic coloring agent), a light emitting material (such as a fluorescent material or a phosphorescent material), an ultraviolet absorbing material, an infrared absorbing material, a non-linear optical material, a carbon nanotube, and an inorganic material (for example, a quantum rod). In addition, known dichroic substances (dichroic coloring agents) of the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0014] to [0032] of JP2018-053167A, paragraphs [0014] to [0033] of JP2020-11716A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, paragraphs [0014] to [0034] of WO2018/164252A, paragraphs [0021] to [0030] of WO2018/186503A, paragraphs [0043] to [0063] of WO2019/189345A, paragraphs [0043] to [0085] of WO2019/225468A, paragraphs [0050] to [0074] of WO2020/004106A, and paragraphs [0015] to [0038] of WO2021/044843A.

In the present invention, two or more kinds of dichroic substances may be used in combination. For example, from the viewpoint of making the color of the light absorption anisotropic layer to be formed closer to black, it is preferable that at least one dichroic substance having a maximal absorption wavelength in a wavelength range of 370 to 550 nm and at least one dichroic substance having a maximal absorption wavelength in a wavelength range of 500 to 700 nm are used in combination.

A content of the dichroic substance is not particularly limited, but from the reason that the alignment degree of the formed light absorption anisotropic layer is further increased, it is preferably 5% by mass or more, more preferably 8% by mass or more, still more preferably 10% by mass or more, and particularly preferably 10% to 30% by mass with respect to the total solid content mass of the liquid crystal composition. In a case where a plurality of dichroic substances are used in combination, it is preferable that the total amount of the plurality of dichroic substances is within the above-described range.

Alignment Agent

It is preferable that the liquid crystal composition further contains an alignment agent.

Examples of the alignment agent include those described in paragraphs [0042] to [0076] of JP2013-543526A, paragraphs [0089] to [0097] of JP2016-523997A, paragraphs [0153] to [0170] of JP2020-076920A, and the like, and these may be used alone or in combination of two or more.

In the present invention, from the reason that the alignment degree of the formed light absorption anisotropic layer is increased, it is preferable that the above-described alignment agent is an onium compound represented by Formula (B1).

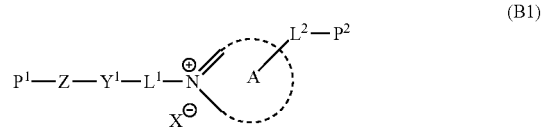

In Formula (B1), a ring A represents a quaternary ammonium ion consisting of a nitrogen-containing heterocyclic ring.

In addition, X represents an anion.

In addition, $L^1$ represents a divalent linking group.

In addition, $L^2$ represents a single bond or a divalent linking group.

In addition, $Y^1$ represents a divalent linking group having a 5-membered ring or a 6-membered ring as a partial structure.

In addition, Z represents a divalent linking group having an alkylene group having 2 to 20 carbon atoms as a partial structure.

In addition, $P^1$ and $P^2$ each independently represent a monovalent substituent having a polymerizable ethylenically unsaturated bond.

The ring A represents a quaternary ammonium ion consisting of a nitrogen-containing heterocyclic ring. Examples of the ring A include a pyridine ring, a picoline ring, a 2,2'-bipyridyl ring, a 4,4'-bipyridyl ring, a 1,10-phenanthroline ring, a quinoline ring, an oxazole ring, a thiazole ring, an imidazole ring, a pyrazine ring, a triazole ring, and a tetrazole ring, and the ring A is preferably a quaternary imidazolium ion or a quaternary pyridinium ion.

X represents an anion. Examples of X include a halogen anion (for example, a fluorine ion, a chlorine ion, a bromine ion, an iodine ion, and the like), a sulfonate ion (for example, a methanesulfonate ion, a trifluoromethanesulfonate ion, a methyl sulfate ion, a vinyl sulfonate ion, an allylsulfonate ion, a p-toluenesulfonate ion, a p-chlorobenzenesulfonate ion, a p-vinylbenzenesulfonate ion, a 1,3-benzenedisulfonate ion, a 1,5-naphthalenedisulfonate ion, a 2,6-naphthalenedisulfonate ion, and the like), a sulfate ion, a carbonate ion, a nitrate ion, a thiocyanate ion, a perchlorate ion, a tetrafluoroborate ion, a picrate ion, an acetate ion, a benzoate ion, a p-vinyl benzoate ion, a formate ion, a trifluoroacetate ion, a phosphate ion (for example, hexafluorophosphate ion), and a hydroxide ion. X is preferably a halogen anion, a sulfonate ion, or a hydroxide ion. In addition, a chlorine ion, a bromine ion, an iodine ion, a methanesulfonate ion, a vinylsulfonate ion, a p-toluenesulfonate ion, or a p-vinylbenzenesulfonate ion is particularly preferable.

$L^1$ represents a divalent linking group. Examples of $L^1$ include a divalent linking group having 1 to 20 carbon atoms, consisting of a combination of an alkylene group, —O—, —S—, —CO—, —SO$_2$—, —NRa— (here, Ra is an alkyl group having 1 to 5 carbon atoms or a hydrogen atom), an alkenylene group, an alkynylene group, and an arylene group. $L^1$ is preferably -AL-, —O-AL-, —CO—O-AL-, or —O—CO-AL-, each of which has 1 to 10 carbon atoms, more preferably -AL- or —O-AL-, each of which has 1 to 10 carbon atoms, and most preferably -AL- or —O-AL-, each of which has 1 to 5 carbon atoms. AL represents an alkylene group.

$L^2$ represents a single bond or a divalent linking group. Examples of $L^2$ include a divalent linking group having 1 to 10 carbon atoms, consisting of a combination of an alkylene group, —O—, —S—, —CO—, —SO$_2$—, —NRa— (here, Ra is an alkyl group having 1 to 5 carbon atoms or a hydrogen atom), an alkenylene group, an alkynylene group, and an arylene group; a single bond, —O—, —O—CO—, —CO—O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, and —O—CO-AL-CO—O—. AL represents an alkylene group. L2 is preferably a single bond, -AL-, —O-AL-, or —NRa-AL-O—, each of which has 1 to 10 carbon atoms, more preferably a single bond, -AL-, —O-AL-, or —NRa-AL-O—, each of which has 1 to 5 carbon atoms, and most preferably a single bond, —O-AL-, or —NRa-AL-O—, each of which has 1 to 5 carbon atoms.

$Y^1$ represents a divalent linking group having a 5- or 6-membered ring as a partial structure. Examples of $Y^1$ include a cyclohexyl ring, an aromatic ring, or a heterocyclic ring. Examples of the aromatic ring include a benzene ring, an indene ring, a naphthalene ring, a fluorene ring, a phenanthrene ring, an anthracene ring, a biphenyl ring, and a pyrene ring, and a benzene ring, a biphenyl ring, or a naphthalene ring is particularly preferable. As a heteroatom constituting the heterocyclic ring, a nitrogen atom, an oxygen atom, or a sulfur atom is preferable, and examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a dioxane ring, a dithiane ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. The heterocyclic ring is preferably a 6-membered ring. The divalent linking group represented by $Y^1$, having a 5- or 6-membered ring as a partial structure, may further have a substituent (for example, the above-described substituent W).

The divalent linking group represented by $Y^1$ is preferably a divalent linking group having two or more 5- or 6-membered rings, and more preferably has a structure in which two or more rings are linked to each other through a linking group. Examples of the linking group include the examples of the linking group represented by L1 and L2, —C≡C—, —CH═CH—, —CH═N—, —N═CH—, and —N═N—.

Z represents a divalent linking group which has an alkylene group having 2 to 20 carbon atoms as a partial structure and consists of a combination of —O—, —S—, —CO—, and —SO2-, in which the alkylene group may have a substituent. Examples of the above-described divalent linking group include an alkyleneoxy group and a polyalkyleneoxy group. The number of carbon atoms in the alkylene group represented by Z is more preferably 2 to 16, still more preferably 2 to 12, and particularly preferably 2 to 8.

P1 and P2 each independently represent a monovalent substituent having a polymerizable ethylenically unsaturated group. Examples of the above-described monovalent substituent having a polymerizable ethylenically unsaturated group include Formulae (M-1) to (M-8). That is, the monovalent substituent having a polymerizable ethylenically unsaturated group may be a substituent consisting of only an ethenyl group as in Formula (M-8).

(M-1)

(M-2)

(M-3)

(M-4)

(M-5)

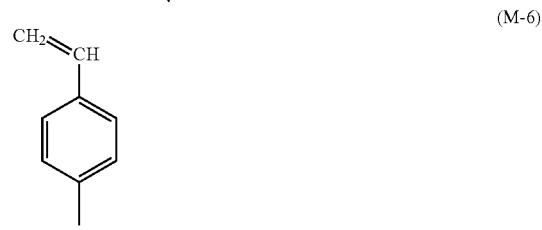

(M-6)

(M-7)

(M-8)

In Formulae (M-3) and (M-4), R represents a hydrogen atom or an alkyl group, and a hydrogen atom or a methyl group is preferable. Among Formulae (M-1) to (M-8), (M-1), (M-2), or (M-8) is preferable, and (M-1) or (M-8) is more preferable. In particular, P1 is preferably (M-1). In addition, P2 is preferably (M-1) or (M-8), and in a compound in which the ring A is quaternary imidazolium ion, P2 is preferably (M-8) or (M-1), and in a compound in which the ring A is a quaternary pyridinium ion, P2 is preferably (M-1).

Examples of the onium compound represented by Formula (B1) include onium salts described in paragraphs 0052 to 0058 of JP2012-208397A, onium salts described in paragraphs 0024 to 0055 of JP2008-026730A, and onium salts described in JP2002-37777A.

In the present invention, from the reason that the alignment degree of the formed light absorption anisotropic layer is increased, it is preferable that the above-described alignment agent is a boronic acid compound represented by Formula (B2).

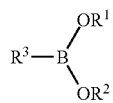

(B2)

In (B2), $R^1$ and $R^2$ each independently represent a hydrogen atom, an aliphatic hydrocarbon group which may have a substituent, an aryl group which may have a substituent, or a heterocyclic group which may have a substituent.

In addition, $R^3$ represents a substituent.

Examples of the aliphatic hydrocarbon group represented by one aspect of $R^1$ and $R^2$ include a linear or branched alkyl group having 1 to 20 carbon atoms, which may be substituted or unsubstituted, (for example, a methyl group, an ethyl group, an iso-propyl group, and the like), a substituted or unsubstituted cyclic alkyl group having 3 to 20 carbon atoms (for example, a cyclohexyl group and the like), and an alkenyl group having 2 to 20 carbon atoms (for example, a vinyl group and the like).

In addition, examples of the aryl group represented by one aspect of $R^1$ and $R^2$ include a substituted or unsubstituted phenyl group having 6 to 20 carbon atoms (for example, a phenyl group, a tolyl group, and the like), and a substituted or unsubstituted naphthyl group having 10 to 20 carbon atoms.

In addition, examples of the heterocyclic group represented by one aspect of $R^1$ and $R^2$ include a substituted or unsubstituted 5-membered or 6-membered ring group including at least one heteroatom (for example, a nitrogen atom, an oxygen atom, a sulfur atom, and the like), and specific examples thereof include a pyridyl group, an imidazolyl group, a furyl group, a piperidyl group, and a morpholino group.

$R^1$ and $R^2$ may be linked to each other to form a ring. For example, isopropyl groups of $R^1$ and $R^2$ may be linked to each other to form a 4,4,5,5-tetramethyl-1,3,2-dioxaborolane ring.

As $R^1$ and $R^2$, a hydrogen atom, a linear or branched alkyl group having 1 to 3 carbon atoms, or an aspect in which these groups are linked to each other to form a ring is preferable, and a hydrogen atom is more preferable.

As the substituent represented by $R^3$, a substituent including a functional group which can be bonded to a (meth) acrylic group is preferable.

Here, examples of the functional group which can be bonded to a (meth)acrylic group include a vinyl group, an acrylate group, a methacrylate group, an acrylamide group, a styryl group, a vinyl ketone group, a butadiene group, a vinyl ether group, an oxiranyl group, an aziridinyl group, and an oxetane group. Among these, a vinyl group, an acrylate group, a methacrylate group, a styryl group, an oxiranyl group, or an oxetane group is preferable, and a vinyl group, an acrylate group, an acrylamide group, or a styryl group is more preferable.

$R^3$ is preferably a substituted or unsubstituted aliphatic hydrocarbon group, aryl group, or heterocyclic group having the functional group which can be bonded to a (meth)acrylic group.

Examples of the aliphatic hydrocarbon group include a substituted or unsubstituted linear or branched alkyl group having 1 to 30 carbon atoms (for example, a methyl group, an ethyl group, an iso-propyl group, an n-propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, an sec-butyl group, a tert-butyl group, an isopentyl group, a neopentyl group, a 1-methylbutyl group, an isohexyl group, a 2-methylhexyl group, and the like), a substituted or unsubstituted cyclic alkyl group having 3 to 20 carbon atoms (for example, a cyclopentyl group, a cyclohexyl group, a 1-adamantyl group, a 2-norbornyl group, and the like), and an alkenyl group having 2 to 20 carbon atoms (for example, a vinyl group, a 1-propenyl group, a 1-butenyl group, a 1-methyl-1-propenyl group, and the like).

Examples of the aryl group include a substituted or unsubstituted phenyl group having 6 to 50 carbon atoms (for example, a phenyl group, a tolyl group, a styryl group, a 4-benzoyloxyphenyl group, a 4-phenoxycarbonylphenyl group, a 4-biphenyl group, a 4-(4-octyloxybenzoyloxy)phenoxycarbonylphenyl group, and the like), and a substituted or unsubstituted naphthyl group having 10 to 50 carbon atoms (for example, an unsubstituted naphthyl group and the like).

The heterocyclic group is, for example, a substituted or unsubstituted 5-membered or 6-membered ring group including at least one heteroatom (for example, a nitrogen atom, an oxygen atom, a sulfur atom, and the like), and examples thereof include groups of pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranil, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, pteridine, morpholine, piperidine, and the like.

Examples of the boronic acid compound represented by Formula (B2) include a boronic acid compound represented by General Formula (I) described in paragraphs 0023 to 0032 of JP2008-225281A.

As the compound represented by Formula (B2), compounds exemplified below are also preferable.

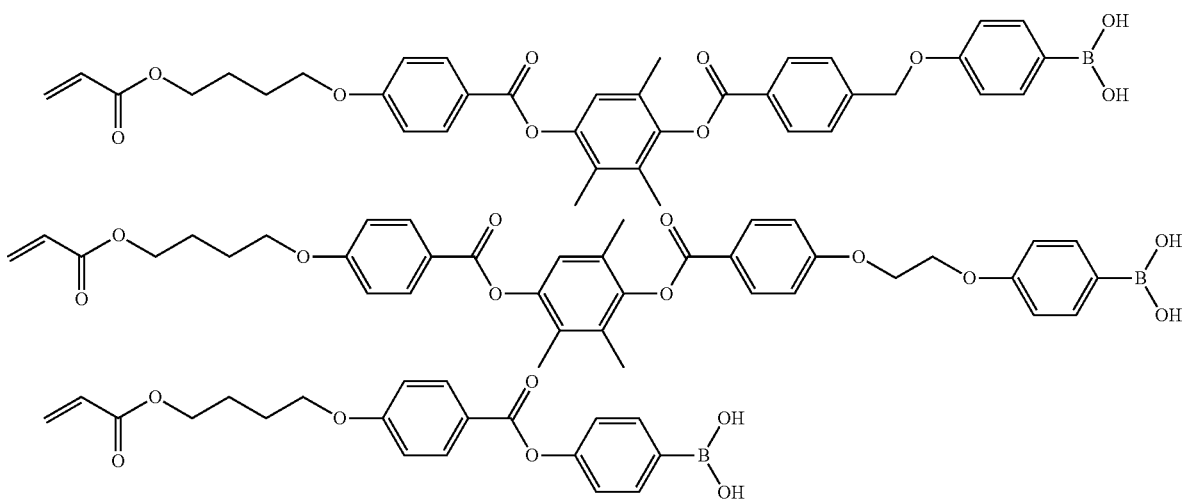

In a case where the liquid crystal composition contains an alignment agent, a content of the alignment agent is preferably 0.2 to 20 parts by mass and more preferably 1 to 10 parts by mass with respect to the total of 100 parts by mass of the liquid crystalline compound and the dichroic substance contained in the liquid crystal composition.

Solvent

From the viewpoint of workability and the like, it is preferable that the liquid crystal composition contains a solvent.

Examples of the solvent include organic solvents such as ketones (such as acetone, 2-butanone, methyl isobutyl ketone, cyclopentanone, cyclohexanone, and acetylacetone), ethers (such as dioxane, tetrahydrofuran, tetrahydropyran, dioxolane, tetrahydrofurfuryl alcohol, cyclopentyl methyl ether, and dibutyl ether), aliphatic hydrocarbons (such as hexane), alicyclic hydrocarbons (such as cyclohexane), aromatic hydrocarbons (such as benzene, toluene, xylene, tetralin, and trimethylbenzene), halogenated carbons (such as dichloromethane, trichloromethane (chloroform), dichloroethane, dichlorobenzene, 1,1,2,2-tetrachloroethane, and chlorotoluene), esters (such as methyl acetate, ethyl acetate, butyl acetate, diethyl carbonate, ethyl acetoacetate, n-pentyl acetate, ethyl benzoate, benzyl benzoate, butyl carbitol acetate, diethylene glycol monoethyl ether acetate, and isoamyl acetate), alcohols (such as ethanol, isopropanol, butanol, cyclohexanol, furfuryl alcohol, 2-ethylhexanol, octanol, benzyl alcohol, ethanolamine, ethylene glycol, propylene glycol, diethylene glycol, diethylene glycol monomethyl ether, diethylene glycol monoethyl ether, and diethylene glycol monobutyl ether), phenols (such as phenol and cresol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, N-ethylpyrrolidone, and 1,3-dimethyl-2-imidazolidinone), and heterocyclic compounds (such as pyridine and 2,6-lutidine); and water.

These solvents may be used alone or in combination of two or more kinds thereof.

In a case where the liquid crystal composition contains a solvent, a content of the solvent is preferably 60% to 99.5% by mass, more preferably 70% to 99% by mass, and particularly preferably 75% to 98% by mass with respect to the total mass (100% by mass) of the liquid crystal composition.

Polymerization Initiator

The liquid crystal composition may contain a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), o-acyloxime compounds ([0065] of JP2016-27384A), and acylphosphine oxide compounds (JP1988-40799B (JP-S63-40799B), JP1993-29234B (JP-H5-29234B), JP1998-95788A (JP-H10-95788A), and JP1998-29997A (JP-H10-29997A)).

Commercially available products can also be used as such a photopolymerization initiator, and examples thereof include IRGACURE-184, IRGACURE-907, IRGACURE-369, IRGACURE-651, IRGACURE-819, IRGACURE-OXE-01, and IRGACURE-OXE-02, manufactured by BASF SE.

In a case where the liquid crystal composition contains a polymerization initiator, a content of the polymerization initiator is preferably 0.01% to 30% by mass and more preferably 0.1% to 15% by mass with respect to the total solid content mass of the liquid crystal composition.

Polymerizable Compound

The liquid crystal composition may contain a polymerizable compound.

Examples of the polymerizable compound include a compound including an acrylate (such as a (meth)acrylate monomer).

In a case where the liquid crystal composition contains a polymerizable compound, a content of the polymerizable compound is preferably 0.5% to 50% by mass and more preferably 1.0% to 40% by mass with respect to the total solid content mass of the liquid crystal composition.

Interface Improver

The liquid crystal composition may contain an interface improver.

The interface improver is not particularly limited, and a polymer-based interface improver or a low-molecular-weight interface improver can be used, and compounds described in paragraphs [0253] to [0293] of JP2011-237513A can also be used.

In addition, fluorine (meth)acrylate-based polymers described in [0018] to [0043] of JP2007-272185A can also be used as the interface improver.

In addition, examples of the interface improver include compound described in paragraphs [0079] to [0102] of JP2007-069471A, polymerizable liquid crystalline compounds represented by Formula (4) described in JP2013-047204A (particularly, compounds described in paragraphs [0020] to [0032]), polymerizable liquid crystalline compounds represented by Formula (4) described in JP2012-211306A (particularly, compounds described in paragraphs [0022] to [0029]), liquid crystal alignment promoters represented by Formula (4) described in JP2002-129162A (particularly, compounds described in paragraphs [0076] to [0078] and paragraphs [0082] to [0084]), compounds represented by Formulae (4), (II), and (III) described in JP2005-099248A (particularly, compounds described in paragraphs [0092] to [0096]), compounds described in paragraphs [0013] to [0059] of JP4385997B, compounds described in paragraphs [0018] to [0044] of JP5034200B, and compounds described in paragraphs [0019] to [0038] of JP4895088B.

The interface improvers may be used alone or in combination of two or more kinds thereof.

In a case where the liquid crystal composition contains an interface improver, a content of the interface improver is preferably 0.005% to 15% by mass, more preferably 0.01% to 5% by mass, and still more preferably 0.015% to 3% by mass with respect to the total solid content mass of the liquid crystal composition. In a case where a plurality of interface improvers are used in combination, it is preferable that the total amount of the plurality of interface improvers is within the above-described range.

A thickness of the light absorption anisotropic layer is not particularly limited, but from the viewpoint of reducing the size and the weight, it is preferably 100 to 8000 nm and more preferably 300 to 5000 nm.

Method of Forming Light Absorption Anisotropic Layer

A method of forming the light absorption anisotropic layer is not particularly limited, and examples thereof include a method including, in the following order, a step of applying the above-described liquid crystal composition (hereinafter, also referred to as "composition for forming a light absorption anisotropic layer") to form a coating film (hereinafter, also referred to as "coating film forming step") and a step of aligning liquid crystalline components contained in the coating film (hereinafter, also referred to as "alignment step").

In a case where the above-described dichroic substance has liquid crystallinity, the liquid crystalline component is a component which also includes the dichroic substance having liquid crystallinity in addition to the above-described liquid crystalline compound.

In addition, in a case where the light absorption anisotropic layer is not a layer fixed in a liquid crystal state of a smectic phase (that is, in a case where a liquid crystalline compound which exhibits smectic properties is not used as the liquid crystalline compound contained in the liquid crystal composition), or in a case of not containing fine particles, from the viewpoint of adjusting the haze value, it is preferable that the light absorption anisotropic layer is formed by a manufacturing method of a light absorption anisotropic layer according to the embodiment of the present invention, which will be described later.

Coating Film Forming Step

The coating film forming step is a step of applying the composition for forming a light absorption anisotropic layer to form a coating film.

The composition for forming a light absorption anisotropic layer can be easily applied by using a composition for forming a light absorption anisotropic layer, which contains the above-described solvent, or using a liquid such as a melt obtained by heating the composition for forming a light absorption anisotropic layer.

Specific examples of a method of applying the composition for forming a light absorption anisotropic layer include known methods such as a roll coating method, a gravure printing method, a spin coating method, a wire bar coating method, an extrusion coating method, a direct gravure coating method, a reverse gravure coating method, a die coating method, a spraying method, and an ink jet method.

Alignment Step

The alignment step is a step of aligning a liquid crystalline component contained in the coating film. In this manner, even in a case where the above-described dichroic substance does not have liquid crystallinity, a light absorption anisotropic layer in which the dichroic substance is aligned along the alignment of the liquid crystalline compound is obtained.

The alignment step may include a drying treatment. Components such as a solvent can be removed from the coating film by performing the drying treatment. The drying treatment may be performed by a method of allowing the coating film to stand at room temperature for a predetermined time (for example, natural drying) or a method of heating the coating film and/or blowing air to the coating film.

Here, the liquid crystalline component contained in the composition for forming a light absorption anisotropic layer may be aligned by the coating film forming step or the drying treatment described above. For example, in an aspect in which the composition for forming a light absorption anisotropic layer is prepared as a coating liquid containing a solvent, a coating film having light absorption anisotropy (that is, a light absorption anisotropic layer) is obtained by drying the coating film and removing the solvent from the coating film.

In a case where the drying treatment is performed at a temperature higher than or equal to a transition temperature of the liquid crystalline component contained in the coating film to the liquid crystal phase, a heat treatment described below may not be performed.

From the viewpoint of manufacturing suitability or the like, the transition temperature of the liquid crystalline component contained in the coating film to the liquid crystal phase is preferably 10° C. to 250° C. and more preferably 25° C. to 190° C. In a case where the above-described transition temperature is 10° C. or higher, a cooling treatment or the like for lowering the temperature to a temperature range in which the liquid crystal phase is exhibited is not necessary, which is preferable. In addition, in a case where the above-described transition temperature is 250° C. or lower, a high temperature is not required even in a case of setting an isotropic liquid state at a temperature higher than the temperature range in which the liquid crystal phase is temporarily exhibited, and waste of thermal energy and deformation and deterioration of a substrate can be reduced, which is preferable.

It is preferable that the alignment step includes a heat treatment. In this manner, since the liquid crystalline component contained in the coating film can be aligned, the coating film after being subjected to the heat treatment can be suitably used as the light absorption anisotropic layer.

From the viewpoint of the manufacturing suitability or the like, the heat treatment is performed at a temperature of preferably 10° C. to 250° C. and more preferably 25° C. to 190° C. In addition, the heating time is preferably 1 to 300 seconds and more preferably 1 to 60 seconds.

The alignment step may include a cooling treatment performed after the heat treatment. The cooling treatment is a treatment of cooling the heated coating film to room temperature (20° C. to 25° C.). In this manner, the alignment of the liquid crystalline component contained in the coating film can be fixed. A cooling unit is not particularly limited, and the cooling treatment can be performed according to a known method.

The light absorption anisotropic layer can be obtained by performing the above-described steps.

In the present embodiment, examples of a method of aligning the liquid crystalline component contained in the coating film include the drying treatment and the heat treatment, but the present invention is not limited thereto, and the liquid crystalline component can be aligned by a known alignment treatment.

Other Steps

The method of forming the light absorption anisotropic layer may include a step of curing the light absorption anisotropic layer after the alignment step (hereinafter, also referred to as "curing step").

The curing step is performed by heating the light absorption anisotropic layer and/or irradiating the light absorption anisotropic layer with light (exposing the light absorption anisotropic layer to light), for example, in a case where the light absorption anisotropic layer has a crosslinkable group (polymerizable group). Among these, it is preferable that the curing step is performed by irradiating the light absorption anisotropic layer with light.

Various light sources such as infrared rays, visible light, and ultraviolet rays can be used as a light source for curing, but ultraviolet rays are preferable. In addition, ultraviolet rays may be applied while the layer is heated during curing, or ultraviolet rays may be applied through a filter which transmits only a specific wavelength.

In a case where the exposure is performed while the layer is heated, the heating temperature during the exposure depends on the transition temperature of the liquid crystalline component contained in the liquid crystal film to the liquid crystal phase, but it is preferably 25° C. to 140° C.

In addition, the exposure may be performed under a nitrogen atmosphere. In a case where the curing of the liquid crystal film proceeds by radical polymerization, since inhibition of polymerization by oxygen is reduced, it is preferable that the exposure is performed in a nitrogen atmosphere.

Patterning of Light Absorption Anisotropic Layer

The light absorption anisotropic layer can be a light absorption anisotropic layer which has a region A and a region B in the plane and has different transmittance central axes in each region. In a case where light emitting pixels are controlled by patterning each liquid crystal pixel, the center of the visual field in a narrow visual field can be switched.

In addition, the light absorption anisotropic layer can be a light absorption anisotropic layer which has a region C and a region D in the plane and has different transmittances at an angle inclined by 30° with respect to the normal direction from the transmittance central axis in the plane provided with the transmittance central axis and the normal line of the surface of the light absorption anisotropic layer in the region C and the region D. In this case, it is preferable that the light absorption anisotropic layer is a light absorption anisotropic layer in which the transmittance at an angle inclined by 30° with respect to the normal direction from the transmittance central axis of the region C is 50% or less and the transmittance at an angle inclined by 30° with respect to the normal direction from the transmittance central axis of the region D is 80% or more.

Viewing angle dependence in some regions can be strengthened or weakened by performing the above-described patterning. In this manner, highly confidential information can also be displayed only in the region where the viewing angle dependence is strengthened. In addition, design with excellent designability can be carried out by controlling the viewing angle dependence as a display device for each display position. Furthermore, in a case where the light emitting pixels are controlled by performing patterning for each pixel of the liquid crystal, it is possible to switch between a narrow viewing angle and a wide viewing angle.

Pattern Forming Method

A method of forming the patterned light absorption anisotropic layer having two or more regions different in the plane is not limited, and various known methods as described in, for example, WO2019/176918A can be used. Examples thereof include a method of forming a pattern by changing an irradiation angle of ultraviolet light to be applied to a photo-alignment film, a method of controlling a thickness of the patterned light absorption anisotropic layer in the plane, a method of unevenly distributing a dichroic coloring agent compound in the patterned light absorption anisotropic layer, and a method of post-processing an optically uniform patterned light absorption anisotropic layer.

Examples of the method of controlling the thickness of the patterned light absorption anisotropic layer in the plane include a method of using lithography, a method of using imprinting, and a method of forming a patterned light absorption anisotropic layer on a base material having an uneven structure. Examples of the method of unevenly distributing a dichroic coloring agent compound in the patterned light absorption anisotropic layer include a method of extracting a dichroic coloring agent by solvent immersion (bleaching). In addition, examples of the method of post-processing an optically uniform patterned light absorption anisotropic layer include a method of cutting a part of a flat light absorption anisotropic layer by laser processing or the like.

Transparent Film Base Material

The optical film according to the embodiment of the present invention may include a transparent film base material.

Here, the "transparent" indicates that the transmittance of visible light is 60% or more. In the present invention, the transmittance is preferably 80% or more and more preferably 90% or more.

As the transparent film base material, a known transparent resin film such as a transparent resin plate, a transparent resin sheet, or the like can be used without particular limitation. As the transparent resin film, a cellulose acylate film (such as a cellulose triacetate film (refractive index: 1.48), a cellulose diacetate film, a cellulose acetate butyrate film, and a cellulose acetate propionate film), a polyethylene terephthalate film, a polyether sulfone film, a polyacrylic resin film, a polyurethane-based resin film, a polyester film, a polycarbonate film, a polysulfone film, a polyether film, a polymethylpentene film, a polyetherketone film, a (meth) acrylonitrile film, or the like can be used.

Among these, a cellulose acylate film which is highly transparent, has a small optical birefringence, is easily produced, and is typically used as a protective film of a polarizing plate is preferable, and a cellulose triacetate (also referred to as triacetyl cellulose (TAC)) film is particularly preferable.

A thickness of the transparent film base material is typically 20 μm to 100 μm.

In the present invention, it is particularly preferable that the transparent film base material is a cellulose ester-based film having a thickness 20 to 70 μm.

Alignment Film

It is preferable that the optical film according to the embodiment of the present invention includes an alignment film between the transparent film base material and the light absorption anisotropic layer.

The alignment film is preferably an alignment film consisting of polyvinyl alcohol or polyimide.

The alignment film can refer to the description on page 43, line 24 to page 49, line 8 of WO2001/88574A1.

A thickness of the alignment film is preferably 0.01 to 10 μm and more preferably 0.01 to 1 μm.

Protective Layer

From the viewpoint of improving durability of the light absorption anisotropic layer, it is preferable that the optical film according to the embodiment of the present invention includes a protective layer as a layer adjacent to the light absorption anisotropic layer.

The protective layer may be a layer formed of a known material, and preferred examples thereof include a resin film. Examples of the resin film include an acrylic resin film, a cellulose ester resin film, a polyethylene terephthalate resin film, and a polycarbonate resin film.

In addition, the protective layer may be subjected to a surface reforming treatment for the purpose of improving the adhesiveness or the like before the adhesive or the pressure sensitive adhesive is attached to the layer. Specific examples of the treatment include a corona treatment, a plasma treatment, a primer treatment, and a saponification treatment.

Barrier Layer

It is preferable that the optical film according to the embodiment of the present invention includes a barrier layer together with the transparent film base material and the light absorption anisotropic layer.

Here, the barrier layer is also referred to as a gas-shielding layer (oxygen-shielding layer), and has a function of protecting the polarizer of the present invention from gas such as oxygen in the atmosphere, the moisture, or the compound contained in an adjacent layer.

The barrier layer can refer to, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A.

Refractive Index Adjusting Layer

From the viewpoint of suppressing influence of internal reflection caused by the high refractive index of the light absorption anisotropic layer, the optical film according to the embodiment of the present invention preferably includes a refractive index adjusting layer.

The refractive index adjusting layer is a layer disposed in contact with the light absorption anisotropic layer, and has an in-plane average refractive index of 1.55 or more and 1.70 or less at a wavelength of 550 nm. It is preferable that the refractive index adjusting layer is a refractive index adjusting layer for performing so-called index matching.

Manufacturing Method of Light Absorption Anisotropic Layer

The manufacturing method of a light absorption anisotropic layer according to the embodiment of the present invention is a manufacturing method of a light absorption anisotropic layer for manufacturing a light absorption anisotropic layer containing a liquid crystalline compound and a dichroic substance.

In addition, the manufacturing method of a light absorption anisotropic layer according to the embodiment of the present invention includes a coating film forming step of applying a liquid crystal composition containing a liquid crystalline compound and a dichroic substance to form a coating film and an alignment step of aligning the liquid crystalline compound and the dichroic substance contained in the coating film.

In addition, in the manufacturing method of a light absorption anisotropic layer according to the embodiment of the present invention, the above-described alignment step is a treatment step of subjecting the coating film to at least a heat treatment of heating to 100° C. or higher, a cooling treatment of cooling to lower than 100° C., and a heat treatment of heating to 100° C. or higher in this order.

The coating film forming step in the manufacturing method of a light absorption anisotropic layer according to the embodiment of the present invention is the same as the step described in the method of forming the light absorption anisotropic layer above.

As described above, the alignment step in the manufacturing method of a light absorption anisotropic layer according to the embodiment of the present invention is a treatment step of subjecting the coating film to at least a heat treatment of heating to 100° C. or higher, a cooling treatment of cooling to lower than 100° C., and a heat treatment of heating to 100° C. or higher in this order; and is preferably a treatment step of subjecting the coating film to a heat treatment of heating to 100° C. or higher, a cooling treatment of cooling to lower than 100° C., a heat treatment of heating to 100° C. or higher, and a cooling treatment of cooling to lower than 100° C. in this order.

Here, from the viewpoint of manufacturing suitability, a heating temperature in the first heat treatment is preferably 100° C. to 250° C., more preferably 100° C. to 190° C., and still more preferably 100° C. to 150° C. In addition, a heating time in the first heat treatment is preferably 1 to 300 seconds, more preferably 1 to 120 seconds, and still more preferably 30 to 90 seconds.

In addition, a cooling temperature in the first cooling treatment is preferably approximately room temperature (20° C. to 25° C.). In addition, a cooling time in the first cooling treatment is preferably 1 to 300 seconds and more preferably 3 to 60 seconds.

In addition, from the viewpoint of manufacturing suitability, a heating temperature in the second heat treatment is preferably 100° C. to 250° C., more preferably 100° C. to 190° C., and still more preferably 100° C. to 150° C. In addition, from the reason that, in the optical film including the obtained light absorption anisotropic layer, the change in redness of the reflected image with respect to the original image can be further suppressed and the alignment degree is also improved, the heating temperature in the second heat treatment is preferably 100° C. to 110° C.

In addition, a cooling temperature in the second cooling treatment is preferably approximately room temperature (20° C. to 25° C.). In addition, a cooling time in the second cooling treatment is preferably 1 to 300 seconds and more preferably 3 to 60 seconds.

Image Display Device

The image display device according to the embodiment of the present invention is an image display device including a display element and the above-described optical film according to the embodiment of the present invention, and is preferably an image display device used for in-vehicle applications.

In addition, it is preferable that the image display device according to the embodiment of the present invention includes a polarizer.

In addition, in the image display device according to the embodiment of the present invention, it is preferable that the light absorption anisotropic layer included in the above-described optical film according to the embodiment of the present invention is disposed on a viewing side with respect to the polarizer, that is, it is preferable that the image display device includes the light absorption anisotropic layer, the polarizer, and the display element in this order from the viewing side.

Polarizer

The polarizer is not particularly limited as long as the polarizer is a member having an absorption axis in the plane and having a function of converting light into specific linearly polarized light, and a known polarizer in the related art can be used.

As the polarizer, an iodine-based polarizer, a dye-based polarizer using a dichroic dye, a polyene-based polarizer, or the like is used. Examples of the iodine-based polarizer and the dye-based polarizer include a coating type polarizer and a stretching type polarizer, and both polarizers can be applied. As the coating type polarizer, a polarizer in which a dichroic organic coloring agent is aligned by using alignment of the liquid crystalline compound is preferable, and as the stretching type polarizer, a polarizer produced by adsorbing iodine or a dichroic dye on polyvinyl alcohol and stretching the polyvinyl alcohol is preferable.

In addition, examples of the method of obtaining a polarizer by stretching and dyeing a laminated film in which a polyvinyl alcohol layer is formed on a base material include methods described in JP5048120B, JP5143918B, JP5048120B, JP4691205B, JP4751481B, and JP4751486B, and known techniques related to these polarizers can also be preferably used.

Among these, from the viewpoint of availability and excellent polarization degree, a polarizer containing a polyvinyl alcohol-based resin (a polymer having —$CH_2$—$CHOH$— as a repeating unit; particularly at least one selected from the group consisting of polyvinyl alcohol and an ethylene-vinyl alcohol copolymer) is preferable.

In the present invention, a thickness of the polarizer is not particularly limited, but is preferably 3 μm to 60 μm, more preferably 5 μm to 20 μm, and still more preferably 5 μm to 10 μm.

In the image display device according to the embodiment of the present invention, the above-described light absorption anisotropic layer and the above-described may be laminated through a pressure-sensitive adhesive layer or an adhesive layer described below, or the above-described alignment film and the above-described light absorption anisotropic layer may be directly applied and laminated onto the above-described polarizer.

Pressure-Sensitive Adhesive Layer

It is preferable that the pressure-sensitive adhesive layer is a transparent and optically isotropic adhesive similar to that used in a typical image display device, and a pressure-sensitive type adhesive is typically used.

The pressure-sensitive adhesive layer may be blended with appropriate additives such as a crosslinking agent (such as an isocyanate-based crosslinking agent or an epoxy-based crosslinking agent), a viscosity imparting agent (such as a rosin derivative resin, a polyterpene resin, a petroleum resin, an oil-soluble phenol resin, and the like), a plasticizer, a filler, an antiaging agent, a surfactant, an ultraviolet absorbing agent, a light stabilizer, and an antioxidant in addition to a parent material (pressure sensitive adhesive), conductive particles, and thermally expandable particles used as necessary.

A thickness of the pressure-sensitive adhesive layer is typically 20 to 500 μm, preferably 20 to 250 μm. Required adhesive strength or rework suitability may not be obtained in a case where the thickness thereof is less than 20 and the pressure sensitive adhesive may protrude or bleed out from the peripheral end portion of the image display device in a case where the thickness thereof is more than 500 μm.

The pressure-sensitive adhesive layer can be formed by an appropriate method such as a method of directly coating a support 110 for a protective member with a coating solution containing a parent material, conductive particles, and as necessary, thermally expandable particles, an additive, a solvent, and the like and pressure-bonding the support through a release liner or a method of coating an appropriate release liner (release paper or the like) with a coating solution to form a thermally expandable pressure-sensitive adhesive layer, and pressure-bonding and transferring (transporting) the layer onto the support 110 for a protective member.

In addition, for example, a configuration in which conductive particles are added to a configuration of a thermally-releasable pressure-sensitive adhesive sheet described in JP2003-292916A can be employed as the protective member.

Furthermore, a member in which conductive particles are sprayed on the surface of a pressure-sensitive adhesive layer in commercially available products such as "REVALPHA" manufactured by Nitto Denko Corporation may be used as the protective member.

Adhesive Layer

The adhesive exhibits adhesiveness due to drying or a reaction after bonding.

A polyvinyl alcohol-based adhesive (PVA-based adhesive) exhibits adhesiveness due to drying, and is capable of bonding materials to each other.

Specific examples of the curable adhesive which exhibits adhesiveness due to reaction include an active energy ray-curable adhesive such as a (meth)acrylate-based adhesive and a cationic polymerization curable adhesive. The (meth)acrylate denotes acrylate and/or methacrylate. Examples of the curable component in the (meth)acrylate-based adhesive include a compound having a (meth)acryloyl group and a compound having a vinyl group. In addition, as the cationic polymerization curable adhesive, a compound having an epoxy group or an oxetanyl group can also be used. The compound having an epoxy group is not particularly limited as long as the compound has at least two epoxy groups in a molecule, and various generally known curable epoxy compounds can be used. Preferred examples of the epoxy compound include a compound (aromatic epoxy compound) having at least two epoxy groups and at least one aromatic ring in the molecule and a compound (alicyclic epoxy compound) having at least two epoxy groups in the molecule, in which at least one of the epoxy groups is formed between two adjacent carbon atoms constituting an alicyclic ring.

Among these, from the viewpoint of heat deformation resistance, an ultraviolet curable adhesive which is cured by irradiation with ultraviolet rays is preferably used.

Each of the adhesive layer and the pressure-sensitive adhesive layer may be obtained by imparting ultraviolet absorbing ability to the layer using a method of performing a treatment with an ultraviolet absorbing agent such as a salicylic acid ester-based compound, a benzophenol-based compound, a benzotriazole-based compound, a cyanoacrylate-based compound, or a nickel complex salt-based compound.

The pressure-sensitive adhesive layer and the adhesive layer can be attached by an appropriate method. For example, the pressure-sensitive adhesive layer or the adhesive layer may be attached to the film by a method of preparing 10% to 40% by mass of a pressure sensitive adhesive solution obtained by dissolving or dispersing a base polymer or a composition thereof in a solvent consisting of a single substance or a mixture of an appropriate solvent such as toluene or ethyl acetate and directly attaching the solution on the film using an appropriate development method such as a casting method or a coating method; or a method of forming a pressure sensitive adhesive layer on a separator in conformity with the above-described method and transporting the layer.

The pressure-sensitive adhesive layer and the adhesive layer may be provided on one or both surfaces of the film as a layer obtained by superimposing different kinds of layers with different compositions. In addition, in a case where the layers are provided on both surfaces of the film, different kinds of pressure-sensitive adhesive layers with different compositions and different thicknesses can be provided on the front and rear surfaces of the film.

Display Element

The display element used in the image display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable. That is, as the display device according to the embodiment of the present invention, a liquid crystal display device obtained by using a liquid crystal cell as a display element or an organic EL display device obtained by using an organic EL display panel as a display element is preferable.

Some image display devices are thin and can be formed into a curved surface. Since a light absorption anisotropic film used in the present invention is thin and easily bent, the light absorption anisotropic film can be suitably applied to an image display device having a curved display surface.

In addition, some image display devices have a pixel density of more than 250 ppi and are capable of high-definition display. The light absorption anisotropic film used in the present invention can be suitably applied to such a high-definition image display device without causing moire.

Liquid Crystal Display Device

Preferred examples of the liquid crystal display device which is an example of the image display device according to the embodiment of the present invention include an aspect in which the liquid crystal display device includes the above-described optical film including the polarizer and a liquid crystal cell.

Examples of the specific configuration thereof include a configuration in which the optical film according to the embodiment of the present invention is disposed on a front-side polarizing plate or a rear-side polarizing plate. In these configurations, the viewing angle at which the vertical direction or the horizontal direction is light-shielded can be controlled.

In addition, the optical film according to the embodiment of the present invention may be disposed on both the front-side polarizing plate and the rear-side polarizing plate. With such a configuration, it is possible to control the viewing angle in which omniazimuth is light-shielded and light is transmitted only in the front direction.

Furthermore, a plurality of the optical films according to the embodiment of the present invention may be laminated through a retardation layer. Transmission performance and light shielding performance can be controlled by controlling a retardation value and an optical axis direction. For example, the omniazimuth is light-shielded by arranging the polarizer, the optical laminate, a λ/2 wave plate (axis angle is an angle deviated by 45° from an alignment direction of the polarizer), and the optical film so that the viewing angle control in which light is transmitted only in the front direction can be made. As the retardation layer, a positive A-plate, a negative A-plate, a positive C-plate, a negative C-plate, a B plate, an O plate, or the like can be used. From the viewpoint of thinning the viewing angle control system, it is preferable that a thickness of the retardation layer is small as long as optical characteristics, mechanical properties, and manufacturing suitability are not impaired, and specifically, the thickness thereof is preferably 1 to 150 μm, more preferably 1 to 70 μm, and still more preferably 1 to 30 μm.

Hereinafter, the liquid crystal cell constituting the liquid crystal display device will be described in detail.

Liquid Crystal Cell

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystalline molecules are substantially horizontally aligned at the time of no voltage application and further twisted aligned at 60° to 120°. The liquid crystal cell in a TN mode is most frequently used as a color TFT liquid crystal display device and is described in a plurality of documents.

In the liquid crystal cell in a VA mode, rod-like liquid crystalline molecules are substantially vertically aligned at the time of no voltage application. The concept of the liquid crystal cell in a VA mode includes (1) a liquid crystal cell in a VA mode in a narrow sense where rod-like liquid crystalline molecules are aligned substantially vertically at the time of no voltage application and substantially horizontally at the time of voltage application (described in JP1990-176625A (JP-H2-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystalline molecules are substantially vertically aligned at the time of no voltage application and twistedly multi-domain aligned at the time of voltage application (described in proceedings of Japanese Liquid Crystal Conference, p. 58 to 59 (1998)), and (4) a liquid crystal cell in a SURVIVAL mode (presented at LCD International 98). In addition, the liquid crystal cell may be of any of a patterned vertical alignment (PVA) type, a photo-alignment (optical alignment) type, or a polymer-sustained alignment (PSA) type. The details of these modes are described in JP2006-215326A and JP2008-538819A.

In the liquid crystal cell in an IPS mode, liquid crystalline compounds are aligned substantially parallel to the substrate, and the liquid crystalline molecules respond planarly through application of an electric field parallel to the substrate surface. That is, the liquid crystalline compounds are aligned in the plane in a state where no electric field is applied. In the IPS mode, black display is carried out in a state where no electric field is applied, and absorption axes of a pair of upper and lower polarizing plates are orthogonal to each other. A method of reducing leakage light during black display in an oblique direction and improving the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

Organic EL Display Device

Suitable examples of the organic EL display device which is an example of the image display device according to the embodiment of the present invention include an aspect of including the above-described optical film including the polarizer, a λ/4 plate, and an organic EL display panel in this order from the viewing side.

In addition, similarly to the liquid crystal display device described above, a plurality of the optical films according to the embodiment of the present invention may be laminated through a retardation layer and disposed on the organic EL display panel. Transmission performance and light shielding performance can be controlled by controlling a retardation value and an optical axis direction.

In addition, the organic EL display panel is a display panel formed of an organic EL element obtained by sandwiching an organic light emitting layer (organic electroluminescence layer) between electrodes (between a cathode and an anode). The configuration of the organic EL display panel is not particularly limited, and a known configuration is employed.

EXAMPLES

Hereinafter, the present invention will be described in more detail with reference to Examples. Materials, used amounts, ratios, treatment contents, treatment procedures, and the like described in Examples can be appropriately changed without departing from the spirit of the present invention. Therefore, the scope of the present invention should not be construed as being limited to Examples.

Example 1

Formation of Alignment Film

A surface of a cellulose acylate film (TAC base material having a thickness of 40 μm; TG40 FUJIFILM Corporation) as a transparent film base material was saponified with an alkaline solution, and coated with the following composition 1 for forming an alignment film using a wire bar. The support on which the coating film was formed was dried with hot air at 60° C. for 60 seconds, and further dried with hot air at 100° C. for 120 seconds to form an alignment film AL1, thereby obtaining a TAC film 1 with an alignment film. A film thickness of the alignment film AL1 was 1 μm.

| (Composition 1 for forming alignment film) | |
|---|---|
| Modified polyvinyl alcohol PVA-1 shown below | 3.80 parts by mass |
| IRGACURE 2959 | 0.20 parts by mass |
| Water | 70 parts by mass |
| Methanol | 30 parts by mass |

Modified polyvinyl alcohol PVA-1

$-(CH_2-CH)_{96.8}-(CH_2-CH)_{1.5}-(CH_2-CH)_{1.7}-\ \ \ \ CH_3$
$\ \ \ \ \ \ \ \ \ \ |\ \ \ \ \ \ \ \ \ \ \ \ \ \ \ \ \ \ \ \ \ |\ \ \ \ \ \ \ \ \ \ \ \ \ \ \ \ \ \ \ |\ \ \ \ \ \ \ \ \ \ \ \ \ \ \ \ \ \ \ \ \ |$
$\ \ \ \ \ \ \ \ \ \ OH\ \ \ \ \ \ \ \ \ \ \ \ \ OCOCH_3\ \ \ \ \ OCONHCH_2CH_2OCOC=CH_2$

Formation of Light Absorption Anisotropic Layer P1

The obtained TAC film 1 with an alignment film was continuously coated with the following composition P1 for forming a light absorption anisotropic layer using a wire bar, heated at 120° C. for 60 seconds, and cooled to room temperature (23° C.).

Next, the coating layer was heated at 120° C. for 60 seconds, and cooled to room temperature again.

Thereafter, the coating layer was irradiated with light of a light emitting diode (LED) lamp (central wavelength: 365 nm) under an irradiation condition of an illuminance of 200 mW/cm$^2$ for 2 seconds from a normal direction of the film, thereby producing a light absorption anisotropic layer P1 on the alignment film AL1.

A film thickness of the light absorption anisotropic layer P1 was 3.5 μm.

| Composition P1 for forming light absorption anisotropic layer | |
|---|---|
| Dichroic substance D-1 shown below | 0.63 parts by mass |
| Dichroic substance D-2 shown below | 0.17 parts by mass |
| Dichroic substance D-3 shown below | 1.13 parts by mass |
| High-molecular-weight liquid crystalline compound P-1 shown below | 8.18 parts by mass |
| IRGACURE OXE-02 (manufactured by BASF SE) | 0.16 parts by mass |
| Alignment agent E-1 shown below | 0.13 parts by mass |
| Alignment agent E-2 shown below | 0.13 parts by mass |
| Surfactant F-1 shown below | 0.004 parts by mass |
| Cyclopentanone | 85.01 parts by mass |
| Benzyl alcohol | 4.47 parts by mass |

Dichroic substance D-1

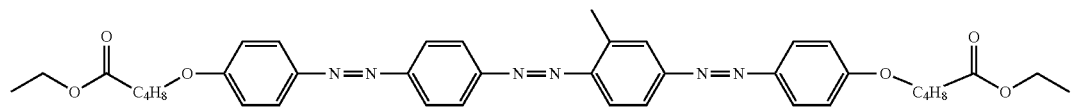

Dichroic substance D-2

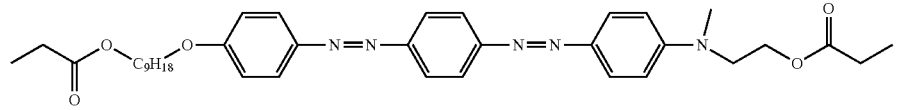

Dichroic substance D-3

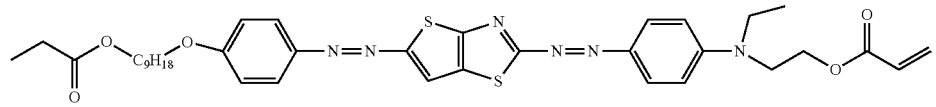

High-molecular-weight liquid crystalline compound P-1

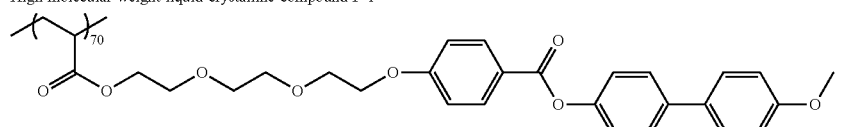

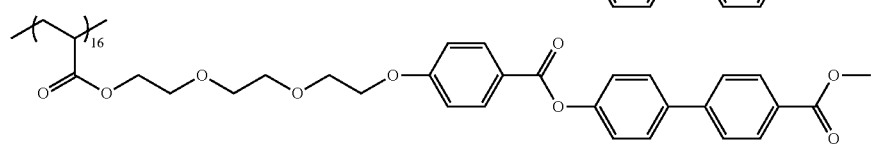

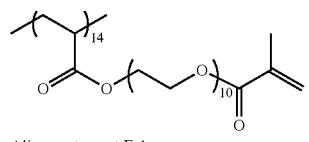

Alignment agent E-1

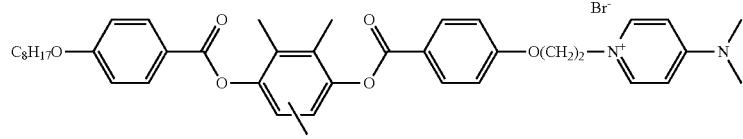

Composition P1 for forming light absorption anisotropic layer

Alignment agent E-2

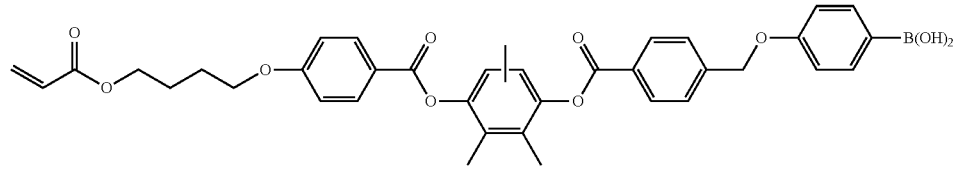

Surfactant F-1

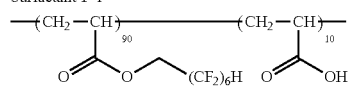

Formation of Protective Layer B1

A coating film was formed by continuously coating the obtained light absorption anisotropic layer P1 with the following composition B1 for forming a protective layer using a wire bar.

Next, the support on which the coating film was formed was dried with hot air at 60° C. for 60 seconds, and further dried with hot air at 100° C. for 120 seconds to form a protective layer B1, thereby obtaining an optical film. A film thickness of the protective layer was 0.5 μm.

| (Composition B1 for forming protective layer) | |
|---|---|
| Modified polyvinyl alcohol PVA-1 shown above | 3.88 parts by mass |
| IRGACURE 2959 | 0.20 parts by mass |
| Water | 70 parts by mass |
| Methanol | 30 parts by mass |

Production of Image Display Device D1 with Reflected Glare Prevention System A GALAXY S4 (manufactured by SAMSUNG Electronics Co., Ltd.) equipped with an organic EL panel (organic EL display element) was disassembled, a touch panel with a circularly polarizing plate was peeled off from an organic EL display device, the circularly polarizing plate was further peeled off from the touch panel, the organic EL display element, the touch panel, and the circularly polarizing plate were isolated from each other, and the isolated circularly polarizing plate was re-bonded to the organic EL display element. Furthermore, the optical film 1 was laminated on the re-bonded circularly polarizing plate using the following pressure sensitive adhesive sheet. As a result, an image display device D1 with a reflected glare prevention system was produced.

Production of Pressure Sensitive Adhesive Sheet 1

An acrylate-based polymer was prepared according to the following procedure. 95 parts by weight of butyl acrylate and 5 parts by weight of acrylic acid were polymerized by a solution polymerization method in a reaction container equipped with a cooling pipe, a nitrogen introduction pipe, a thermometer, and a stirrer, thereby obtaining an acrylate-based polymer with an average molecular weight of 2,000,000 and a molecular weight distribution (Mw/Mn) of 3.0.

Next, the obtained acrylate-based polymer(100 parts by mass), CORONATE L (75% by mass ethyl acetate solution of a trimethylolpropane adduct of tolylene isocyanate, number of isocyanate groups in one molecule: 3, manufactured by Nippon Polyurethane Industry Co., Ltd.) (1.0 part by mass), and a silane coupling agent KBM-403 (manufactured by Shin-Etsu Chemical Co., Ltd.) (0.2 parts by mass) were mixed with each other, and ethyl acetate was added to the obtained mixture so that the concentration of total solid content was finally 10% by mass to prepare a composition for forming a pressure sensitive adhesive. A separate film subjected to a surface treatment with a silicone-based release agent was coated with the composition using a die coater, and the coating film was dried in an environment of 90° C. for 1 minute to obtain an acrylate-based pressure sensitive adhesive sheet 1. A film thickness thereof was 25 μm, and a storage elastic modulus thereof was 0.1 MPa.

Example 2

An optical film 2 and an image display device D2 with a reflected glare prevention system of Example 2 were produced in the same manner as in Example 1, except that, in the optical film 1 of Example 1, the composition P1 for forming a light absorption anisotropic layer was continuously applied using a wire bar, heated at 120° C. for 60 seconds, and then cooled to room temperature (23° C.), and the heating temperature after the cooling was changed to 110° C.

Example 3

An optical film 3 and an image display device D3 with a reflected glare prevention system of Example 3 were produced in the same manner as in Example 1, except that, in the optical film 1 of Example 1, the composition P1 for forming a light absorption anisotropic layer was continuously applied using a wire bar, heated at 120° C. for 60 seconds, and then cooled to room temperature (23° C.), and the heating temperature was changed to 100° C.

Comparative Example 1

An optical film 4 and an image display device D4 with a reflected glare prevention system of Comparative Example 1 were produced in the same manner as in Example 1, except that, in the optical film 1 of Example 1, the composition P1 for forming a light absorption anisotropic layer was continuously applied using a wire bar, heated at 120° C. for 60 seconds, and then cooled to room temperature (23° C.), and the heating temperature was changed to 80° C.

Example 4

An optical film 5 and an image display device D5 with a reflected glare prevention system of Example 4 were produced in the same manner as in Comparative Example 1, except that, in the optical film 4 of Comparative Example 1, a composition P2 for forming a light absorption anisotropic layer was used instead of the composition P1 for forming a light absorption anisotropic layer.

In the composition P2 for forming a light absorption anisotropic layer, a refractive index of the high-molecular-weight liquid crystalline compound P-1 was 1.60, and a refractive index of silica contained in MEK-ST (manufactured by Nissan Chemical Industries Ltd.) was 1.47.

| Formulation of composition P2 for forming light absorption anisotropic layer | |
|---|---|
| Dichroic substance D-1 shown above | 0.63 parts by mass |
| Dichroic substance D-2 shown above | 0.17 parts by mass |
| Dichroic substance D-3 shown above | 1.13 parts by mass |
| High-molecular-weight liquid crystalline compound P-1 shown above | 8.12 parts by mass |
| IRGACURE OXE-02 (manufactured by BASF SE) | 0.16 parts by mass |
| Alignment agent E-1 shown above | 0.13 parts by mass |
| Alignment agent E-2 shown above | 0.13 parts by mass |
| Surfactant F-1 described above | 0.004 parts by mass |
| MEK-ST (manufactured by Nissan Chemical Industries Ltd.) | 0.18 parts by mass (silica amount: 0.054 parts by mass) |
| Cyclopentanone | 84.89 parts by mass |
| Benzyl alcohol | 4.47 parts by mass |

Example 5

An optical film 6 and an image display device D6 with a reflected glare prevention system of Example 5 were produced in the same manner as in Comparative Example 1, except that, in the optical film 4 of Comparative Example 1, a composition P3 for forming a light absorption anisotropic layer was used instead of the composition P1 for forming a light absorption anisotropic layer.

| Formulation of composition P3 for forming light absorption anisotropic layer | |
|---|---|
| Dichroic substance D-1 shown above | 0.63 parts by mass |
| Dichroic substance D-2 shown above | 0.17 parts by mass |
| Dichroic substance D-3 shown above | 1.13 parts by mass |
| High-molecular-weight liquid crystalline compound P-1 shown above | 8.02 parts by mass |
| IRGACURE OXE-02 (manufactured by BASF SE) | 0.16 parts by mass |
| Alignment agent E-1 shown above | 0.13 parts by mass |
| Alignment agent E-2 shown above | 0.13 parts by mass |
| Surfactant F-1 described above | 0.004 parts by mass |
| MEK-ST (manufactured by Nissan Chemical Industries Ltd.) | 0.53 parts by mass (silica amount: 0.159 parts by mass) |
| Cyclopentanone | 84.64 parts by mass |
| Benzyl alcohol | 4.47 parts by mass |

Example 6

An optical film 7 and an image display device D7 with a reflected glare prevention system of Example 6 were produced in the same manner as in Comparative Example 1, except that, in the optical film 4 of Comparative Example 1, a composition P4 for forming a light absorption anisotropic layer was used instead of the composition P1 for forming a light absorption anisotropic layer.

| Formulation of composition P4 for forming light absorption anisotropic layer | |
|---|---|
| Dichroic substance D-1 shown above | 0.63 parts by mass |
| Dichroic substance D-2 shown above | 0.17 parts by mass |
| Dichroic substance D-3 shown above | 1.13 parts by mass |
| Smectic liquid crystalline compound L-1 shown below | 6.13 parts by mass |
| Smectic liquid crystalline compound L-2 shown below | 2.04 parts by mass |
| IRGACURE OXE-02 (manufactured by BASF SE) | 0.16 parts by mass |
| Alignment agent E-1 shown above | 0.13 parts by mass |
| Alignment agent E-2 shown above | 0.13 parts by mass |
| Surfactant F-1 described above | 0.004 parts by mass |
| Cyclopentanone | 85.01 parts by mass |
| Benzyl alcohol | 4.47 parts by mass |

Smectic liquid crystalline compound L-1

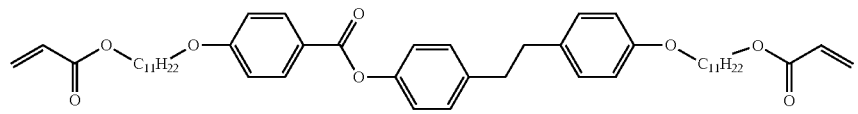

Smectic liquid crystalline compound L-2

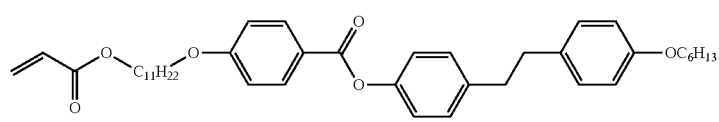

Example 7

An optical film 8 and an image display device D8 with a reflected glare prevention system of Example 7 were produced in the same manner as in Comparative Example 1, except that, in the optical film 4 of Comparative Example 1, a composition P5 for forming a light absorption anisotropic layer was used instead of the composition P1 for forming a light absorption anisotropic layer.

| Formulation of composition P5 for forming light absorption anisotropic layer | |
| --- | --- |
| Dichroic substance D-1 shown above | 0.63 parts by mass |
| Dichroic substance D-2 shown above | 0.17 parts by mass |
| Dichroic substance D-3 shown above | 1.13 parts by mass |
| Smectic liquid crystalline compound L-3 shown below | 6.13 parts by mass |
| Smectic liquid crystalline compound L-4 shown below | 2.04 parts by mass |
| IRGACURE OXE-02 (manufactured by BASF SE) | 0.16 parts by mass |
| Alignment agent E-1 shown above | 0.13 parts by mass |
| Alignment agent E-2 shown above | 0.13 parts by mass |
| Surfactant F-1 described above | 0.004 parts by mass |
| Cyclopentanone | 85.01 parts by mass |
| Benzyl alcohol | 4.47 parts by mass |

Smectic liquid crystalline compound L-3

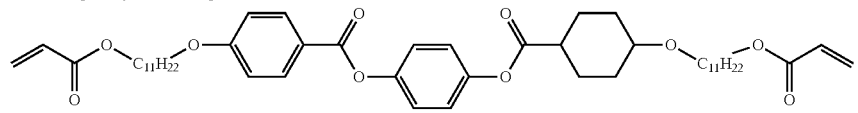

Smectic liquid crystalline compound L-4

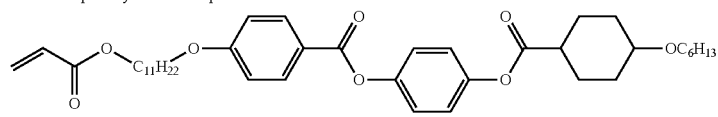

Example 8

Production of Circularly Polarizing Plate

A circularly polarizing plate 8 was produced using the same method as that of a circularly polarizing plate 34 described in JP2019-120949A.

Production of Laminate A8

The surface of the optical laminate in the above-described circularly polarizing plate 8 and the surface of the protective layer B2 in the optical film 2 produced in Example 2 were subjected to a corona treatment, and both surfaces were bonded to each other with the following PVA adhesive 1, thereby producing a laminate A8.

Preparation of PVA Adhesive 1

20 parts of methylol melamine with respect to 100 parts of a polyvinyl alcohol-based resin containing an acetoacetyl group (average degree of polymerization: 1200, degree of saponification: 98.5% by mole, degree of acetoacetylation: 5% by mole) was dissolved in pure water under a temperature condition of 30° C. to prepare an aqueous solution in which the concentration of solid contents was adjusted to 3.7%.

Production of Image Display Device D8 with Reflected Glare Prevention System A GALAXY S4 (manufactured by SAMSUNG Electronics Co., Ltd.) equipped with an organic EL panel (organic EL display element) was disassembled, a touch panel with a circularly polarizing plate was peeled off from an organic EL display device, the circularly polarizing plate was further peeled off from the touch panel, and the laminate A8 was bonded to the organic EL display device using the pressure sensitive adhesive sheet 1 so that the positive C-plate side of the laminate A8 was the panel side. As a result, an image display device D8 with a reflected glare prevention system was produced.

Evaluation

(1) Transmittance Central Axis Angle θ

A transmittance central axis angle θ was measured by the above-described method using each of the produced optical films. Since none of the layer configurations of the optical film other than the light absorption anisotropic layer had absorption anisotropy, the value of the light absorption anisotropic layer of each optical film could be used as the transmittance central axis angle θ calculated above. The results are shown in Table 1 below.

(2) Haze Value

A measurement was performed according to JIS-K7136, in which a haze meter NDH4000 manufactured by NIPPON DENSHOKU INDUSTRIES Co., Ltd. was used as a device to measure Hz(T), Hz(A), and Hz(B).

In addition, from the obtained value, Hz(P) which was a haze value of the light absorption anisotropic layer was calculated based on the following calculation.

The results of Hz(T) and Hz(P) are shown in Table 1.

$$Hz(P)=Hz(A)-Hz(B)$$

Hz(T): measurement on the optical film formed up to the protective layer

Hz(A): measurement on a laminate in which, before forming the protective layer, a cellulose acylate film (TAC base material having a thickness of 40 μm; TG40 FUJIFILM Corporation) was laminated on the light absorption anisotropic layer side of the optical film which had been formed up to the light absorption anisotropic layer using the pressure sensitive adhesive sheet 1

Hz(B): measurement on a laminate in which, before forming the protective layer and the light absorption anisotropic layer, a cellulose acylate film (TAC base material having a thickness of 40 μm; TG40 FUJIFILM Corporation) was laminated on the alignment film side of the optical film which had been formed up to the alignment film using the pressure sensitive adhesive sheet 1

(3) Arrangement Structure

In a case where a length L of a major axis of an arrangement structure of the light absorption anisotropic layer included in the produced optical film was measured by the method described above, the number (N) of arrangement structures satisfying L≥240 nm per 40 μm² was observed as shown in Table 1.

The length L of the major axis and the length D of the minor axis of the arrangement structure were measured using image processing software "ImageJ".

In a case where the alignment degree of the light absorption anisotropic layer was more than 0 with regard to the presence or absence of the arrangement structure, it was determined that the dichroic substance observed inside the light absorption anisotropic layer by STEM formed the arrangement structure.

(4) Change in Redness (Hue Shift to Redness)

In order to evaluate reflected images on window glass, a reflected image evaluation system shown in FIG. 1 was produced, and the prepared image evaluation device with a reflected glare prevention system was installed in the evaluation system.

In a state where white images (R256, G256, and B256) were displayed on the entire surface of the image evaluation device, hues of the images reflected on the surface of an acrylic plate installed in place of window glass were subjected to sensory evaluation, and tints (redness, greenness, and blueness) were evaluated.

At this time, the direction of observing the reflected images was set to an oblique direction at an angle of approximately 30° with respect to a straight line extending from the center of the image display device to the front direction of the acrylic plate as shown in FIG. 1, and the reflected images were observed from obliquely above at an angle of approximately 20° with respect to the plane of the acrylic plate. The results obtained by the evaluation according to the following standard are shown in Table 1.

Sensory Evaluation Standard

The tint of the image reflected on the acrylic plate was sensory evaluated according to the following standard.
A: tint of the reflected image was a neutral gray color.
B: tint of the reflected image was slight redness, but was in an acceptable range.
C: tint of the reflected image was strong redness, and was out of an acceptable range.

(5) Alignment Degree

An alignment degree of the obtained light absorption anisotropic layer at a wavelength of 550 nm was calculated by the following method. The results are shown in Table 1 below.

In the measurement, the Mueller matrix at a wavelength of 550 nm at each polar angle was measured while the polar angle which was the angle with respect to the normal direction of the light absorption anisotropic layer was changed from −70° to 70° at intervals of 1° using AxoScan OPMF-1 (manufactured by Opto Science, Inc.), and the minimum transmittance (Tmin) was derived.

Next, after removal of the influence of surface reflection, Tmin at a polar angle at which Tmin was highest was defined as Tm(0), and Tmin in a direction in which the polar angle was further increased by 40° from the polar angle at which Tmin was highest was defined as Tm(40).

The absorbance(A) was calculated by the following expression based on the obtained Tm(0) and Tm(40), and A(0) and A(40) were calculated.

$$A = -\log(Tm)$$

Here, Tm represents a transmittance and A represents an absorbance.

An alignment degree $S_P$ at a wavelength of 550 nm, which was defined by the following expression, was calculated based on the calculated A(0) and A(40).

$$S_P = (4.6 \times A(40) - A(0))/(4.6 \times A(40) + 2 \times A(0))$$

By changing the wavelength from 550 nm to 420 nm or 650 nm, the alignment degrees $S_P$ at wavelengths of 420 nm and 650 nm were calculated.

TABLE 1

| | Liquid crystalline compound | Silica (% by mass with respect to total solid content mass) | Second heating temperature during formation of light absorption anisotropic layer (° C.) | Transmittance central axis angle θ | Hz(T) | Hz(P) | Arrangement structure | N※ (number) | Change in redness | Alignment degree |
|---|---|---|---|---|---|---|---|---|---|---|
| Example 1 | P-1 | 0 | 120 | 0° | 10.5 | 10.2 | Y | 12 | A | 0.92 |
| Example 2 | P-1 | 0 | 110 | 0° | 3.4 | 3.1 | Y | 5 | A | 0.96 |
| Example 3 | P-1 | 0 | 100 | 0° | 1.1 | 0.8 | Y | 3 | B | 0.97 |
| Comparative Example 1 | P-1 | 0 | 80 | 0° | 0.4 | 0.1 | Y | 0 | C | 0.97 |
| Example 4 | P-1 | 0.5 | 80 | 0° | 1.3 | 1.0 | Y | 0 | B | 0.95 |
| Example 5 | P-1 | 1.5 | 80 | 0° | 4.8 | 4.5 | Y | 0 | A | 0.91 |
| Example 6 | L1/L2 | 0 | 80 | 0° | 1.1 | 0.8 | Y | 0 | B | 0.91 |
| Example 7 | L3/L4 | 0 | 80 | 0° | 1.3 | 1.0 | Y | 0 | B | 0.92 |
| Example 8 | P-1 | 0 | 110 | 0° | 3.4 | 3.1 | Y | 5 | A | 0.96 |

※Number of arrangement structures satisfying L ≥ 240 nm per 40 μm²

From the results shown in Table 1, it was found that, in a case where an optical film having a haze value of 1% or less was used, the change in redness with respect to the original image of the reflected image to the surroundings could not be suppressed (Comparative Example 1).

Meanwhile, it was found that, in a case where an optical film having a haze value of more than 1% and 20% or less was used, the change in redness with respect to the original image of the reflected image to the surroundings could be suppressed (Examples 1 to 7). In addition, even in a case where the image display device D8 of Example 8 was used, the change in redness could be suppressed as in Example 2.

Here, based on the comparison between Comparative Example 1 and Examples 1 to 3, it was found that the haze value was increased by setting the second heating temperature during the formation of the light absorption anisotropic layer to 100° C. or higher.

In addition, based on the comparison between Comparative Example 1 and Examples 4 and 5, it was found that the haze value was increased by containing the fine particles in the light absorption anisotropic layer.

In addition, based on the comparison between Comparative Example 1 and Examples 6 and 7, it was found that the haze value was increased by using the light absorption anisotropic layer in which the liquid crystal state of the smectic phase was fixed.

In addition, based on the comparison between Comparative Example 1 and Examples 1 to 3, it was found that, in a case where the haze value of the optical film was more than 1% and less than 10%, the change in redness with respect to the original image was suppressed and the alignment degree was also improved.

What is claimed is:

1. An optical film comprising:
   a light absorption anisotropic layer which contains a liquid crystalline compound and a dichroic substance,
   wherein a content of the liquid crystalline compound is 60% to 95% by mass,
   an angle θ between a transmittance central axis of the light absorption anisotropic layer and a normal direction of a surface of the light absorption anisotropic layer is 0° or more and 45° or less, and the transmittance central axis denotes a direction of an absorption axis, that is, a major axis direction of a molecule, of the dichroic substance contained in the light absorption anisotropic layer, and
   a haze value of the optical film is more than 1% and 20% or less.

2. The optical film according to claim 1,
   wherein the dichroic substance contained in the light absorption anisotropic layer forms an arrangement structure, and the arrangement structure refers to a state in which, in the light absorption anisotropic layer, the dichroic substances are collected to form an aggregate and molecules of the dichroic substances are periodically arranged in the aggregate.

3. The optical film according to claim 2,
   wherein the light absorption anisotropic layer is a layer fixed in a liquid crystal state of a smectic phase.

4. The optical film according to claim 2,
   wherein the light absorption anisotropic layer contains fine particles having a refractive index different from a refractive index of the liquid crystalline compound.

5. The optical film according to claim 2,
   wherein a haze value of the light absorption anisotropic layer is more than 0.7% and 15% or less.

6. An image display device comprising:
   the optical film according to claim 2.

7. The image display device according to claim 6,
   wherein the image display device is used for in-vehicle applications.

8. The optical film according to claim 1,
   wherein the light absorption anisotropic layer is a layer fixed in a liquid crystal state of a smectic phase.

9. The optical film according to claim 8,
   wherein the light absorption anisotropic layer contains fine particles having a refractive index different from a refractive index of the liquid crystalline compound.

10. The optical film according to claim 1,
    wherein the light absorption anisotropic layer contains fine particles having a refractive index different from a refractive index of the liquid crystalline compound.

11. The optical film according to claim 1,
    wherein a haze value of the light absorption anisotropic layer is more than 0.7% and 15% or less.

12. An image display device comprising:
    the optical film according to claim 1.

13. The image display device according to claim 12,
    wherein the image display device is used for in-vehicle applications.

14. An optical film comprising:
    a light absorption anisotropic layer which contains a liquid crystalline compound and a dichroic substance,
    wherein a content of the liquid crystalline compound is 60% to 95% by mass,
    an angle θ between a transmittance central axis of the light absorption anisotropic layer and a normal direction of a surface of the light absorption anisotropic layer is 0° or more and 45° or less, and the transmittance central axis denotes a direction of an absorption axis, that is, a major axis direction of a molecule, of the dichroic substance contained in the light absorption anisotropic layer, and
    a haze value of the optical film is more than 1% and 20% or less,
    wherein the dichroic substance contained in the light absorption anisotropic layer forms an arrangement structure, and the arrangement structure refers to a state in which, in the light absorption anisotropic layer, the dichroic substances are collected to form an aggregate and molecules of the dichroic substances are periodically arranged in the aggregate, and
    wherein, in a cross section of the light absorption anisotropic layer observed with a scanning transmission electron microscope, in a case where a length of a major axis of the arrangement structure is denoted as L and a length of a minor axis of the arrangement structure is denoted as D, three or more arrangement structures satisfying L≥240 nm are observed per 40 µm².

15. The optical film according to claim 14,
    wherein the light absorption anisotropic layer is a layer fixed in a liquid crystal state of a smectic phase.

16. The optical film according to claim 14,
    wherein the light absorption anisotropic layer contains fine particles having a refractive index different from a refractive index of the liquid crystalline compound.

17. The optical film according to claim 14,
    wherein a haze value of the light absorption anisotropic layer is more than 0.7% and 15% or less.

18. An image display device comprising:
    the optical film according to claim 3.

19. The image display device according to claim 18, wherein the image display device is used for in-vehicle applications.

* * * * *